(12) United States Patent
Tehranipoor et al.

(10) Patent No.: US 8,850,608 B2
(45) Date of Patent: Sep. 30, 2014

(54) EMBEDDED RING OSCILLATOR NETWORK FOR INTEGRATED CIRCUIT SECURITY AND THREAT DETECTION

(75) Inventors: Mohammad Tehranipoor, Mansfield, CT (US); Xiaoxiao Wang, Austin, TX (US); Xuehui Zhang, Storrs, CT (US)

(73) Assignee: University of Connecticut, Farmington, CT (US)

(*) Notice: Subject to any disclaimer, the term of this patent is extended or adjusted under 35 U.S.C. 154(b) by 0 days.

(21) Appl. No.: 13/414,673

(22) Filed: Mar. 7, 2012

(65) Prior Publication Data

US 2013/0019324 A1  Jan. 17, 2013

Related U.S. Application Data

(60) Provisional application No. 61/449,844, filed on Mar. 7, 2011.

(51) Int. Cl.

| | |
|---|---|
| G06F 21/00 | (2013.01) |
| H04L 29/06 | (2006.01) |
| H03K 3/03 | (2006.01) |
| H04N 7/167 | (2011.01) |
| H04L 9/06 | (2006.01) |
| H03L 7/099 | (2006.01) |

(52) U.S. Cl.
CPC ............ H03K 3/0315 (2013.01); *H04L 9/0662* (2013.01); *H04L 2209/12* (2013.01); *H03L 7/0995* (2013.01); *H03K 3/0322* (2013.01)
USPC .................. 726/34; 726/24; 380/44; 380/46; 380/57

(58) Field of Classification Search
CPC .................................................. H03K 3/0315
USPC ...................... 726/34, 24; 380/44, 46; 331/57
See application file for complete search history.

(56) References Cited

U.S. PATENT DOCUMENTS

| 4,810,975 A | 3/1989 | Dias ................................ 331/78 |
| 6,859,744 B2 | 2/2005 | Giger |

(Continued)

FOREIGN PATENT DOCUMENTS

| WO | WO 02078341 A2 * | 10/2002 |
| WO | WO 2012/122309 | 9/2012 |

OTHER PUBLICATIONS

Xuehui Zhang, Andrew Ferraiuolo, Mohammad Tehranipoor; "Detection of trojans using a combined ring oscillator network and off-chip transient power analysis"; Sep. 2013; Journal on Emerging Technologies in Computing Systems (JETC), vol. 9 Issue 3; Publisher: ACM; pp. 1-20.*

(Continued)

*Primary Examiner* — Kambiz Zand
*Assistant Examiner* — Courtney Fields
(74) *Attorney, Agent, or Firm* — Ballard Spahr LLP

(57) ABSTRACT

Aspects of the disclosure relate to combining on-chip structure with external current measurements for threat detection in an integrated circuit. This method considers Trojans' impact on neighboring cells and on the entire IC's power consumption, and effectively localizes the measurement of dynamic power. An on-chip structure can permit threat detections. In one aspect, the on-chip structure can comprise a plurality of sensors distributed across the entirety of the IC, with each sensor of the plurality of sensors being placed in different rows of a standard-cell design. In another aspect, data analysis can permit separating effect of process variations on transient power usage of the IC from effects of a hardware threat such power usage. The on-chip structure also can be employed for implementation of a PE-PUF.

38 Claims, 57 Drawing Sheets

(56) References Cited

U.S. PATENT DOCUMENTS

| | | |
|---|---|---|
| 7,338,817 B2 | 3/2008 | Liu |
| 7,779,273 B2 | 8/2010 | Dale et al. .................... 713/189 |
| 8,290,150 B2 | 10/2012 | Erhart et al. .................... 380/44 |
| 8,630,410 B2 | 1/2014 | Suh |
| 2005/0140418 A1 | 6/2005 | Muniandy |
| 2006/0223201 A1 | 10/2006 | Liu |
| 2007/0250938 A1* | 10/2007 | Suh et al. ........................ 726/34 |
| 2008/0279373 A1 | 11/2008 | Erhart et al. .................... 380/44 |
| 2011/0032041 A1* | 2/2011 | Dichtl ............................ 331/57 |
| 2011/0128081 A1* | 6/2011 | Hars ............................... 331/57 |
| 2012/0183135 A1* | 7/2012 | Paral et al. ...................... 380/44 |
| 2014/0103344 A1 | 4/2014 | Tehranipoor |

OTHER PUBLICATIONS

U.S. Appl. No. 61/449,844, filed Mar. 7, 2011, Tehranipoor.
International Search Report issued Oct. 23, 2012 for International Application No. PCT/US2012/028134, which was filed on Mar. 7, 2012 and published as WO 2012/122309 as of Sep. 13, 2012 (Inventor—Tehranipoor; Applicant—University of Connecticut) (pp. 1-3).
Office Action mailed Apr. 29, 2014 for U.S. Appl. No. 13/789,172, filed Mar. 7, 2013 (Inventors—M. Tehranipoor, et al.) (12 pages).

* cited by examiner

Power Signature Generation
01: Collect data from $N_{TF}$ Trojan-free ICs with $N_{ro}$ ring oscillators
02:   for ($i = 1, i <= N_{ro}, i++$) {         //select $i^{th}$ RO
03:     for ($j = 1, j <= N_{ro}, j++$) ($j \neq i$) {     //select $j^{th}$ RO
04:       for ($k = 1, k <= N_{TF}, k++$) {     //select $k^{th}$ Trojan-free IC
05:         $x_{kj} = (\sum_{m=1}^{N_{ro}} CC_{km} - CC_{ki})/CC_{ki}$;
06:         $y_{kj} = (\sum_{m=1}^{N_{ro}} CC_{km} - CC_{kj})/CC_{kj}$;
07:         plot($x_{kj}, y_{kj}, I_K$);
08:       }
09:       The power signature, $PS_{ij}$, is created from all $N_{TF}$ ICs.
10:     }     //$x_{ki}$ is named as the first vector
11:   }     //$y_{kj}$ is named as the second vector
Note: $CC_{km}, CC_{ki}, CC_{kj}$: Oscillation cycle count of $RO_m, RO_i, RO_j$ in $k^{th}$ IC
     $I_k$: The dynamic current of $k^{th}$ IC Authentication
For each IC under authentication:
01: Collect data from $N_{ro}$ ring oscillators ($C_{RON} = \sum_{i=1}^{N_{ro}} C_i$).
02:   for ($i = 1, i <= N_{ro}, i++$)
03:     { $x = (CC_{RON} - CC_i)/CC_i$;
04:     for ($j = 1, j <= N_{ro}, j++$) ($j \neq i$);
05:       { $y = (CC_{RON} - CC_j)/CC_j$;
06:       plot($x,y,I$);
07:       if ($(x,y)$ is outside of the power signature $PS_{ij}$
08:         {The IC is Trojan-inserted; Break; }
09:       else go on;
10:     }
11:   }
Note: $CC_i, CC_j$: Oscillation cycle count of $RO_i, RO_j$
     $I$: Dynamic current of the under test IC

FIG. 15B

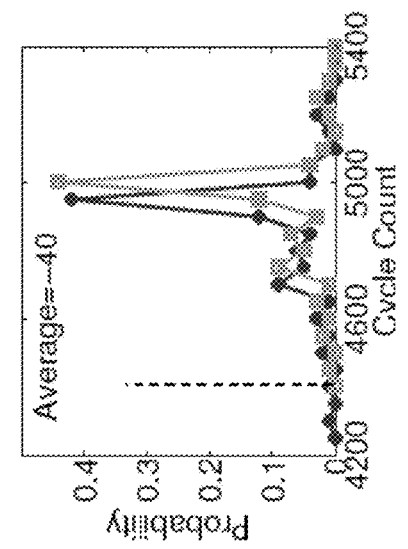
FIG. 17C
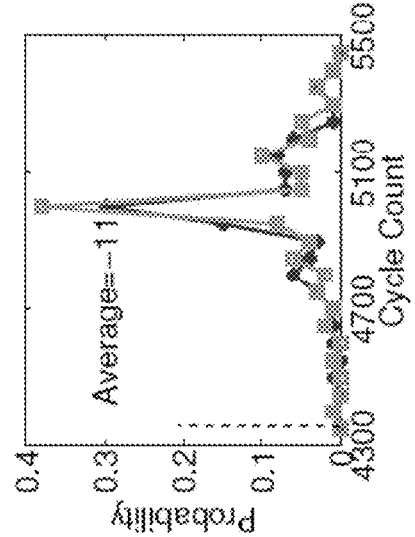
FIG. 17F
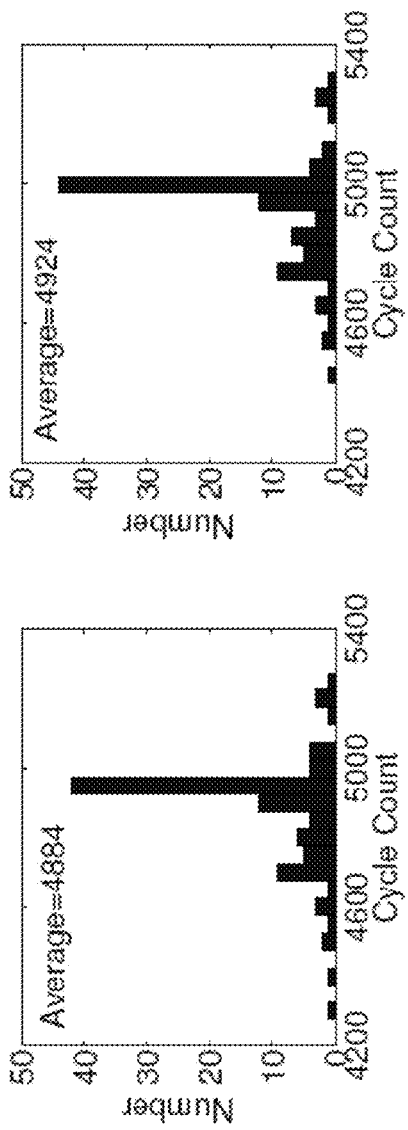
FIG. 17B
FIG. 17E
FIG. 17A
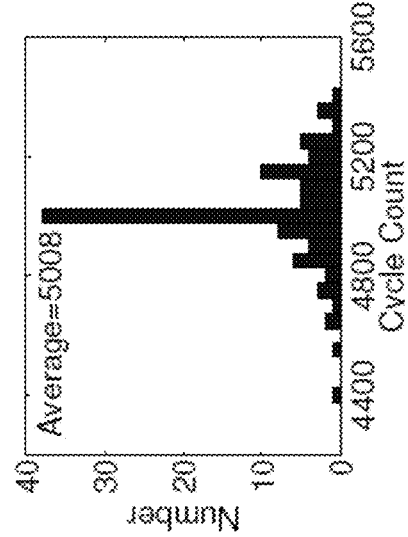
FIG. 17D

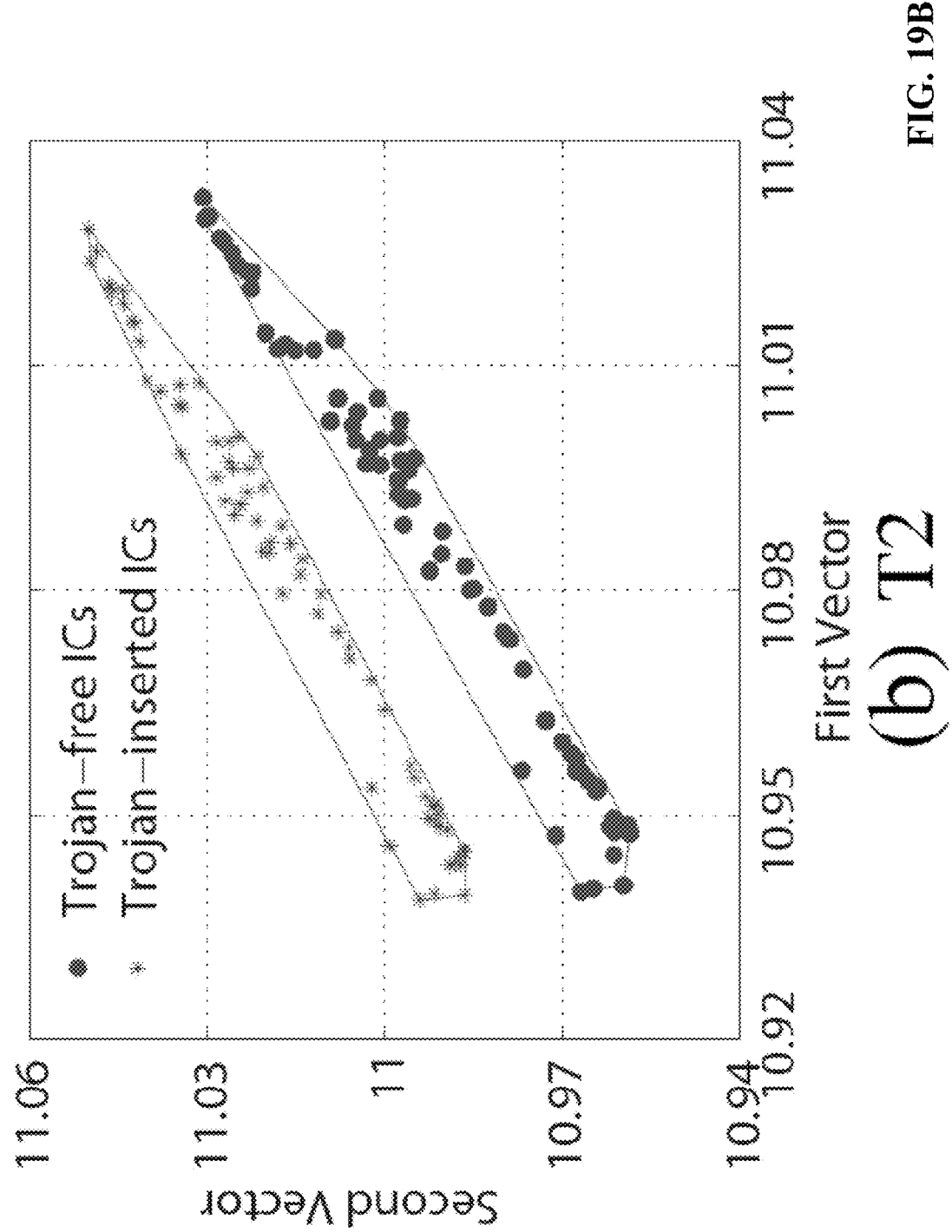
FIG. 19B (b) T2

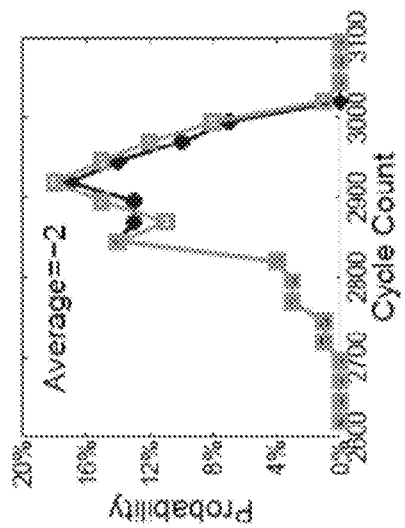 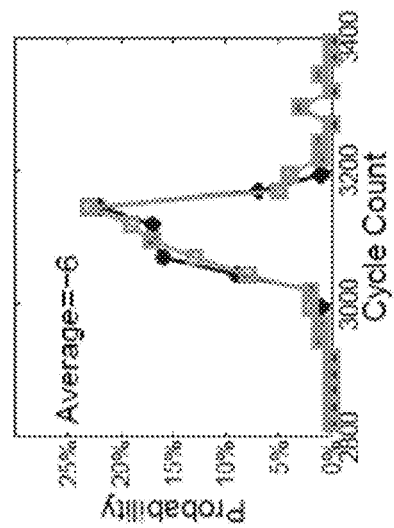
FIG. 20G FIG. 20H FIG. 20I
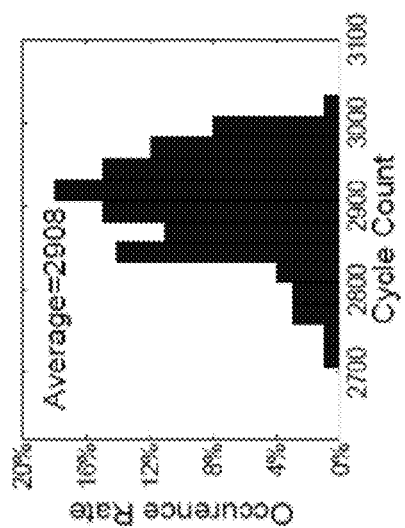 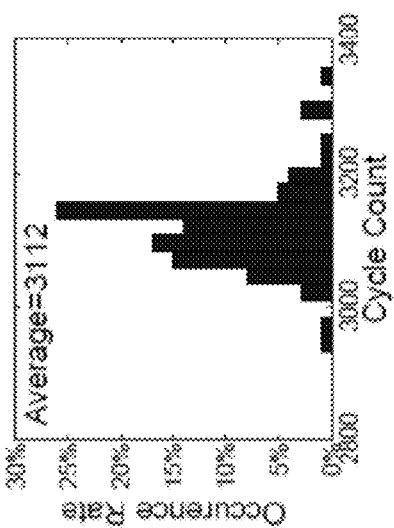
FIG. 20J FIG. 20K FIG. 20L

EMBEDDED RING OSCILLATOR NETWORK FOR INTEGRATED CIRCUIT SECURITY AND THREAT DETECTION

CROSS-REFERENCE TO RELATED APPLICATIONS

This patent application relates to and claims the benefit of U.S. Provisional Patent Application No. 61/449,844, filed on Mar. 7, 2011, which is incorporated herein by reference in its entirety.

STATEMENT REGARDING FEDERALLY SPONSORED RESEARCH

This invention was made with government support under Grant CNS-0844995 awarded by the National Science Foundation. The government has certain rights in the invention.

SUMMARY

In accordance with the purpose(s) of the disclosure, as embodied and broadly described herein, the subject disclosure relates enhanced security features in an integrated circuit (IC) can be accomplished by embedding a ring oscillator network (RON) in the IC and analyzing challenge-response (e.g., digital signatures) applied to the IC at least in part through the RON. The RON embedded in the IC in conjunction with the IC embody a physical unclonable function (PUF). In this specification and annexed drawings, an integrated circuit refers to any chipset architecture, comprising groups of semiconducting junctions, diodes, transistors, logic gates, application-specific integrated circuit(s) (ASIC(s)), filed-programmable gate array(s) (FGPA(s)), digital signal processor(s) (DSP(s)), microprocessor(s), and the like.

In certain embodiments, the disclosure provides a physical unclonable function (PUF) referred to as PE-PUF that takes into account both process variations and environmental variations, which magnify chipset-to-chipset signature randomness and uniqueness. PE-PUF takes into account process variations, temperature, power supply noise, and crosstalk; all these effects generally are significant sources of variations and noise in integrated circuits. A circuit design entity (also referred to as a designer) can select PE-PUF response by applying different input signal patterns. PE-PUF as disclosed herein imposes no routing constraints to the design of an integrated circuit (IC). Gates in PE-PUF can be distributed across the entire chipset and cannot be readily identified/modeled or leak side-channel information. Simulations demonstrate that each IC can be uniquely characterized by PE-PUF with higher secrecy rate when compared to other PUFs that use only process variations.

In additional or alternative embodiments, the disclosure provides a novel on-chip structure including a ring oscillator network (RON), distributed across the entire chipset (or integrated circuit). Such structure embedded in the chipset enables verification of presence or absence of an unintended functional hardware insertion (e.g., a malicious hardware insertion (also referred to as hardware Trojan or Trojan) in the chipset. The RON embedded in the chipset effectively eliminates issue(s) of measurement noise, localizes the measurement of dynamic power, and additionally compensates for the impact of process variations. The disclosure, in one aspect, provides an analysis methodology, comprising various analysis procedures (e.g., statistical data analysis procedures), which combined with data observed in the on-chip RON can permit separation of effects of process variations from effects related to unintended functional hardware insertions, such as a malicious hardware insertion, in the chipset's transient power. Simulation results featuring unintended functional hardware insertions (e.g., malicious hardware insertions) embedded into a benchmark circuit using 90 nm technology, and experimental results on Xilinx Spartan-3E FPGAs demonstrate the efficiency and scalability of the RON architecture for detection of one or more unintended functional hardware insertions.

In one aspect, the disclosure relates to a device comprising a set of one or more ring oscillators embedded in an integrated circuit (IC); a random pattern generator that applies a set of predetermined challenge signal patterns to the IC; and a set of counters, wherein each counter is coupled to one ring oscillator in the set of one or more ring oscillators and determines at least in part a digital signature associated with the IC in response to the set of challenge signal patterns.

In another aspect, the disclosure relates to a plurality of ring oscillators embedded in an integrated circuit (IC); a random pattern generator that applies a set of predetermined challenge signal patterns to the IC; a set of counters, wherein each counter is coupled to one ring oscillator in the set of one or more ring oscillators and determines at least in part a digital signature associated with the IC in response to at least one of the plurality of challenge signal patterns; a first multiplexer that selects a ring oscillator of the plurality ring oscillators; and a second multiplexer that collects data (e.g., output signal) from the ring oscillator of the plurality of ring oscillators.

In an additional or alternative aspect, the disclosure relates to a device for threat detection, the device can comprise a plurality of sensors embedded in an integrated circuit (IC), each sensor of the plurality of sensors can extract one or more parameters indicative of an operational condition of the IC, such as current(s), power, temperatures, or the like. In addition, each sensor can be configured to supply an output signal in response to an input signal applied to the IC. The plurality of sensors can comprise one or more of a leakage current sensor, a charge pump sensor, a transient current sensor, or any combination thereof. Such device also can comprise a random pattern generator unit that applies a set of predetermined challenge signal patterns to the IC, the input signal applied to the IC comprising at least one channel signal pattern of the set of predetermined challenge signal patterns; a set of one or more converters, each converter of the set of one or more converters being functionally coupled to at least one sensor of the plurality of sensors, wherein each converter determines at least in part a digital signature associated with the IC based on a specific output signal of the at least one sensor in response to a specific challenge signal pattern of the plurality of challenge signal patterns. In certain embodiments, at least one converter of the plurality of converters can convert a first type of signal (e.g., digital signal or analog signal) to a second type of signal (e.g., a digital signal). For example, the at least one converter can convert an analog signal to a digital signal (e.g., the converter is an analog-to-digital (A/D) converter). Such A/D converter can be suitable for scenarios in which the plurality of sensors comprises at least one of the foregoing current sensors. For another example, the at least one converter can convert a first digital signal to a second digital signal (e.g., such converter(s) can be a digital-to-digital converter, such as time-to-digital converter(s)). A counter as described herein can be embodied or can comprise a time-to-digital converter.

The device for threat detection also can comprise a first multiplexer that selects a sensor of the plurality of sensors, and a second multiplexer that collects output signal from at least one sensor of the plurality of sensors, and supplies at least a portion of such signal to at least one converter.

In yet another aspect, the disclosure relates to a method comprising applying a set of predetermined challenge signal patterns to a plurality of ring oscillators embedded in an integrated circuit (IC); and generating a digital signature in response to the set of predetermined challenge signal patterns, wherein the digital signature depends on at least one of an environmental factor or a manufacturing process factor.

Additional advantages of the disclosure will be set forth in part in the description which follows, and in part will be apparent from such description and annexed drawings, or may be learned by practice of the disclosure. The advantages of the disclosure can be realized and attained by means of the elements and combinations particularly pointed out in the appended claims. It is to be understood that both the foregoing general description and the following detailed description are exemplary and explanatory only and are not restrictive of the various aspects, features, or advantages of the disclosure.

BRIEF DESCRIPTION OF THE DRAWINGS

The accompanying drawings, which are incorporated in and constitute a part of this specification, illustrate several exemplary embodiment of the disclosure and together with the description, serve to explain the principles of the disclosure.

In FIG. 11A, the illustrated exemplary RO comprises five inverters, whereas in FIG. 11B, the illustrated exemplary RO comprises five NAND gates.

FIGS. 13A and 13C illustrate time dependence of voltage supply (or power supply) of an IC without the malicious hardware modification and an IC comprising the malicious hardware modification. FIGS. 13B and 13D illustrate cycle difference caused by switching of at least one gate present in the malicious hardware modification.

FIGS. 15A-15B illustrate exemplary methods in accordance with one or more aspects described herein.

FIGS. 17A-17L illustrates simulated oscillation cycle distributions of a RON in the presence and absence of a malicious hardware modification (e.g., a hardware Trojan) in the IC comprising the RON in accordance with one or more aspects described herein.

FIGS. 19A-19F illustrate results of analysis of power signatures for various IC comprising a malicious hardware modification and their counterparts without such modification in accordance with one or more aspects described herein.

FIGS. 20A-20L illustrates simulated oscillation cycle distributions of a RON in the presence and absence of a malicious hardware modification in the IC comprising the RON in accordance with one or more aspects described herein.

In FIG. 21A, illustrated results are based at least on PCA, whereas in FIG. 21B, results are based at least on advanced outlier analysis.

FIG. 27A illustrates a Xilinx Spartan-3E FPGA comprising a RON and modified with unintended functional hardware, and FIG. 27B illustrates an Advance Encryption Standard (AES) layout after inclusion of the unintended functional hardware into the Xilinx Spartan-3E FPGA comprising the RON.

DETAILED DESCRIPTION

Figure 1:
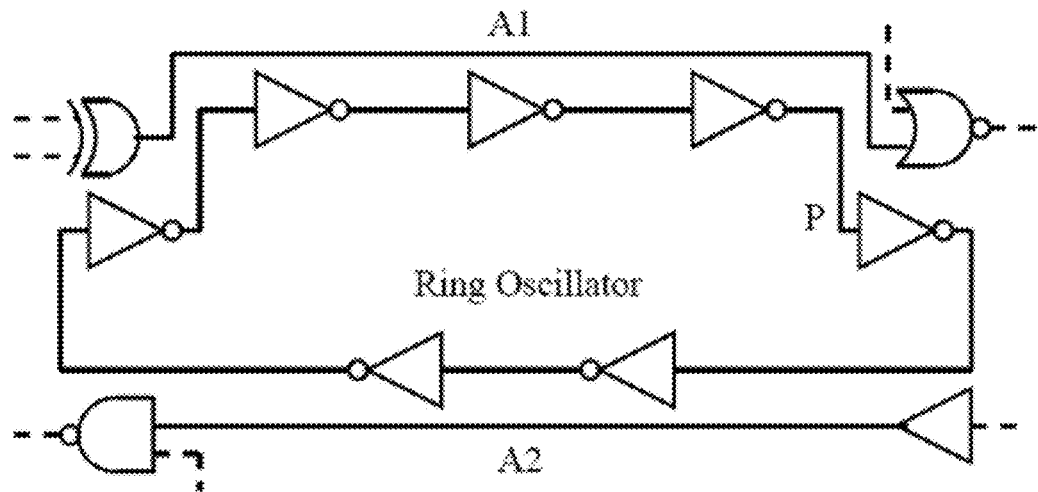
FIG. 1 illustrates an example ring oscillator in accordance with aspects described herein. Nearby interconnects A1 and A2 also are displayed.

The disclosure can be understood more readily by reference to the following detailed description of exemplary embodiments of the disclosure and the Examples included therein and to the Figures and their previous and following description.

Before the present articles, devices, apparatuses, systems, and/or methods are disclosed and described, it is to be understood that the subject disclosure is not limited to specific synthetic methods, specific materials and material combinations, or to particular shapes or morphologies, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an integrated circuit" refers to a single integrated circuit or to combinations of two or more integrated circuits, reference to "ring oscillator" includes mixtures of two or more ring oscillators, which can be coupled either directly or indirectly, reference to "a ring oscillator stage" refers to a single ring oscillator stage or several or to two or more such stages, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject disclosure and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of the subject specification, the word "comprise" and variations of the word, such as "comprising" and "comprises," means "including but not limited to," and is not intended to exclude, for example, other additives, components, integers, steps, acts, and so forth. In addition the terms "including" and "having" are employed in the subject disclosure in the same manner as the term "comprising." "Exemplary" means "an example of" and is not intended to convey an indication of a preferred or ideal embodiment. "Such as" is not used in a restrictive sense, but for explanatory purposes.

Reference will now be made in detail to several exemplary embodiments of a phase-change oscillator and pulse generator in accordance with aspects of the subject disclosure. Wherever possible, the same reference numbers are used throughout the drawings to refer to the same or like parts.

As employed in this specification and annexed drawings, the terms "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a field-programmable gate array (FPGA) or a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably.

The disclosure identifies and addresses, in one aspect, the issue of threat detection, or verification of trustworthiness of integrated circuits (ICs), which can be of critical importance as specific threats, such as unintended functional hardware insertions, can compromise or destroy functionality of ICs bound for critical applications. Integrated circuits (ICs) are becoming increasingly vulnerable to malicious inclusions and alterations (hardware Trojans) due to globalization. Though the IC industry has reduced expenses by outsourcing the fabrication of their ICs, there is a new cost: IC designers are exposed to the security threat imposed by an untrusted fabrication process. These hardware Trojans are characterized by their structures and functionalities. They may leak confidential information to an adversary or potentially disable all or part of an IC at a target time in the field. Hardware Trojans can be constructed using different physical, behavioral, and transient characteristics. Functional tests are typically performed to ensure the chip behaves properly under a subset of all possible input conditions. Automatic Test Pattern Generation (ATPG) methods are used to detect physical faults (stuck-at faults, delay faults, etc.) using the netlist of the originally designed circuit. Since these tests operate on the circuit implied by the Trojan-free netlist rather than the physical circuit a Trojan cannot be detected in this way. Thus, detecting a Trojan with functional tests is unrealistic.

Recently, several approaches have been proposed to identify Trojan-inserted ICs including side-channel signal analysis, increasing Trojan activation probability, and monitoring architectures. Side-channel information such as transient power, current, and delay from threat-free ICs can generate signatures that can be used to verify the chip-under-test (CUT). Yet, measurement noise, process variations, and environmental variations also can affect these parameters and may mask contributions of a hardware threat, such as a malicious functional hardware insertion, to such side-channel signals. In certain scenarios, threat detection can be particularly difficult a hardware threat that is small compared to the entire IC in which such threat is incorporated. Certain conventional technologies for threat detection are based on activation strategies to activate and detect a hardware threat. Yet, the time that may be required to activate (e.g., launch the malicious function of) a hardware threat can be a major concern from an authentication standpoint. For instance, a hardware threat can be designed to activate under exceptionally rare conditions (e.g., a specific 32-bit instruction which would be one of $\approx 2^{32} = 4.295 \times 10^9$ possible combinations). Accordingly, technologies reliant on completely triggering a hardware threat may be ineffective. Such conventional technologies also may fail to detect a hardware threat that may be non-functional. Certain conventional technologies comprise structures to detect hardware threats. For instance, reconfigurable Design-For-Enabling-Security (DEFENSE) logic was embedded into functional designs to implement real-time security monitors. The DEFENSE infrastructure consists of distributed instruments that can be repeatedly configured to dynamically implement different security checks to detect unexpected or illegal behavior.

As discussed in greater detail below, one or more embodiments of devices, apparatuses, systems, or methods of the disclosure relate, in one aspect, to enhanced security features in an integrated circuit can be accomplished by embedding a ring oscillator network (RON) in the IC and analyzing challenge-response (e.g., digital signatures) applied to the IC at least in part through the RON. The RON embedded in the IC in conjunction with the IC can embody or comprise a physical unclonable function (PUF). In an integrated circuit in the subject disclosure refers to any chipset architecture, comprising groups of semiconducting junctions, diodes, transistors, logic gates, ASIC(s), FGPA(s), DSP(s), microprocessor(s), and the like.

The disclosed PE-PUFs can incorporate both process variations and environmental variations, which can magnify, significantly, chip-to-chip signature randomness and uniqueness. PE-PUF takes into account process variations, temperature, power supply noise and crosstalk; all these effects are major sources of variations and noise in modern integrated circuits. Such noises are induced by circuit activity which is generated from applying input patterns (here, also called challenge input patterns). Accordingly, in an aspect, generated noises are controlled rather than arbitrarily imposed by the IC's environment. Integrated circuit designers can select PE-PUF response by applying different input patterns to the IC. The gates in PE-PUF are distributed across the entire chip and cannot be easily identified/modeled or leak side-channel information. Simulation results demonstrate that each IC can be uniquely characterized by PE-PUF with higher secrecy rate when compared to traditional ring-oscillator based PUFs that use only process variations.

In contrast to conventional delay-based PUFs which exploit only process variations for generating unique signatures and thus are constrained by spatial correlation between process parameters, a PE-PUF in accordance with aspects of the subject disclosure is not nearly as vulnerable to be modeled, largely mitigates leakage of information under side-channel attacks, and provides substantial signature uniqueness.

In an additional or alternative aspect, the disclosure relates to an on-chip structure, such as an oscillator network (RON), that can permit detection of unintended functional hardware insertions (e.g., malicious hardware insertions or hardware Trojans). Such detection can be accomplished, in one aspect, by combining measurements of operational characteristics of the on-chip structure with external dynamic measurements. In addition, such detection can exploit power fluctuations caused by the unintended functional hardware insertions. In one aspect, one or more ring oscillators (ROs) can act as power monitors, and are distributed across the entire IC, constitute the RON, which takes into account the noise caused by the Trojan gates and those caused by both inter-die and intra-die process variations. The output of each ring oscillator represents one part of the power signature of the entire IC. With $N_{RO}$ ring oscillators in the IC, a series of power signatures can be generated by the RON. In certain embodiments, an off-chip test equipment can select a ring oscillator to generate the signature, and can disable the RON when the IC operates in functional, or production, mode. The number of ring oscillators, $N_{RO}$, can be adjusted according to the size of the IC and sensitivity to Trojans, thereby scaling the network and optimizing Trojan detection. In one embodiment, results from simulations and implementation in an FPGA demonstrate that the RON combined with statistical data analysis can distinguish effectively the power differences caused by unintended functional hardware insertions (e.g., malicious hardware insertions) from the effects of process variations. Such results can permit identification (or detection) of the unintended hardware insertions in the IC. In scenarios in which the on-chip structure is a RON, such structure presents a small area overhead and can be resilient to removal, tampering, and/or modeling attacks. While various features or aspects of detection of an unintended functional hardware insertion (e.g., a hardware Trojan), and related devices and methodology, are illustrated with a ring oscillator network, it should be appreciated that such features or aspects also can be accomplished with substantially any on-chip structure having one or more sensors that can probe at least one parameter indicative of operational condition of an IC.

The threat detection described herein can account, in one aspect, for the impact of a unintended functional hardware insertion on neighboring cells in an integrated circuit. In an additional or alternative aspect, insertion of ring oscillator component(s) in every row in a standard-cell design (the most widely used design style in current practice) is contemplated. In yet another aspect, high threshold voltage gates can be utilized in an on-chip structure (e.g., on-chip sensor) to improve sensitivity of such structure to noise induced by the unintended functional hardware insertion.

As an example, in an aspect, a device that embodies a PUF sensitive to environmental factor(s) and to manufacturing process factor(s) is provided, wherein the device comprises: a set of one or more ring oscillators embedded in an integrated circuit (IC); a random pattern generator that applies a set of predetermined challenge signal patterns to the IC; a set of counters, wherein each counter is coupled to one ring oscillator in the set of one or more ring oscillators and determines at least in part a digital signature associated with the IC in response to the set of challenge signal patterns. The set of one or more ring oscillators can be distributed throughout the IC; ring oscillators in such set can be embodied in gates (e.g., NAND gates) or inverters, or combinations thereof. The set of one or more ring oscillators introduces an area overhead in the IC, wherein the area overhead depends at least on the IC architecture and a number of ring oscillators in the set of one or more ring oscillators.

The set of counters can supply data representative of the digital signature associated with the IC. In certain embodiments, the digital signature is a binary multi-bit word having a length that is at least a cardinality of the set of one or more ring oscillators minus one. In addition or in the alternative, the digital signature is a binary multi-bit word having a length that equals the product of (a) the cardinality of the set of one or more ring oscillators minus one (1) and (b) a cardinality of the set of challenge signal patterns. In certain embodiments, at least one ring oscillator of the set of one or more ring oscillators comprises a plurality of stages, and wherein a stage of the plurality of stages is one of an inverters or a logic gates. In additional or alternative embodiments, at least one ring oscillator of the set of one or more ring oscillators comprises three inverters.

The device also can comprise a control unit that enables (e.g., trigger, initiates, turns on) a counter in the set of counters in response to application of an initial predetermined challenge signal pattern. The control unit also can disable a counter upon or after the set of predetermined challenge signal patterns is applied. At least one counter of the set of one or more counters is a 5-bit counter; however, counters can comprise other bit lengths.

In addition or in the alternative, the device also can comprise an analysis component that generates the digital signature based at least on the data. In an embodiment, to generate the digital signature, the analysis component can assign a binary value to a bit of the digital signature based on a difference amongst a first cycle count of a first counter and a second cycle count of a second counter, wherein the first counter and the second counter monitor adjacent ring oscillators. The binary value can be a logic "1" for a first cycle count that is greater than the second cycle count, and a logic "0" otherwise.

Various challenge signal patterns can be utilized to probe (e.g., authenticate) the device. Certain challenge signal patterns can comprise one or more bits; for instance, at least one challenge pattern signal of the set of challenge signal patterns associated with the device can be a 30-bit random pattern. A challenge signal pattern can be applied at various frequencies. For example, in the foregoing device, one or more challenge signal patterns of the set of challenge signal patterns can be applied at a frequency of about 1 GHz.

In another aspect, a device that enables detection of unintended functional hardware modification(s) (e.g., malicious functional hardware insertion, or hardware Trojan) of an integrated circuit is provided. The device can comprise: a plurality of ring oscillators embedded in an integrated circuit (IC); a random pattern generator that applies a set of predetermined challenge signal patterns to the IC; a set of counters, wherein each counter is coupled to one ring oscillator of the plurality of ring oscillators and determines at least in part a digital signature associated with the IC in response to one of the plurality of challenge signal patterns; a first multiplexer that selects a ring oscillator of the plurality of ring oscillators; and a second multiplexer the codes the ring oscillator. As described supra, at least one ring oscillator of the plurality of ring oscillators comprises one or more gates (e.g., NAND gates) or one or more inverters. In addition, the set of one or more ring oscillators introduces an area overhead in the IC, and wherein the area overhead depends at least on the IC architecture and a number of ring oscillators in the set of one or more ring oscillators. The set of counters supplies data representative of the digital signature associated with the IC. In an embodiment, the digital signature is a power signature related to the IC and depends on at least one of a manufacturing process factor (etching, photolithography, doping, ion injection, etc.) or an environmental factor (variation in power supply voltage and related noise, variation in temperature; variation crosstalk due to parasitic capacitive coupling, etc.). The random pattern generator can apply a predetermined challenge signal pattern of the plurality of predetermined challenge signal patterns to the IC for a number of instances that is equal to the number of elements in the plurality of ring oscillators. The predetermined challenge signal pattern can be applied according to a schedule or as part of a sequence of applied challenge signal patterns.

In certain embodiments, the device further comprises an analysis component that generates the digital signature based at least on the data. In an implementation, the analysis component can analyze data related to a first plurality of power signatures produced in response to the predetermined challenge signal pattern in accordance with at least one of a simple outlier analysis, a principal component analysis, or an advanced outlier analysis—such types of analyzes are implemented in accordance with aspects described herein. In an additional or alternative implementation, the analysis component can compare an outcome of analysis of the data related to the first plurality of power signatures and benchmark data for a benchmark IC without an unintended functional hardware modification (e.g., malicious functional hardware insertion, or a hardware Trojan), and generates a comparison outcome; the analysis component can indicate presence or absence of the unintended functional hardware modification in the IC based on the comparison outcome.

In yet another aspect, a method is provided, wherein the method comprises: applying a set of predetermined challenge signal patterns to a plurality of ring oscillators embedded in an integrated circuit (IC); and generating a digital signature in response to the set of predetermined challenge signal patterns, wherein the digital signature depends on at least one of an environmental factor or a manufacturing process factor. The method also can comprise generating the set of predetermined challenge signal patterns. In addition or in the alternative, the method can further comprise analyzing a plurality of digital signatures; and extracting an indication of architectural integrity of the IC based on an outcome of the analyzing act. In one or more embodiments, the analyzing act can comprise analyzing data related to the plurality of digital signatures according to at least one of the simple outlier analysis, the principal component analysis, or the advanced outlier analysis in accordance with aspects described herein.

A. Environmental Variations Impact on Ring-Oscillator PUF a) Randomness in Oscillation Frequency Conventional, simple ring-oscillator (RO) PUFs generally contain an odd numbers of inverters. Oscillation frequency of one such RO PUF is determined by the sum of inverters delay. In certain embodiments, it is possible to trace the effect of process variation or environmental variations on inverter delay ($t_{inv}$) using first-order complementary metal-oxide-semiconductor (CMOS) inverter delay equation as, $$t_{inv} = \frac{0.52 C_L V_{DD}}{\frac{W}{L_{eff}} \frac{\mu \varepsilon_{ox}}{t_{ox}} V_{DSAT}(V_{DD} - V_T - V_{DSAT}/2)} \quad (1)$$

where $C_L$ is inverter's load capacitance, $V_{DD}$ is supply voltage, W is gate width, $L_{eff}$ is effective channel length, μ is the mobility of carriers, $\varepsilon_{ox}$=3.97×$\varepsilon_0$=3.5×10$^{-11}$ F/m, $t_{ox}$ is oxide thickness, $V_{DSAT}$ is the saturation source-drain voltage and $V_T$ is threshold voltage. The parameter $$k' = \frac{\mu \varepsilon_{ox}}{t_{ox}}$$

can be referred to as the transconductance of the inverter. In general, process variations can make transistor parameters $C_L$, W, $L_{eff}$, $V_{DSAT}$, and $t_{ox}$ differ randomly on a manufactured IC. In addition, parameters $V_{DD}$, $V_{DSAT}$ and $V_T$ can be susceptible to environmental variations, such as temperature, supply voltage, and crosstalk. Hence, without wishing to be bound by theory or modeling, inverter delay $t_{inv}$ would be a random value due to within-die and die-to-die process and environmental variations. The oscillation frequency $f_{os}$ of a ring oscillator with $N_{inv}$ inverters can vary as well due to the variations as shown in Equation 2.

$$f_{os} = \frac{1}{2 N_{inv} t_{inv}} \quad (2)$$

Therefore, individual inverter delay variations can be accumulated and displayed in oscillation frequency fluctuation.

b) Analyzing the Impact of Environmental Variations on Oscillation Frequency

In modern designs, variations in supply voltage or power supply, temperature, and crosstalk can contribute primarily to on-chip environmental variations. Such variations or effects generally are input-pattern dependent; they differ from one pattern to another. Also, they are sequence dependent, e.g., the following patterns impact will depend on the previous pattern that was applied to the IC. The three major effects can be characterized, at least in part, as follows. Power Supply Noise—When an input pattern is applied to an integrated circuit, it will create a large number of switchings in the circuit. The switching will increase dynamic power and cause voltage drop on power lines and voltage increase on ground lines. This effect is known as power supply noise. When the voltage reaching a gate changes, it will change the delay characteristics of the gate. Temperature.—Increase in power also increases the temperature over time depending on the type and number of patterns applied to the circuit. Temperature distribution depends on the location of switchings and distribution of power consumption in the circuit. Crosstalk.— As technology feature size scales down, interconnect spacing and width are also being reduced. However, in order to keep the resistance low, the thickness of the wires is not scaled at the same rate. This produces tall sidewalls between long parallel interconnects separated by very little space, which creates a parasitic coupling capacitance between wires. At least due to this fact, crosstalk has become a significant contributor to signal integrity problems in modern designs.

To illustrate and verify environmental variations' effect on a ring oscillator, an exemplary 7-inverter ring oscillator (RO) with two interconnects nearby (labeled A1 and A2 in FIG. 1) in 90 nm technology node is designed and simulated it by a suitable suite of circuit design applications or circuit simulation applications, such as Hspice. FIG. 1 illustrates such exemplary circuit. In an aspect, in FIG. 2, the supply voltage of the 7 inverters on the ring oscillator are swept from about 1.12 V to about 1.2 V in voltage intervals of about 0.01 V. In another aspect, FIG. 3 illustrates oscillation variation when temperature of the RO changes from about −35° C. to about 75° C. in temperature intervals of about 5° C. In yet another aspect, FIG. 4 displays the oscillation rising edge variation at observation point P in FIG. 1 from about 11.1 ns to about 11.3 ns with interconnect A1 rise arrival time varying in 0.2 ns interval. In simulation(s) that yield results in FIGS. 2-4, A2 is maintained quiescent. The bold line in FIG. 4 represents crosstalk-free oscillation waveform, whereas other lines represent waveforms affected by crosstalk effects. It is noted that in FIG. 4 the trailing character "n" appended to each noted value in the time (t) axis represents the "nano" scale factor 10$^{-9}$.

Figure 2:
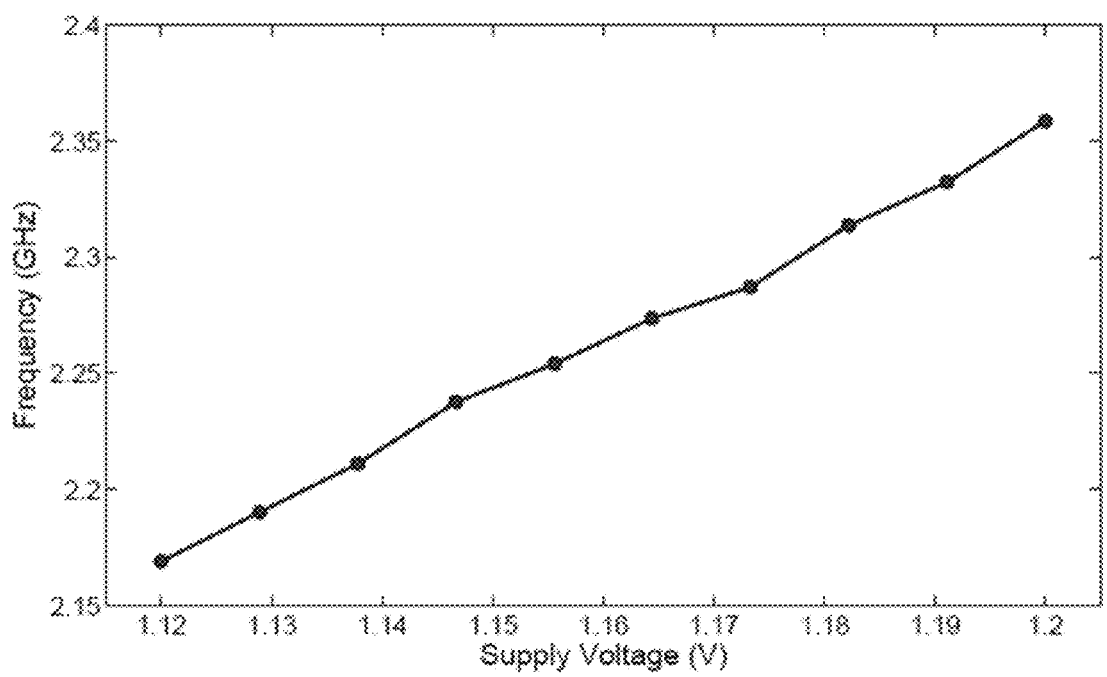
FIG. 2 illustrates an example chart of frequency of a ring oscillator as a function of supply voltage (e.g., supply voltage that powers an integrated circuit comprising the ring oscillator) in accordance with aspects described herein.
Figure 3:
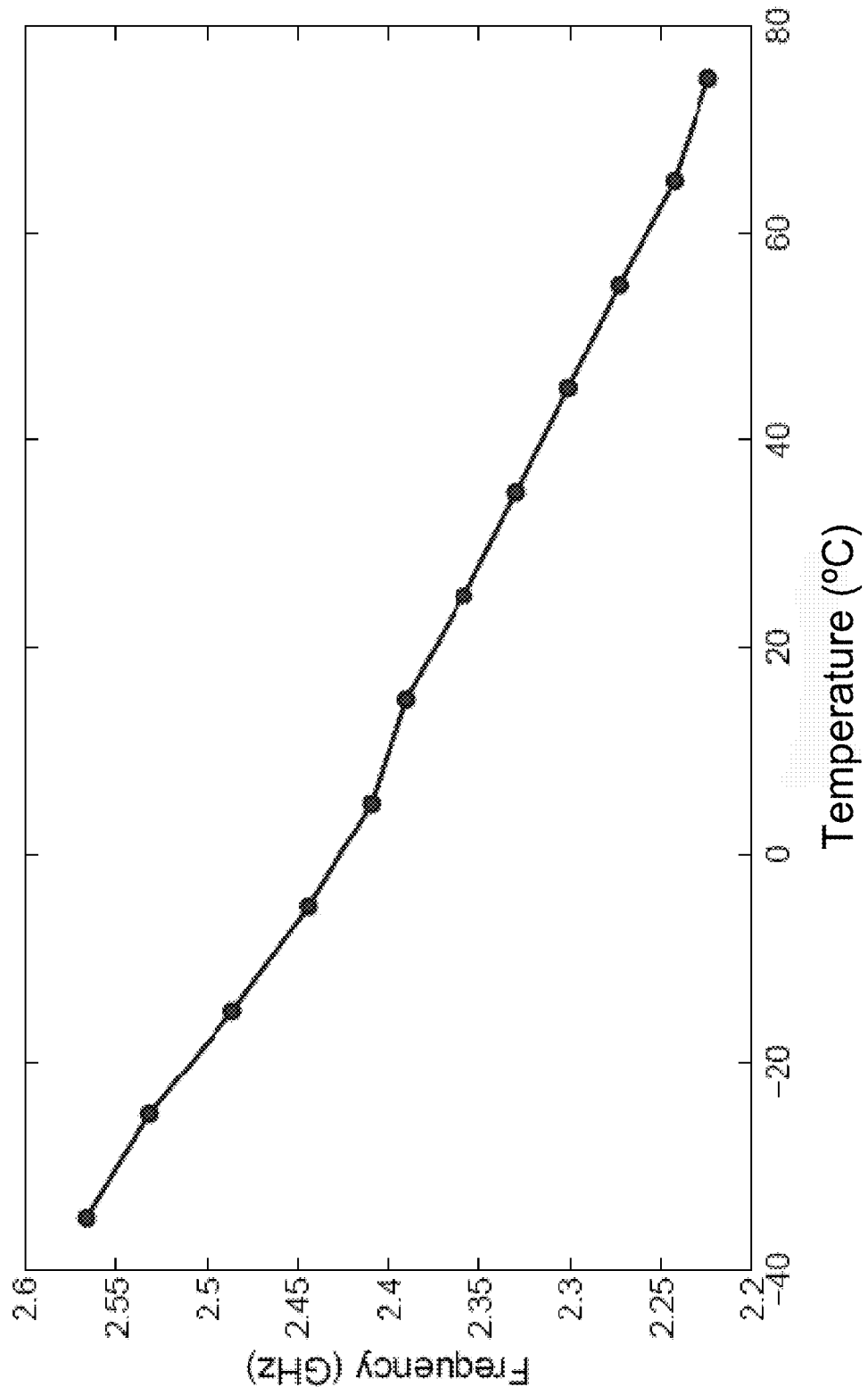
FIG. 3 illustrates an example chart of frequency of a ring oscillator as a function of temperature of an IC comprising the ring oscillator in accordance with aspects described herein.
Figure 4:
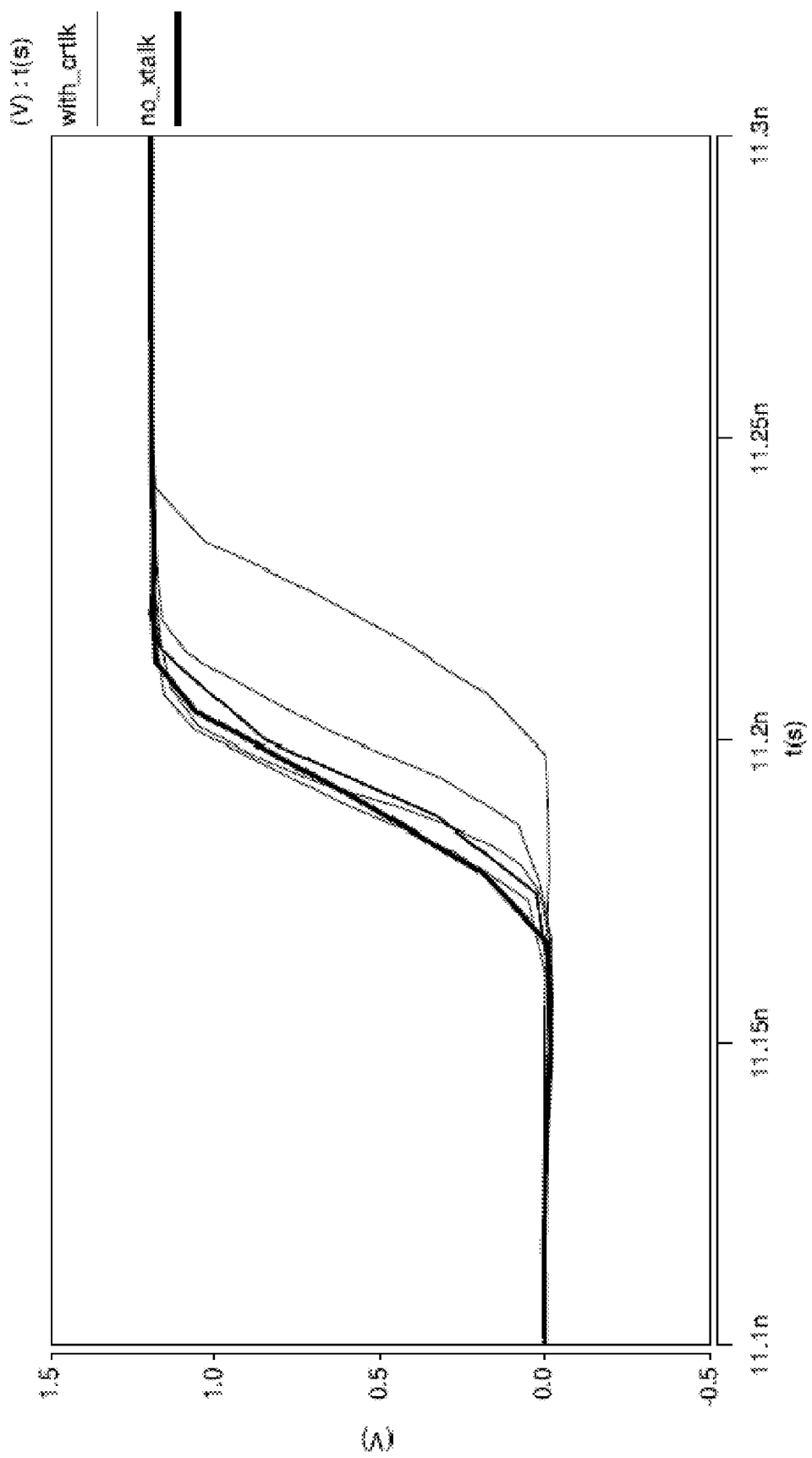
FIG. 4 illustrates an example chart of waveform amplitude rise in of a ring oscillator as a function of time in an IC comprising the ring oscillator in accordance with aspects described herein. As illustrated, effects of parasitic capacitive coupling amongst functional elements of the IC (also referred to as crosstalk effects) affect onset and rise time of the waveform amplitude rise.

In an aspect, FIGS. 2-4 convey that oscillation frequency can change significantly with change in temperature, supply voltage, and crosstalk. Oscillation frequency also can be impacted "directly" by crosstalk effects between the switching network on nearby network(s), or "indirectly" when crosstalk changes the arrival time of transitions in the circuit which impacts the distribution of voltage drop in the circuit. That will, in turn, impact ring oscillator's frequency.

The final effect to consider in PE-PUF is process variations. Since traditional PUFs only take process variations into account, during IC authentication, the entire circuitry is in idle mode while ring oscillator operates. However, when the entire circuit operates at the same time as PUF, as in PE-PUF, the process variations exist in all the components (e.g., gates and interconnects) in the entire circuit would impact the operation of the ring oscillators. Without wishing to be bound by theory or modeling, this is believed to be due to the fact that process variations would impact power supply noise distribution since it will impact the switching arrival times on circuit nets. It will impact the temperature distribution and crosstalk in a similar manner as well. Thus, environmental variations are distinct from chip to chip. With technology shrinking, manufacturing randomness on wire, gate, and layer dimensions are less understood and more uncontrollable. The manufacturing randomness results in unpredictable unit resistance, capacitance and inductance, which means even applying same patterns to different chips can induce different temperature, voltage drop, and crosstalk.

B. PE-PUF

In the subject disclosure, a PUF incorporates both process (P) variations and environmental (E) variations to increase randomness and uniqueness. Thus, a PUF in accordance with the subject disclosure is referred to as PE-PUF. In an aspect, signature of a PE-PUF signature is determined not only by process variations inherent in PUF circuitry but also by patterns of input signal (e.g., voltage, current). During or after authentication process, a response of the PE-PUF can be collected as one or more input patterns are applied to the IC that comprises the RON and thus embodies the PE-PUF. Application of the one or more input patterns create environmental variations that are controlled. Any functional input patterns can be used as a challenge to PE-PUF. In modern designs with hundreds of inputs, the challenge-response pair count could be unlimited or at least effectively unlimited for a specific implementation or embodiment. IC input patterns are known and chosen only by designers therefore, the adversary will not have access to PUF responses. Also, since sequence of vectors is extremely important in generating switching in the circuit to induce environmental variations, it makes it much more challenging for the adversary to model the PE-PUF and identify the right input patterns. Note that in PE-PUF, the challenges are not applied to the PUF rather they are applied to the circuit.

a) Exemplary PE-PUF Architecture

In scenarios in which a PE-PUF is impacted by variations, either process variations or environmental variations, or both, an accumulated delay difference can expressed as oscillation count $N_{count}$ in a time frame T. Without wishing to be bound by theory or simulation, $N_{count}$ can be determined as $$N_{count} = \frac{T}{2N_{inv}t_{inv}} \quad (3)$$

In Eq. (3), T represents the number of input patterns applied to the circuit based on designer's chosen application frequency. In an exemplary scenario in which process/environmental variations change one inverter's delay by $\Delta t$, and without wishing to be bound by theory or modeling, the impact of such inverter on $N_{count}$, denoted as $\Delta N_{count}$, will be calculated by $$\Delta N_{count} = \frac{T}{2N_{inv}t_{inv}} - \frac{T}{2(N_{inv}t_{inv} \pm \Delta t)} \quad (4)$$
$$\approx \pm \frac{T\Delta t}{2N_{inv}^2 t_{inv}^2}$$

From Eq. (4), it can be seen that for certain time frame T, a smaller $N_{inv}$ and $t_{inv}$ means a higher sensitivity of $N_{count}$ to delay variation $\Delta t$ caused by process/environmental variations. In PE-PUF, each ring oscillator is composed of only 3 small inverters and an AND gate to enable/disable the oscillation. It should be appreciated that while the foregoing discussion is directed to ring oscillators comprising inverters, similar expressions can be obtained for ROs with other types of oscillation stage elements.

Figure 5:
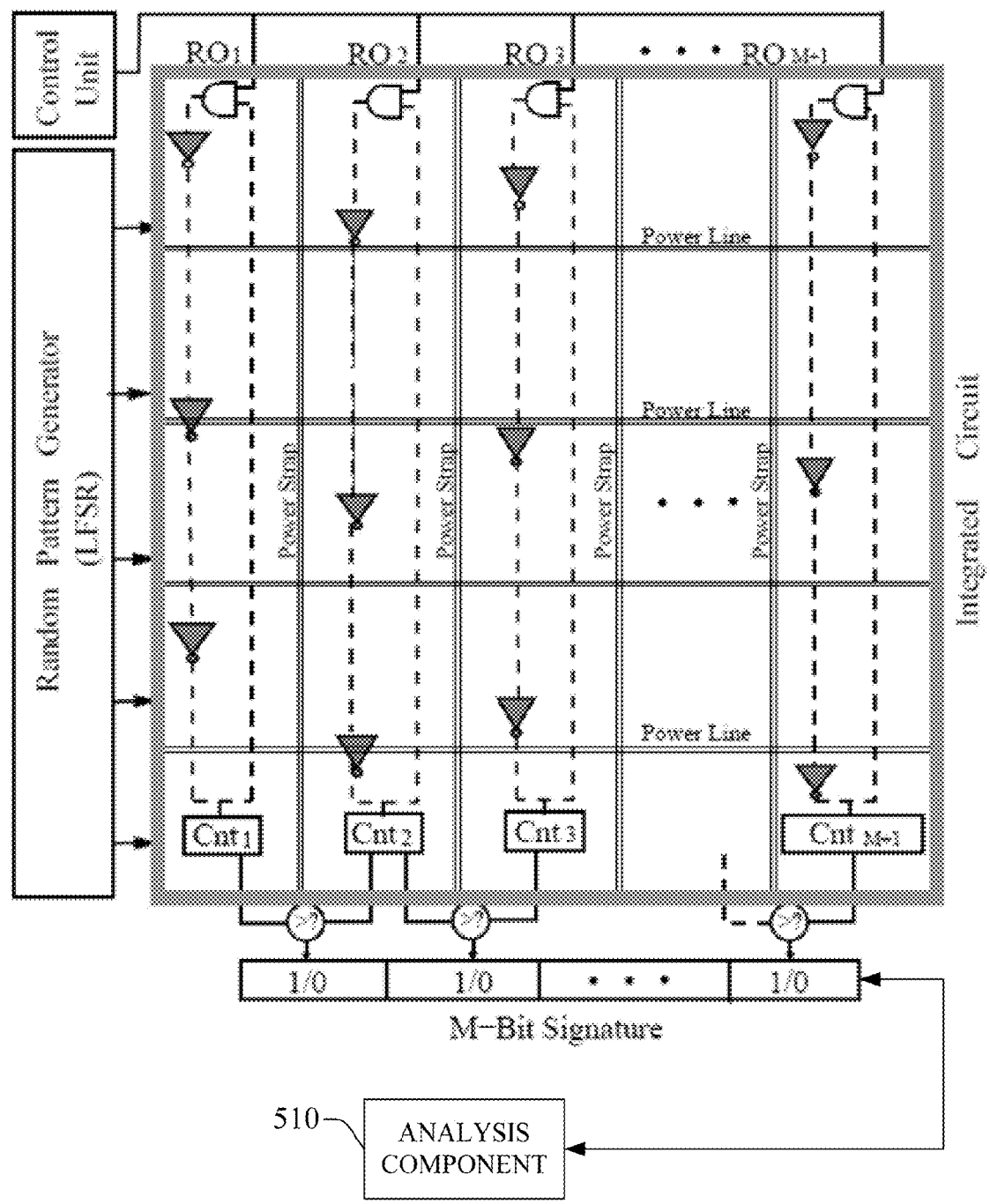
FIG. 5 illustrates an example device comprising a ring oscillator (RO) network embedded in an IC in accordance with aspects described herein.

FIG. 5 illustrates the architecture of an exemplary PE-PUF in accordance with aspects of the subject disclosure. The exemplary PE-PUF comprises a plurality of M+1 3-inverter oscillators to generate M-bit signatures, wherein M is a natural number. In the illustrated embodiment, one counter is coupled (e.g., directly connected) to each ring oscillator. In an aspect, the three (3) inverters in a ring oscillator are distributed, or separated, across the whole die to make variations between different inverters large. The long interconnect between inverters is a good candidate for crosstalk effect and interconnect variations. In another aspect, a linear feedback shift register (LFSR) in production test can be reused to apply internal random patterns as challenges. It should be appreciated that in alternative or additional embodiments, a pseudo-random pattern generator unit (also referred to as pseudo-random pattern generator) can be included (e.g., coupled to or integrated into) a PE-PUF in accordance with the subject disclosure. In certain embodiments, a strict or true random generator as described herein also can be employed. For simplicity, ground lines are not shown in FIG. 5. A control unit can control a portion of or the entire identification and authentication procedure. During such procedure, predetermined random seed(s) can be selected from a group of random seeds known exclusively to an entity (a human entity, a machine entity, etc.) that conducts the identification and authentication procedure. The LFSR, or any other pseudo-random pattern generator functionally coupled to the PE-PUF, then can generate input signal patterns according to its random seeds scanned in, and apply the input signal patterns to the circuit to induce or otherwise cause noise.

b) Exemplary PE-PUF Operation

Figure 6:
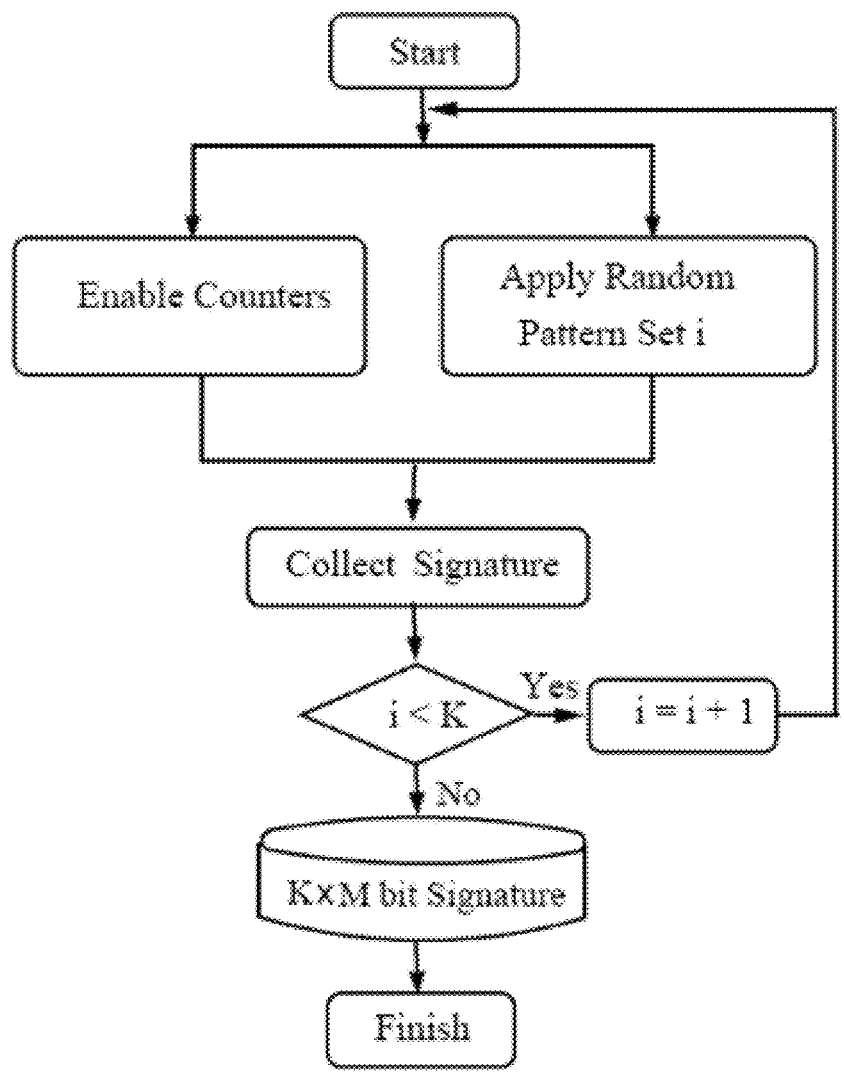
FIG. 6 illustrates an example flowchart of generation of a digital signature in accordance with one or more aspects of the disclosure.

A challenge set for a PE-PUF is a functional pattern set generated by LFSR (or a pseudo-random pattern generator functionally coupled to the PE-PUF). The responses are collected by comparing neighboring (e.g., adjacent) ring oscillators after a pattern set is applied. In an aspect, a pattern set is defined as N patterns that are applied by LFSR (or a pseudo-random pattern generator functionally coupled to the PE-PUF), where N is a natural number; as an example, N=4 is a suitable number of patterns and is employed to illustrate various features of the subject disclosure. Comparing neighboring (e.g., adjacent) oscillators can include comparing oscillation counts between $RO_1$ and $RO_2$, $RO_2$ and $RO_3$, ..., and $RO_M$ and $RO_{M+1}$. In a scenario in which the oscillation count for $RO_{i-1}$ is greater than that of $RO_i$, a logical "1" value is generated at the output line of $RO_i$; the index i is a natural number. In the alternative scenario, e.g., the oscillation count for $RO_{i-1}$ is either equal to or less than that of $RO_1$, a logical "0" is generated. In one or more embodiments, a PE-PUF with M+1 oscillators can generate an M-bit signature (e.g., digital signature) after one pattern set is applied. After applying K sets of patterns (K being a natural number), a signature of length K×M can be generated for the IC under authentication. FIG. 6 presents a flowchart of an exemplary method for generating a signature for a PE-PUF in accordance with aspects described herein is shown in.

c) Reconfiguration of a PE-PUF

Traditional RO-based PUFs only sense process variations. Thus, signature of such PUFs is predefined during manufacturing process and cannot be changed by designers—the signature is input-pattern independent. In contrast, a PE-PUF in accordance with the subject disclosure can sense at least one of random environmental variations and process variations and, in response, such PE-PUF can translate such variations into a digital signature. Accordingly, at least one advantage of PE-PUFs as described herein is that environmental variations can be changed by the random input pattern sets selected and applied by an entity (human operator, machine operator, or otherwise) that conducts identification or authentication procedure for the PE-PUFs. Thus, in contrast to conventional RO-based PUFs, a signature of a PE-PUF of the subject disclosure can be determined by the entity (e.g., a designer) that probes the PE-PUF. In an aspect, various random patterns can be applied to the IC, wherein LFSR or a pseudo-random pattern generator can generate the various patterns utilizing various random seeds and can apply such patterns. In another aspect, the length of signatures also can be changed by applying different number of pattern sets. Such an aspect makes it substantively difficult for an adversary entity (human, machine, or otherwise) to obtain a PE-PUF signature.

C. Simulations and Analysis

In an embodiment, a PE-PUF with M=17 ring oscillators is implemented on ISCAS'89 s9234 benchmark in 90 nm technology node (e.g., gates, diodes, transistors, or the like). In an aspect, challenge input patterns can be 30-bit random patterns that are applied to 30 primary inputs. The patterns are applied at a frequency of 1 GHz. Yet, it should be appreciated that that challenge input patterns with size other than 30 bits are contemplated, and so are application frequencies other than 1 GHz. In such embodiment, the circuit has very short paths. In another aspect, four random patterns exist in each pattern set. Thus, application of each pattern set spans 4 ns (e.g., T=4 ns). It should be appreciated that selection of four (4) random patterns to form a patterns set can keep counter size small and at the same time make ring oscillators (RO) sense enough environmental variations leading to sufficient counter value variations in order to have adequate variability sensitivity. It also should be appreciated that pattern set of sizes other than four random patterns also are possible. In yet another aspect, 17 5-bit counters are enabled when the first pattern in a pattern set is applied and disabled after 4 ns, when the entire pattern set has been applied completely. After a pattern set is applied (e.g., Q random patterns have been applied at a frequency f, with Q a natural number), the contents of neighboring (e.g., adjacent) counters are compared and a 16-bit PE-PUF signature is generated. It is noted that length of the signature generally equals M−1. The final signature length is determined by the number of applied pattern sets K, and it would be of length (M−1)×K=16×K bits. The whole circuit (e.g., IC and RON) behavior including all 17 PE-PUFs are simulated by a circuit design and simulation tool. In certain implementation the Synopsys Nanosim tool from Synopsys Inc. of Mountain View, Calif., was employed even though most any other suitable tool, such as custom design suite of software applications, Cadence, Mentor Graphics, or Magma) may be employed for simulations of the described PE-PUF.

a) Attack Analysis

Figure 7:
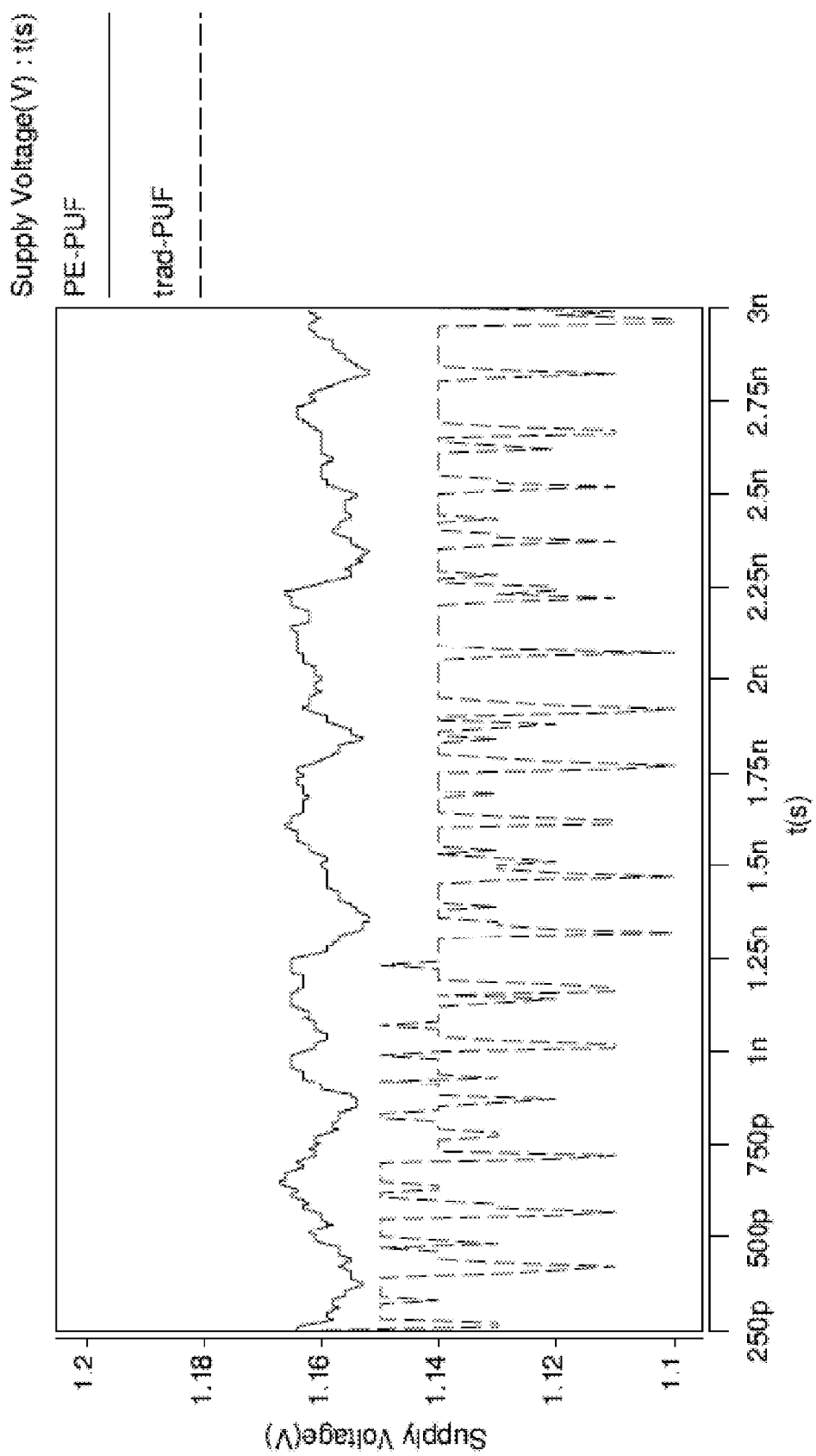
FIG. 7 illustrates an example chart of supply voltage as a function of time for a traditional (trad.) RO physical unclonable function (PUF) and a PUF in accordance with one or more aspects of the disclosure.

Oscillations of ROs in a traditional ring-oscillator-based PUF usually are located in pairs next to each other. In a scenario in which a PUF is employed for on-chip key generation, the PUF can be susceptible to power-based side-channel attacks. In such scenario, oscillation frequency information can be accessed through implementation of such attacks. As an illustration, the dash line in FIG. 7 represents the supply voltage waveform of a power pad near a traditional RO-based PUF. From such power waveform, the oscillation period can easily be analyzed by measuring the distance of valley peaks or via other type of analysis, such as Fourier decomposition.

After an adversary obtains oscillation frequencies, obtaining the PUF signature becomes a substantively simpler task. Two ring oscillators are placed in close proximity of power pad that results in large voltage drop on the power pad as seen in FIG. 7. It is noted that in FIG. 7 the trailing character "n" appended to each noted value in the time (t) axis represents the "nano" scale factor $10^{-9}$.

Figure 8:
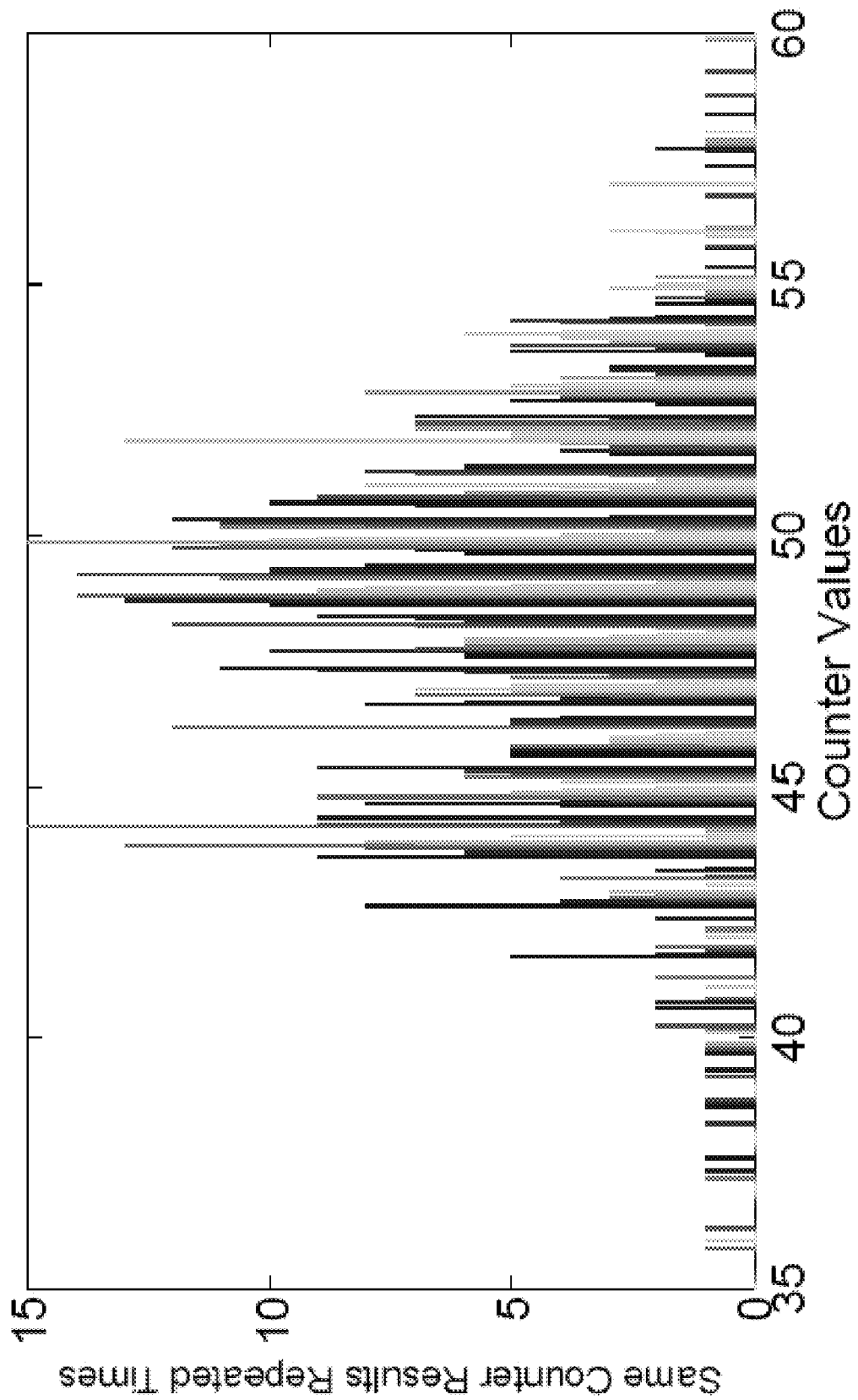
FIG. 8 illustrates a chart of a histogram of oscillation counter values obtained in response to application of challenge signal patterns to an IC in accordance with one or more aspects described herein.

In contrast to conventional, or traditional, RO-based PUFs, a PE-PUF in accordance with the subject disclosure has at least two primary advantages when responding to power side-channel attacks. (1) In an embodiment, each ring oscillator in the PE-PUF can operate with a small number of oscillator stages (e.g., three inverters) and such stages (e.g., inverters) can be separated across the whole die as illustrated in FIG. 5. The solid line in FIG. 7 represents the power trace of the same power pad when PE-PUF is employed. Compared with the power trace of conventional, or traditional, RO-based PUF, the oscillation frequency information is completely or substantially completely masked by the power supply noise. (2) The oscillation frequency highly depends at least on input patterns which are predetermined and available (e.g., known) only to a designer entity (human, machine, or otherwise) that defined the input patterns for identification and authentication of the PE-PUF. FIG. 8 reveals that the counters' values of ring oscillators in a PE-PUF vary randomly when applying 1500 different random pattern sets. Accordingly, even in a scenario in which an adversary entity (human, machine, or otherwise) can make the ring oscillators in the PE-PUF oscillate and find its power pad, a signature generated by the PE-PUF in response to an challenge input pattern is be different than the signature obtained in response to application of pattern sets available to a designer entity (human, machine, or otherwise), unless the challenge input pattern is one of the predetermined pattern sets available to the designer entity. It should be noted that a single pattern set applied at different frequencies $\{f_1, f_2 \ldots f_J\}$ (with J>1 and a natural number) can result in different environmental variations in the PE-PUF circuit adding another layer of security to PE-PUF.

Figure 9:
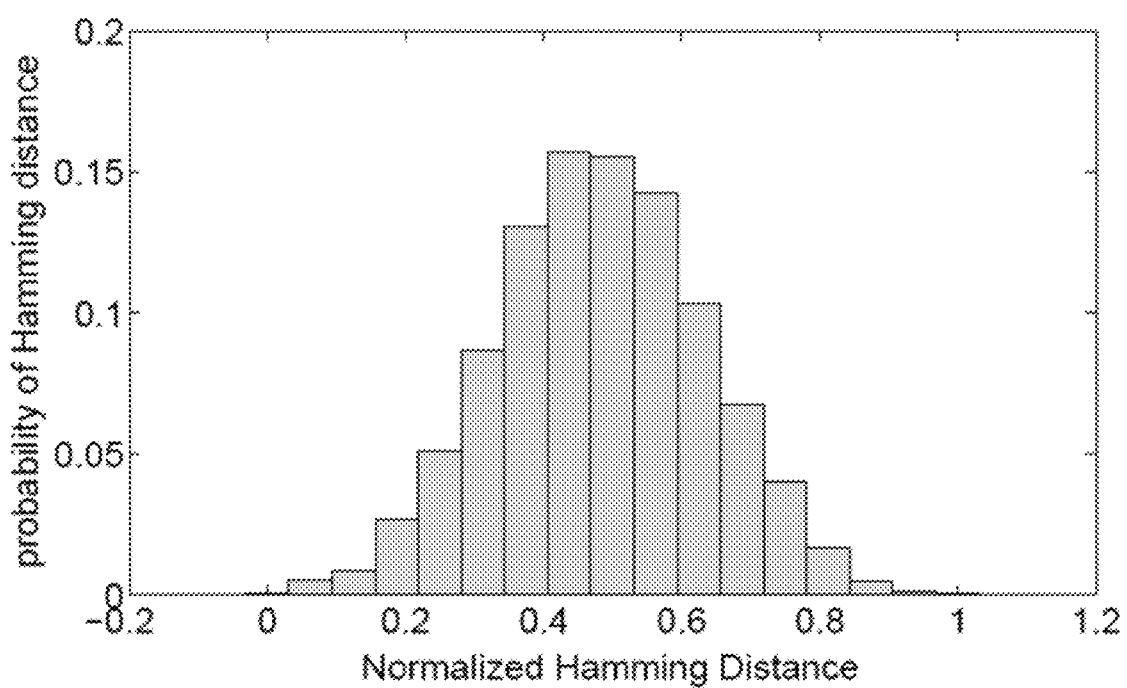
FIG. 9 illustrates a chart of probability distribution of Hamming distance as a function of normalized Hamming distance for digital signatures generated in accordance with aspects described herein.
Figure 10A:
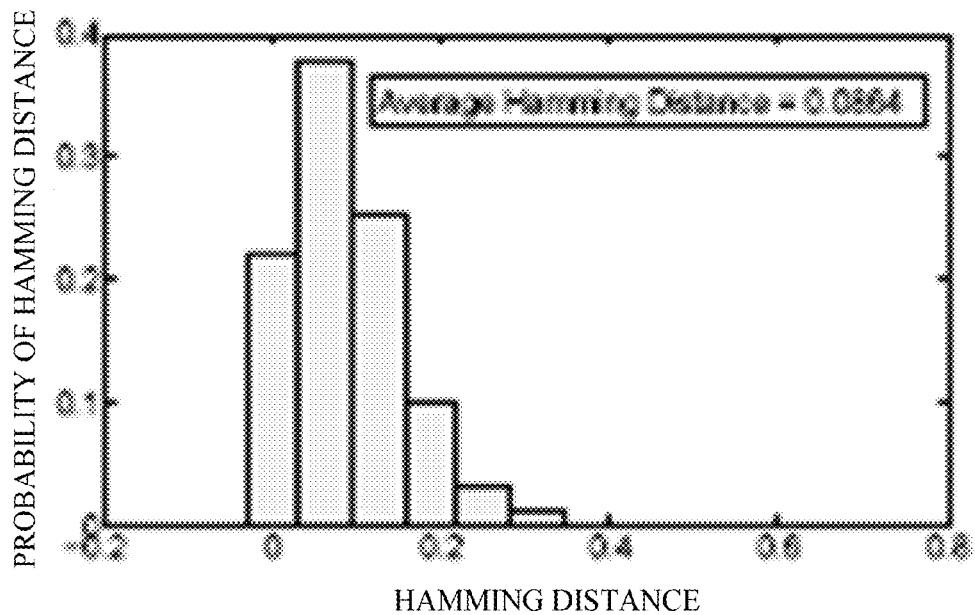
FIGS. 10A-10J illustrate probability distribution of Hamming distance and average values of Hamming distance for digital signatures generated in a PUF in accordance with aspects described herein.
Figure 10B:
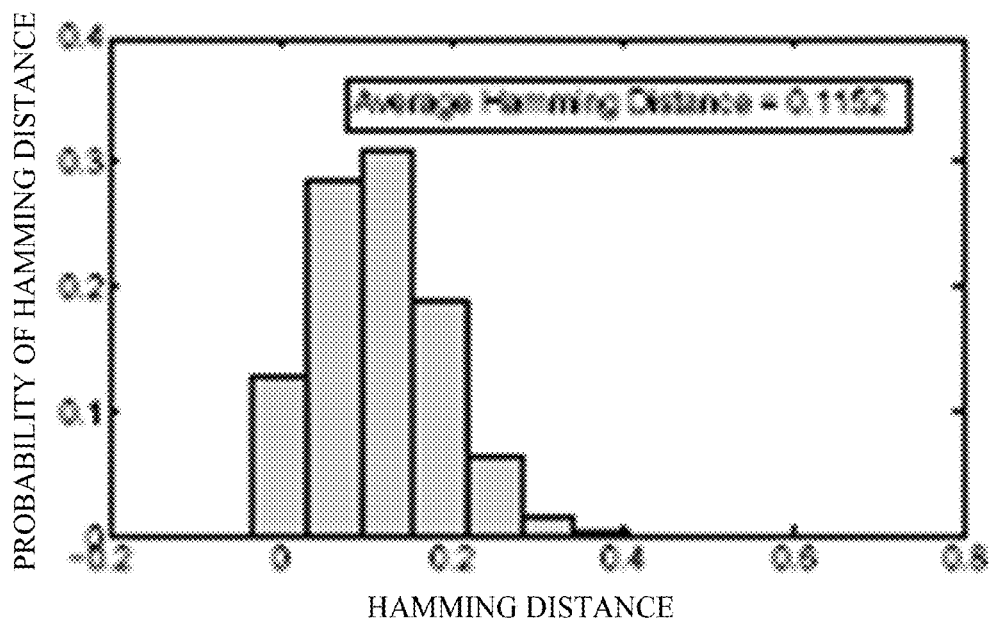
Figure 10C:
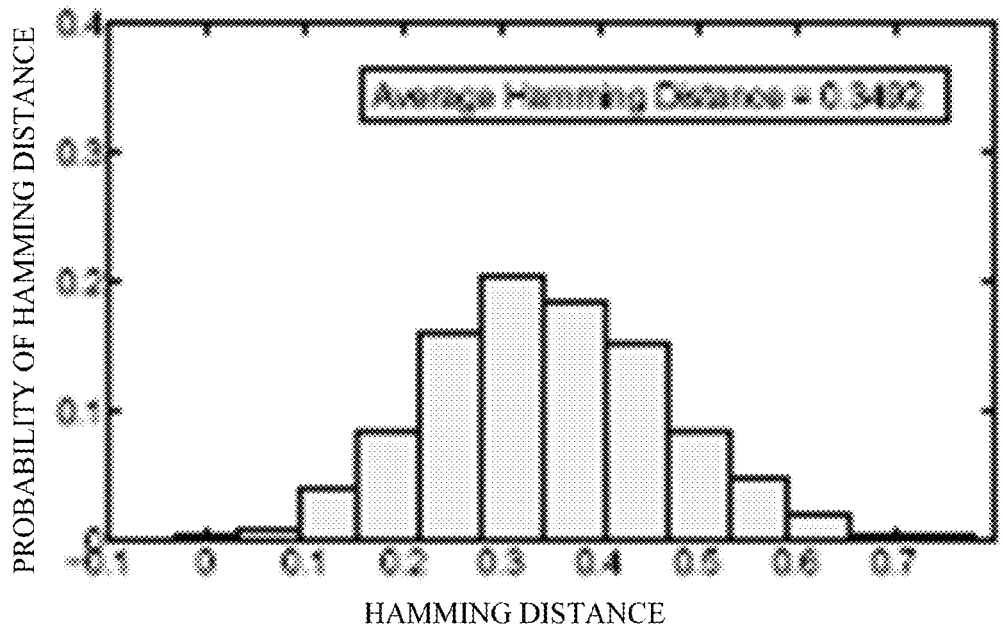
Figure 10D:
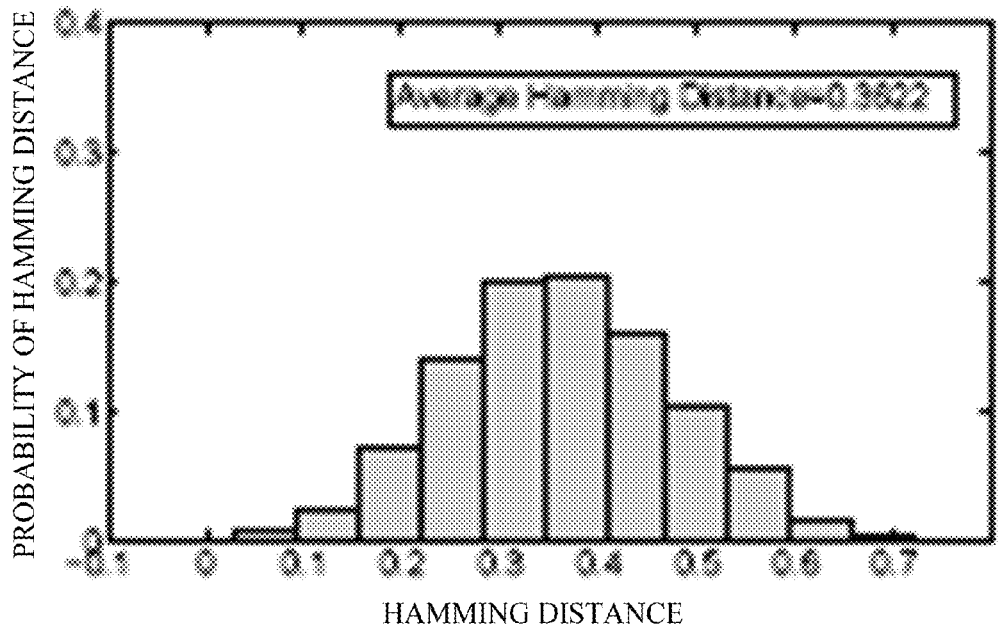
Figure 10E:
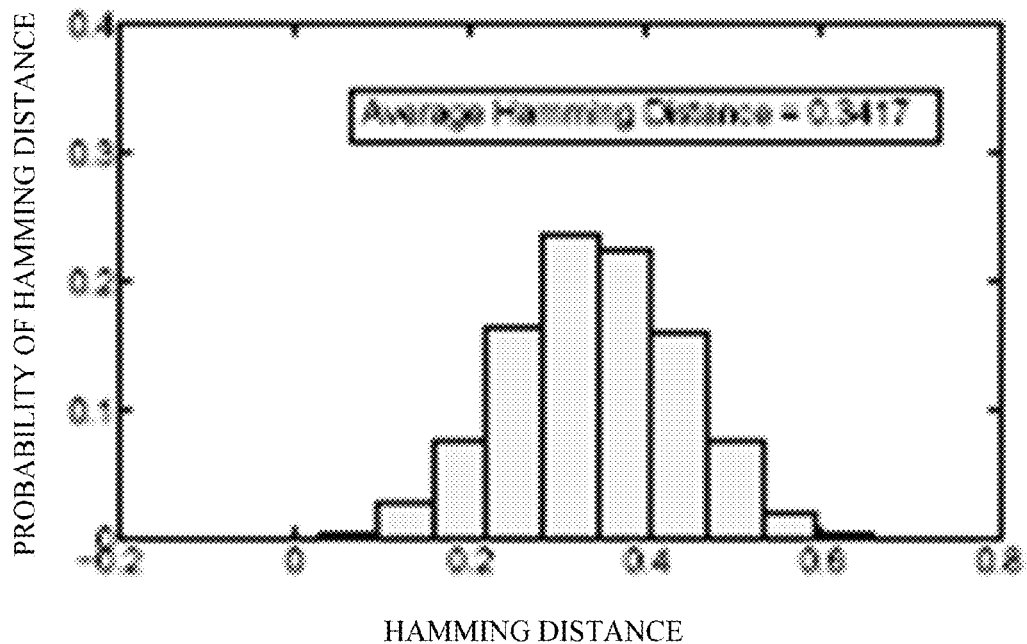
Figure 10F:
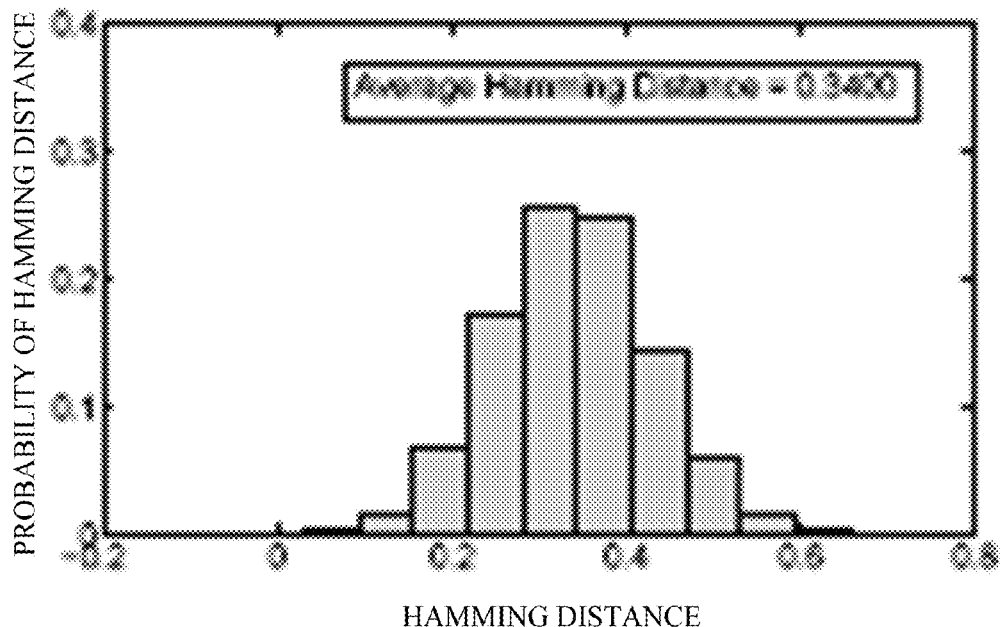
Figure 10G:
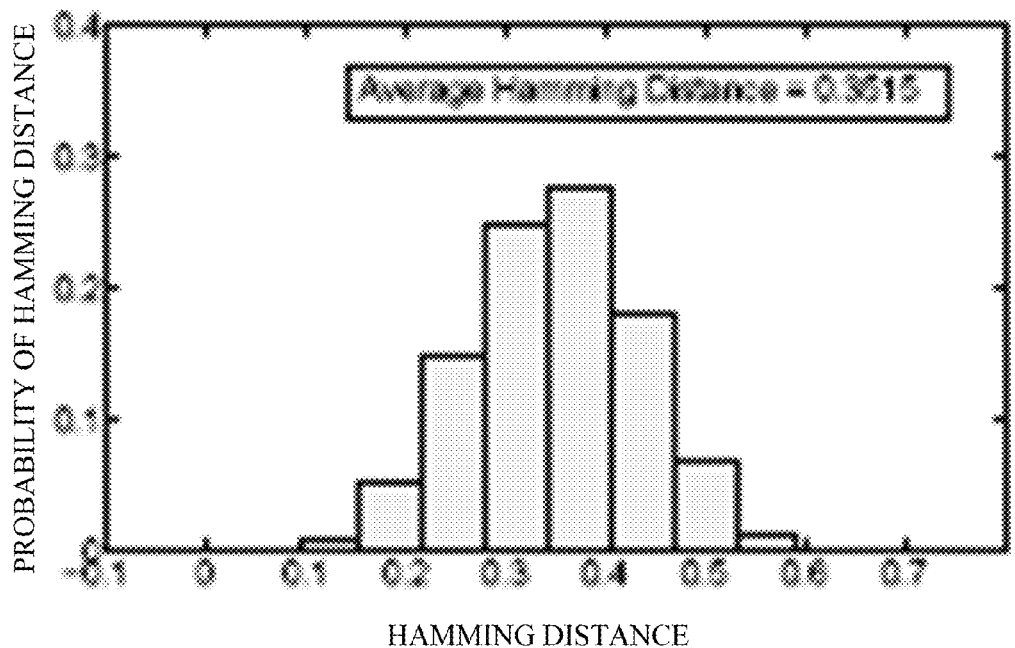
Figure 10H:
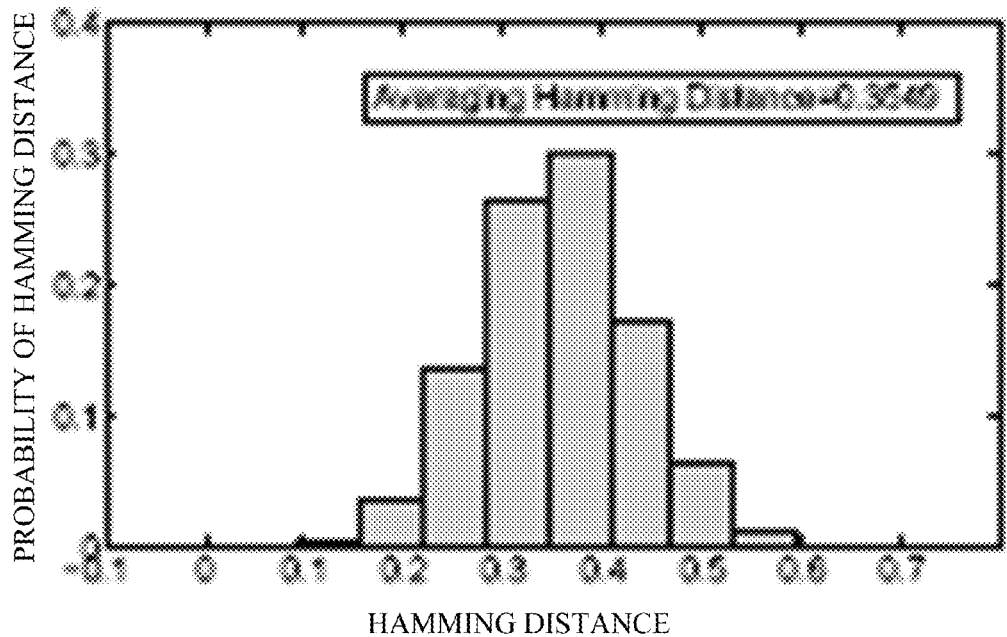
Figure 10I:
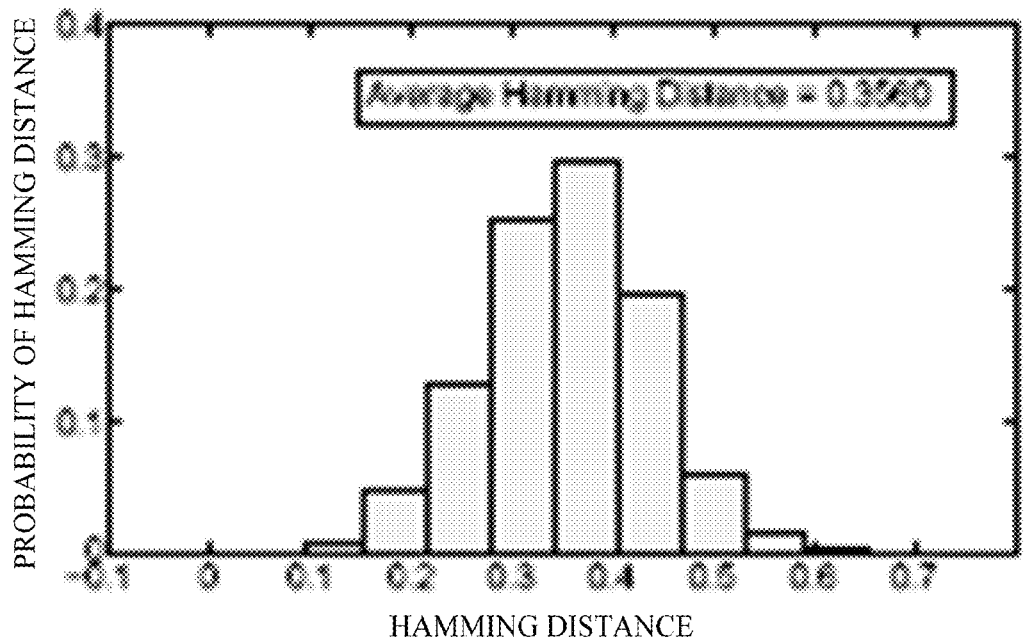
Figure 10J:
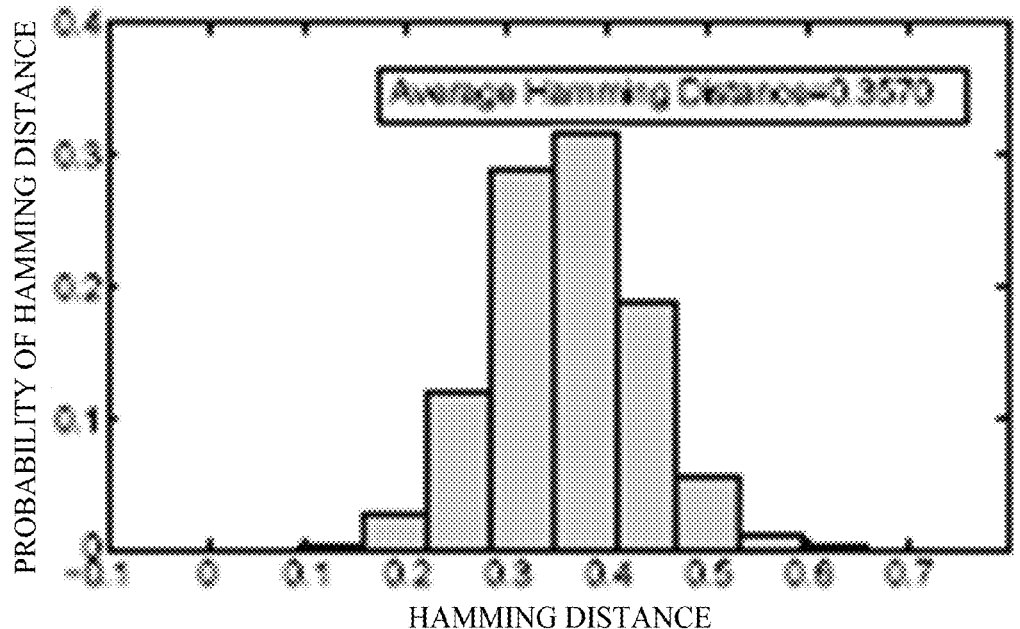

FIG. 9 presents Hamming distances of 100 exemplary 16-bit PE-PUF signatures generated in response to application of 100 random pattern sets. As illustrated, more than 65% of such signatures have Hamming distances larger than 0.4 from each other; namely, on average, more than 40% of bits in each two signatures can be different. Accordingly, by varying input pattern sets, a designer entity (human, machine, or otherwise) can vary PE-PUF response—such variability represents reconfigurability of the PE-PUF.

b) Uniqueness Analysis

As part of the subject analysis, signature uniqueness of a conventional or traditional PUF also having 17 ring oscillators and exploiting neighboring (e.g., adjacent) counters is compared with the signature uniqueness generated by a PE-PUF with M=17 and in accordance with aspects of the subject disclosure. For the conventional or traditional RO-based PUF, since its signature is only determined by process variations, the length of a signature generated in response to a challenge signal pattern is fixed to 16 bits. It should be appreciated that in general the signature length of the conventional RO-based PUF is fixed to R−1 bits, when the signature is generated through pairwise comparison of cycle counts of ROs and R is the number of ROs in the PUF. As part of simulation, and to create a statistically significant sample of signatures, 100 signatures are collected after running traditional RO-based PUF on 100 different chipsets (or ICs). In an aspect, the manufacturing process variations of 100 different chipsets are generated via the Monte Carlo module of Synopsys Nanosim. The distribution of various parameters related to the various chipsets is the following:

(i) 5% intra-die, 5% inter-die, 3 sigma variation for L;
(ii) 15% intra-die, 15% inter-die, 3 sigma variation for $V_{th}$;
(iii) 1.5% intra-die, 1.5% inter-die, 3 sigma variation for $T_{ox}$; and
(iv) 7.5% intra-die, 7.5% inter-die, 3 sigma variation for interconnect resistance R.

Same manufacturing process variation distribution as the foregoing is employed to simulate an M=17 ring-oscillator PE-PUF on 100 different chips. The challenge input patterns applied to the 100 different chips are same as those applied to the 100 chipsets of the conventional PUFs. However, as described hereinbefore, signatures of PE-PUF largely depends on specifics of challenge input patterns, and lengths of the signatures is based at least on the number of pattern sets that a designer entity elects to apply. In various implementations, 1, 2, 4 and 8 pattern sets are applied, with each pattern set including 4 random patterns. In response to the 1, 2, 4, and 8 pattern sets, respective 100 16-bit, signatures, 100 32-bit signatures, 100 64-bit signatures, and 100 128-bit signatures are collected. It should be appreciated that since the 100 versions of the target chipset design are generates employing Monte Carlo by applying various manufacturing process variations, each version of the target design represents one chipset.

FIG. 10 and Table I convey that the average Hamming distance of conventional or traditional PUFs is as low as 0.0864 and 0.1152, with 1.15% and 2.20% signature pairs having Hamming distance larger than 0.3125 for 25° C. and 60° C., respectively. Accordingly, chipsets (or integrated circuits) cannot be readily differentiated from each other by such signatures. Therefore, without wishing to be bound by theory or modeling, signature uniqueness analysis suggests that signature randomness arising from only from process factors in conventional or traditional RON-based PUFs is low. In contrast, signature uniqueness analysis suggests, again without intent to be bound by theory or modeling, that from the 4950 signature pairs collected, 1090 signatures are identical. However, when utilizing PE-PUF for identification and authentication, the probability distribution of Hamming distance between generated signatures improves significantly with respect to conventional RO-based PUF under both temperature conditions. Such increase also is seen as the pattern set count increases (see, e.g., FIG. 10, panels (c)-(j)); namely, with increasing signature length the Hamming distances between 100 signatures (e.g., 4950 signature pairs) increases significantly as well.

TABLE I

Signature uniqueness analysis of conventional PUFs and PE-PUFs.

| # of Pattern sets | Avg. Hamming Distance | | Percentage > 0.3125 | |
|---|---|---|---|---|
| | 25° C. | 60° C. | 25° C. | 60° C. |
| 0 | 0.0864 | 0.1152 | 1.15% | 2.20% |
| 1 | 0.3492 | 0.3622 | 70.3% | 75.3% |
| 2 | 0.3417 | 0.3400 | 72.6% | 75.6% |
| 4 | 0.3515 | 0.3549 | 78.9% | 81.9% |
| 8 | 0.3560 | 0.3570 | 82.0% | 85.2% |

D. Impact of Power Supply on Ring-Oscillators

Figure 11A:
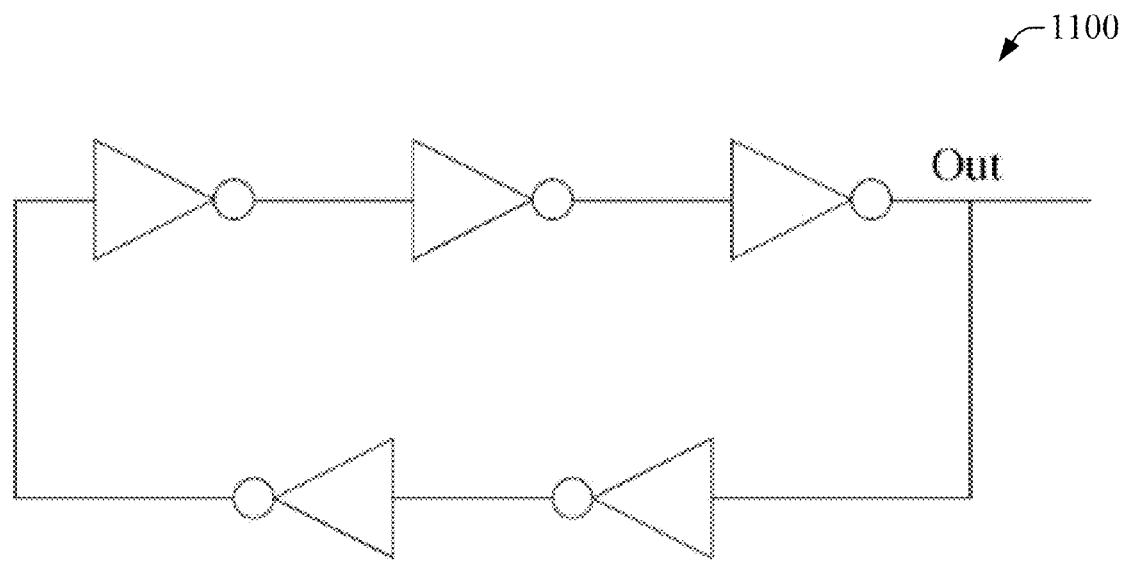
FIGS. 11A-11B illustrate exemplary ring oscillators (ROs) in accordance with one or more aspects of the disclosure. As illustrated, the exemplary ROs comprise five stages.
Figure 11B:
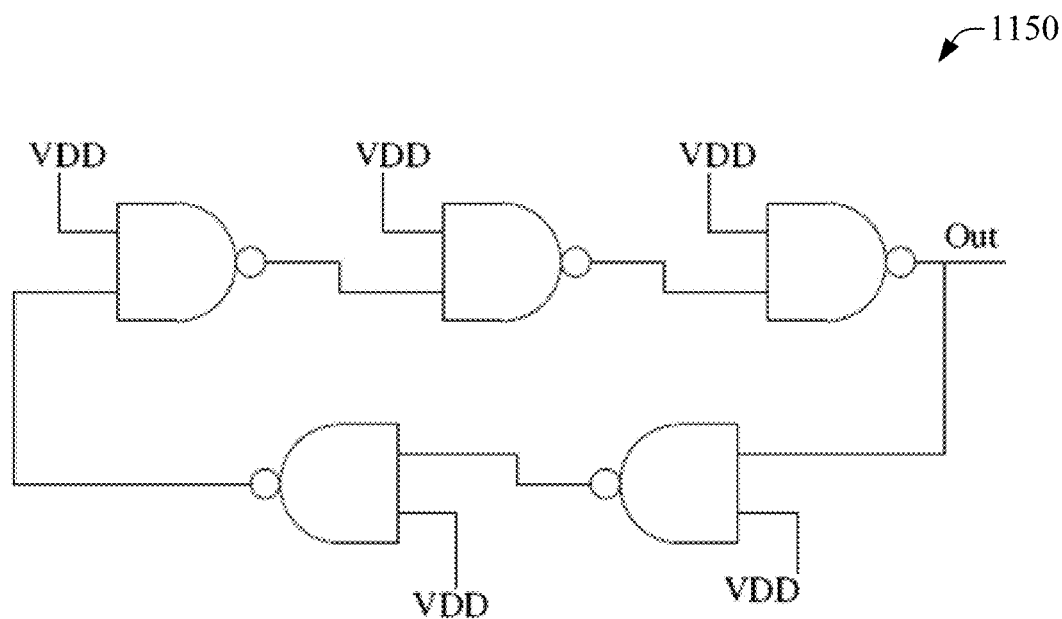

FIGS. 11A-11B illustrate two exemplary five-stage ring oscillators in accordance with one or more aspects of the disclosure. FIG. 11A illustrates an exemplary ring oscillator 1100 comprising inverters, whereas FIG. 11B illustrates an exemplary ring oscillator 1150 comprising NAND gates. The ring oscillator 1150 can exhibit a higher sensitivity to supply noise (voltage supply noise, power supply noise, etc.) because one of the input signals into the ring oscillator can be functionally coupled (e.g., electrically connected) to a power supply. Yet, the ring oscillator 1150 can incur a larger area overhead. In certain embodiments, for illustration purposes, the ring oscillator 100 can be utilized as power monitor because for such ring oscillator analytical analysis is readily feasible. The frequency of an n-stage ring oscillator comprising a set of one or more inverters embodying a set of one or more stages can be determined by the total delay of the one or more inverters in the presence of supply voltage and process variations. Considering that each stage in the ring oscillator provides a delay of $t_d$, and without wishing to be bound by theory and/or simulation, as described herein (see, e.g., Eq. (2)) the delay of the n-stage ring oscillator having one inverter per stage can be approximately $2 \times n \times t_{inv}$ and the oscillation frequency f can be expressed as:

$$f = \frac{1}{2 \times n \times t_{inv}} \quad (5)$$

As described herein (see, e.g., Eq. (1)), the delay $t_{inv}$ of an inverter in a ring oscillator can vary according to parameters such as temperature, supply voltage ($V_{DD}$)), load capacitance ($C_L$), threshold voltage ($V_{th}$), channel length (L), oxide thickness ($T_{ox}$), and transistor channel width (W). Since all ICs can be tested under the same temperature, the environmental variation will not be considered in this work. One or more of such parameters and/or other parameter(s) that can determine, at least in part, the value of f can be susceptible to process variations and power supply noise.

Figure 12:
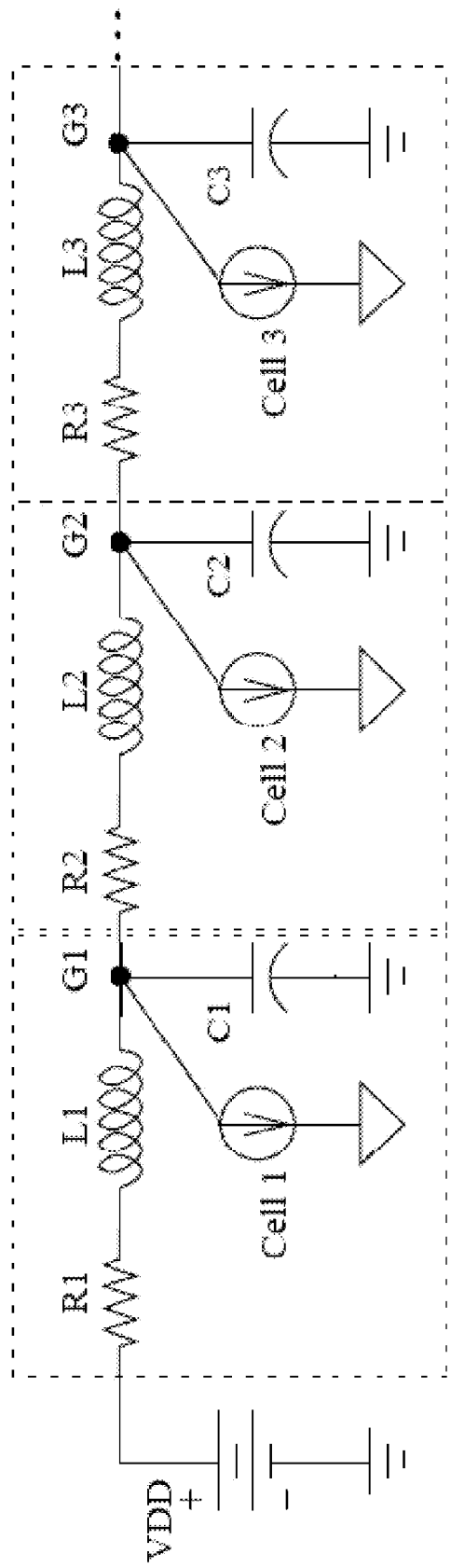
FIG. 12 illustrates an RLC model of a simple power line in a power distribution network in accordance with one or more aspects of the disclosure.

Power supply noise (also referred to as voltage drop) can affect the delay of logic gates. When the voltage drops, the delay of the gates increases. Thus, a change in the supply voltage of any inverter in a ring oscillator impacts the delay of all associated gates, and therefore affects the oscillation frequency. Modern power supply networks generally have tightly designed power supply distribution networks, thus transitions in one gate can affect the power supply of other gates within close proximity. FIG. 12 illustrates a simple power line model in which $V_{DD}$ supplies one row in standard cell design. The indicated $V_{DD}$ represents a point in an IC where a vertical interconnect access (VIA) can connect the power rail to the upper metal layer in a power distribution network of the IC. Nodes G1, G2, and G3 connect to adjacent cells represented as current source for Cell 1, Cell 2, and Cell 3. In the disclosure, in one aspect, for the sake of simplicity, the power via is assumed to have zero impedance and each interconnect can be modeled by a resistance, inductance, and capacitance (RLC) network. Without wishing to be bound by theory and/or simulation, the contribution of each current source to the overall noise can be described in accordance with Eq. (6) herein, where V1, V2, and V3 (which are, respectively, voltages at nodes G1, G2, and G3) are indicative of the power supply noise spectrum; $Vii=Z_{ii}*I_{ii}$ is the power noise at node i (with i=1, 2, 3, $Z_{ii}$ being the impedance of node i, and is the current associated with node i); $\rho_{ij}$ (i,j=1, 2, 3) is a voltage division coefficient; and ω is the frequency of the circuit. From Eq. (6), it can be appreciated that that V1, V2, and V3 are related to neighboring gates, and that a transition in a gate can affect neighboring gates connected to the same $V_{DD}$ line.

$$V1 = V11 + \rho_{21}(\omega)*V22 + \rho_{31}(\omega)*V33$$

$$V2 = \rho_{12}(\omega)*V11 + V22 + \rho_{32}(\omega)*V33$$

$$V3 = \rho_{13}(\omega)*V11 + \rho_{23}(\omega)*V22 + V33 \quad (6)$$

For an integrated circuit that comprises an unintended functional hardware modification (e.g., a malicious functional hardware insertion (or hardware Trojan)), the switching gates in the unintended functional hardware modification can cause a small voltage drop on the VDD line and ground bounce on the VSS line that can impact delay in neighboring gates. Thus, with a fixed set of one or more input patterns, the power supply noise affecting an IC that is free of the unintended functional hardware modification can be different from the power supply of an IC having an unintended functional hardware modification (e.g., a malicious functional hardware insertion or hardware Trojan). In various embodiments and related examples and illustrations of the disclosure, such unintended hardware can be malicious hardware and thus the IC containing such unintended hardware can be referred to as Trojan-inserted IC. Similarly, an IC that is free of an unintended functional hardware modification can be referred to as a Trojan-free IC. In order to analyze the impact of the unintended functional hardware modification (e.g., a malicious functional hardware modification or hardware Trojan) on the frequency of the ring oscillator, a 5-stage ring oscillator (see, e.g., FIG. 11A) in 90 nm technology can be implemented for simulation.

Figure 13B:
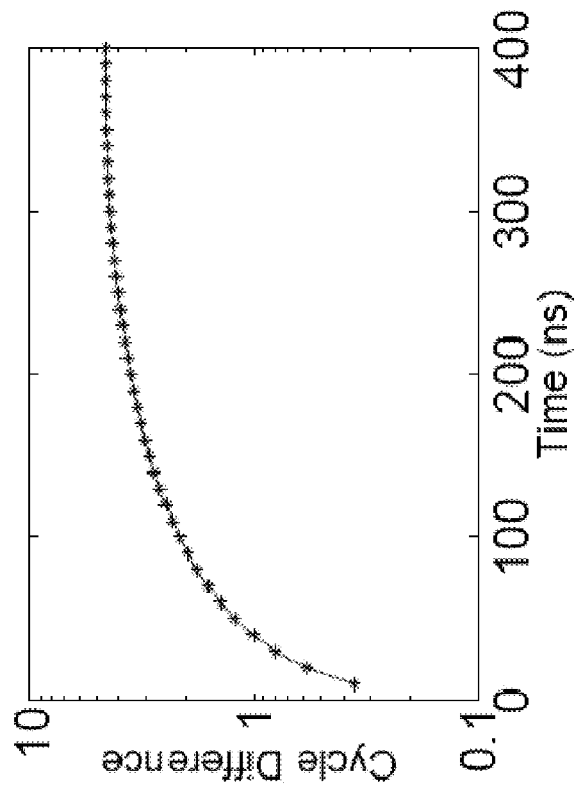
FIGS. 13A-13D illustrates charts representing exemplary RO responses to inclusion of a malicious hardware modification to an IC in accordance with aspects described herein.
Figure 13A:
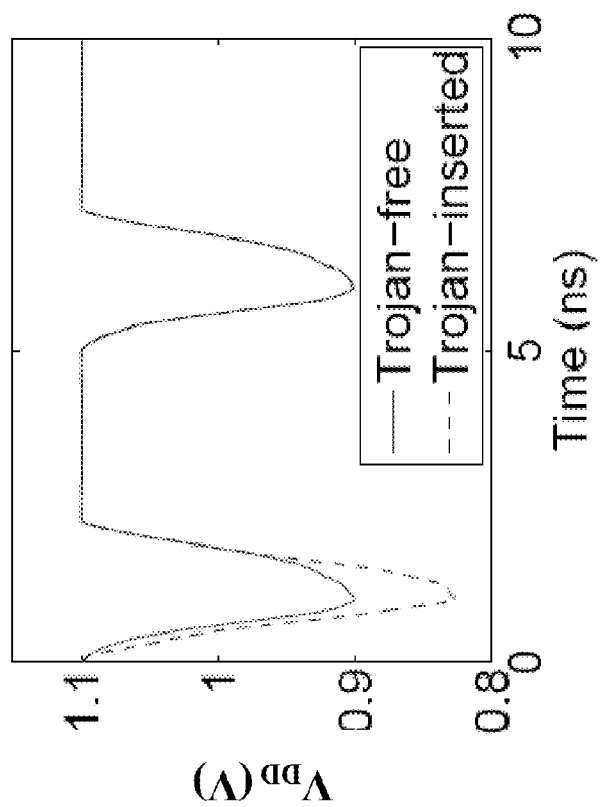

In one aspect, in FIG. 13A, the dashed line represent dynamic power in the presence of unintended functional hardware modifications, such as a malicious functional hardware modification (or hardware Trojan), whereas the solid line represents such dynamic power in the absence of unintended functional hardware modifications. In FIG. 13A, VDD=1.1 V is adopted. As illustrated, the two supply voltages differ substantially during the first 2 ns of operation. In one aspect, such two power waveforms can be applied to the ring oscillator for about 400 ns. In another aspect, FIG. 13B illustrates cycle count difference due to the extra noise caused by the unintended functional hardware modification (e.g., a malicious functional hardware modification or hardware Trojan). As illustrated, at an initial time (e.g., at t=0 ns), the ring oscillator in the IC with an inserted unintended functional hardware modification (e.g., a hardware Trojan) and the ring oscillator in the IC without functional hardware modification have the same period. Yet, due to power supply noise caused by the unintended functional hardware modification, the cycle count difference can increase monotonously as the measurement duration increases.

Figure 13C:
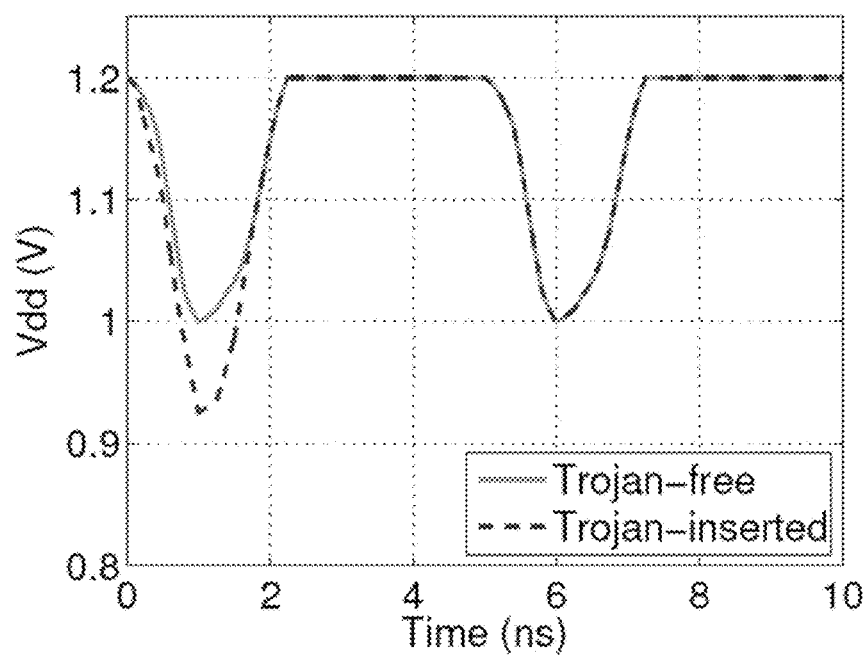
Figure 13D:
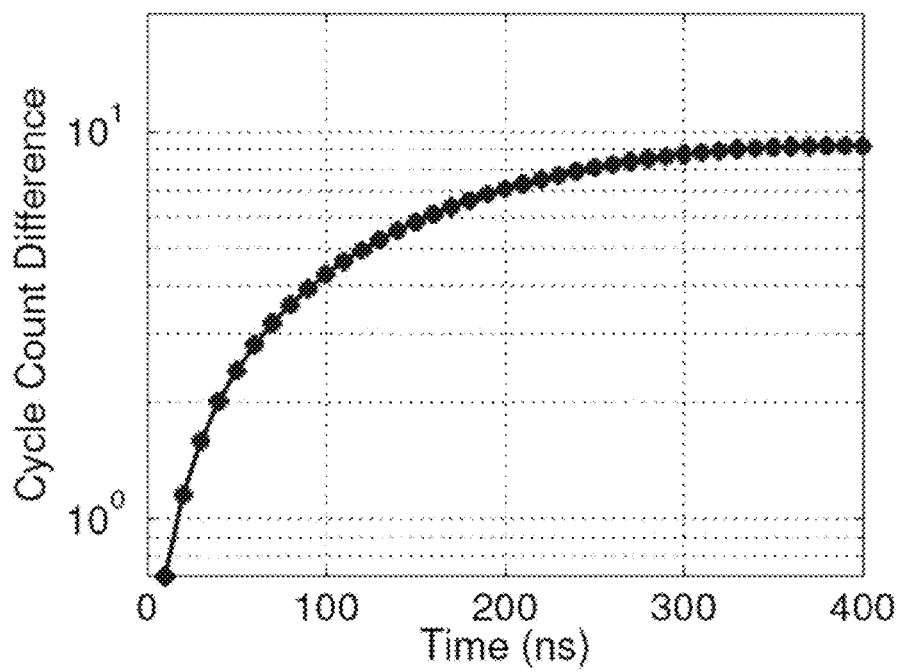

In yet another aspect, in FIG. 13C, dashed line and solid line represent, respectively, dynamic power in the presence of a Trojan and in a Trojan-free IC assuming $V_{DD}$=1.2 V. In another aspect, FIG. 13D illustrates cycle count difference between a Trojan-free IC and a Trojan-inserted IC. Such results present similar features as those described in connection with FIGS. 13A-13B.

E. Ring Oscillator Network Structure

As described herein, switching of a gate in a hardware Trojan can impact the frequency of a ring oscillator (due to injected power supply noise, for example) and the dynamic current of an IC having the hardware Trojan. Process variations can affect the threshold voltage, channel length, and oxide thickness in circuit gates which, in turn, impacts power supply noise distribution in an IC. It should be appreciated that such effects can be localized. In addition, effects of a Trojan can be localized (e.g., narrowly distributed), and the impact of a Trojan on a ring oscillator can depend at least on distance between such Trojan and another Trojan on the ring oscillator. Accordingly, a single ring oscillator may not be sufficiently sensitive to distinguish the effects of Trojans from process variations throughout the entire IC. A ring oscillator placed in one corner of an IC may not be able to capture noise effects which occur due to a Trojan placed in another corner of the IC. Similarly, A ring oscillator located at the center of an IC may not be able to capture noise effects that can occur due to a Trojan located in a distant corner of the IC. Therefore, in one aspect, a ring oscillator network (RON) can improve sensitivity to Trojan noise. In another aspect, a RON can increase the accuracy in determining Trojan's contributions using relative values, which can provide several advantages.

In an embodiment, a RON can comprise $N_{RO}$ ring oscillators distributed across the entire IC. Here, $N_{RO}$ is a natural number. For different ICs, $N_{RO}$ can be adjusted based at least on a desired sensitivity of a ring oscillators to a gate switching at a predetermined distance from the ring oscillator. The output (e.g., signal output) of a RON in Trojan-free IC can be utilized to generate one or more power signatures based on frequencies of each RO included in the RON. In one aspect, without wishing to be bound by theory and/or simulation, it is assumed that a number of golden ICs (e.g., ICs that are proven to unintended hardware insertions, functional or otherwise) can be identified via a thorough test process. In a scenario in which testing output of an IC under authentication is not compatible with an expected signature (e.g., a reference signature, such as a catalogued signature or standardized signature), the IC can contain an unintended functional hardware modification (e.g., a malicious functional hardware modification). It is noted that the disclosed architecture for the RON also can utilize power signatures generated during simulation of an IC embedded with the RON for detection of an unintended functional hardware modification (e.g., a hardware Trojan) thus eliminating the need for a golden IC.

Oscillation cycle count generated from ring oscillators in the RON is used to generate the IC's signature. Without wishing to be bound by theory or modeling, for the $i_{th}$ ring oscillator, the total accumulated cycles, $C_i$ (also referred to as $C_{ii}$) in the measurement time T is:

$$C_i = \int_0^T \frac{1}{2*n*t_{di}(t)} dt \quad (7)$$

where $t_{di}(t)$ is the inverter delay which will vary with time as the input patterns change. Let $\Delta t_{dti}(t)$ represent the change in inverter delay of $i_{th}$ ring oscillator caused by Trojan effects and $C_{TFi}$ and $C_{Ti}$ denote the total cycle count for an IC without an unintended functional hardware modification (e.g., a malicious functional hardware modification or hardware Trojan) and for an IC with such hardware modification, respectively. The effect a Trojan has on $i_{th}$ ring oscillator ($\Delta C_i$) is presented by Eq. (8). The value of $\Delta C_i$ can be related to the number of stages in a ring oscillator (n), the measurement time (T), and the Trojan's impact on inverter delay ($\Delta t_{dti}(t)$). The impact of an unintended functional hardware insertion (e.g., a malicious functional hardware modification or hardware Trojan) on a ring oscillator is determined by the size of the unintended functional hardware insertion, switching activity of the unintended functional hardware insertion, and the distance between such insertion and the ring oscillator. Without wishing to be bound by theory or modeling, $\Delta C_i$ can be expressed as follows.

$$\Delta C_i = C_{Tli} - C_{TFi} \qquad (8)$$

$$= -\int_0^T \frac{\Delta t_{dii}(t)}{2*n*t_{di}(t)*(t_{di}(t) + \Delta t_{dii}(t))} dt$$

Figure 14A:
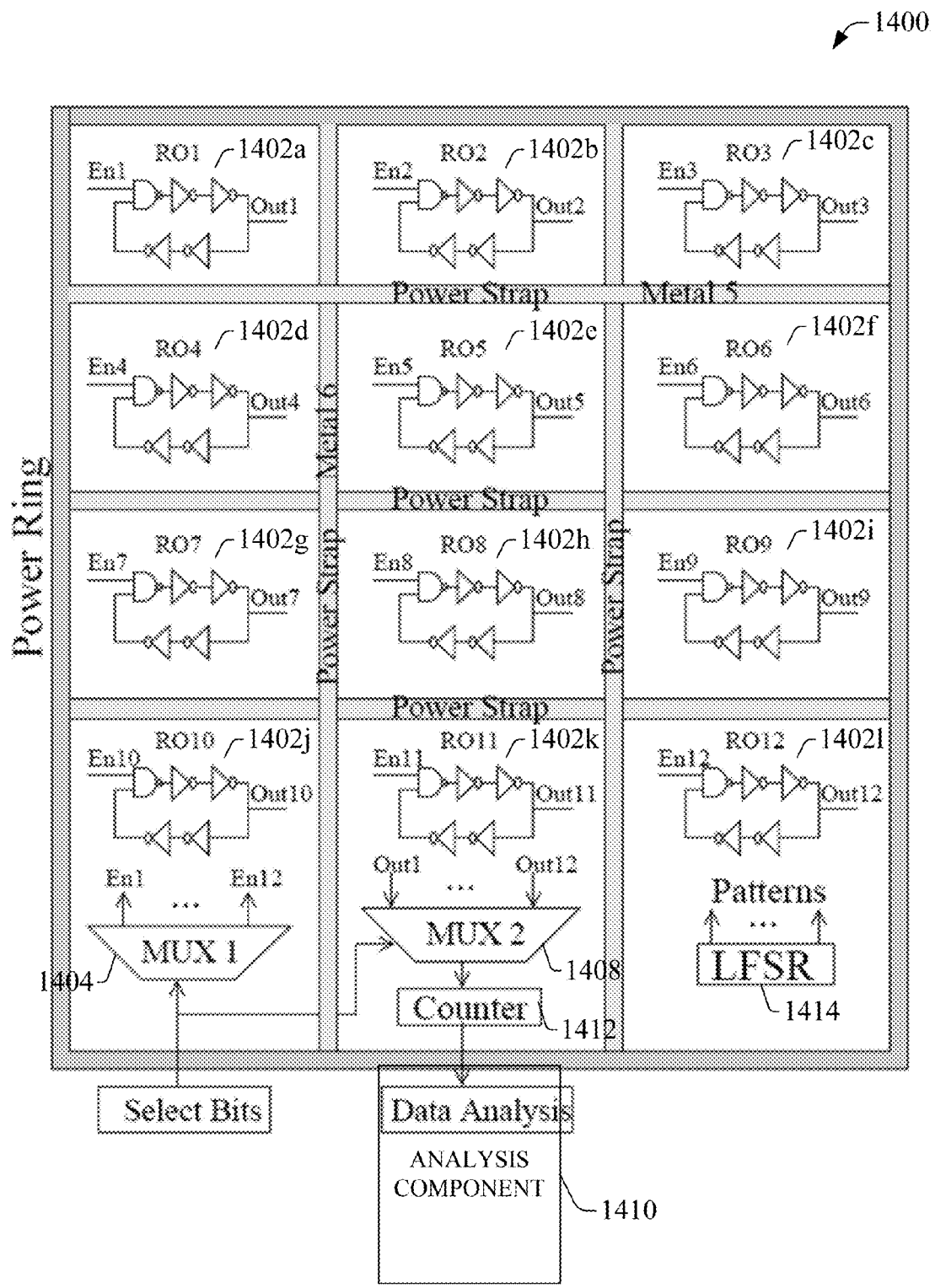
FIGS. 14A-14C illustrate exemplary embodiments of devices for detection of an unintended functional hardware modification to an IC (or threat detection in the IC) in accordance with aspects described herein.

FIG. 14A illustrates an exemplary embodiment 1400 of a ring oscillator network (RON) with $N_{RO}$=12 oscillators inserted into the ISCAS'89 s9234 benchmark circuit according to power straps in the layout. In one aspect, one RO from the plurality of ROs 1402a-1402l can be inserted into each grid surrounded by power straps. In addition, in another aspect, a multiplexer 1404 (MUX 1) can be configured to select a ring oscillator in the RON to be enabled during the authentication, and another multiplexer 1408 (MUX 2) can be configured to select the same ring oscillator to be recorded and collect data (e.g., output signal) from such ring oscillator. In certain implementations, when the IC is in functional mode, the RON can be disabled and thus can have no impact on circuit dynamic power. A counter 1412 in the exemplary embodiment 1400 can calculate the oscillation cycles occurring in a selected ring oscillator. Since $N_{RO}$ ring oscillators are employed to generate the signature, the same pattern set (labeled as "patterns") generated by a linear feedback shift register (LFSR) 1414 can be applied to the IC $N_{RO}$ times. As described herein, other pseudo-random pattern generators can be employed to apply a set of one or more input signals to the IC.

Figure 14B:
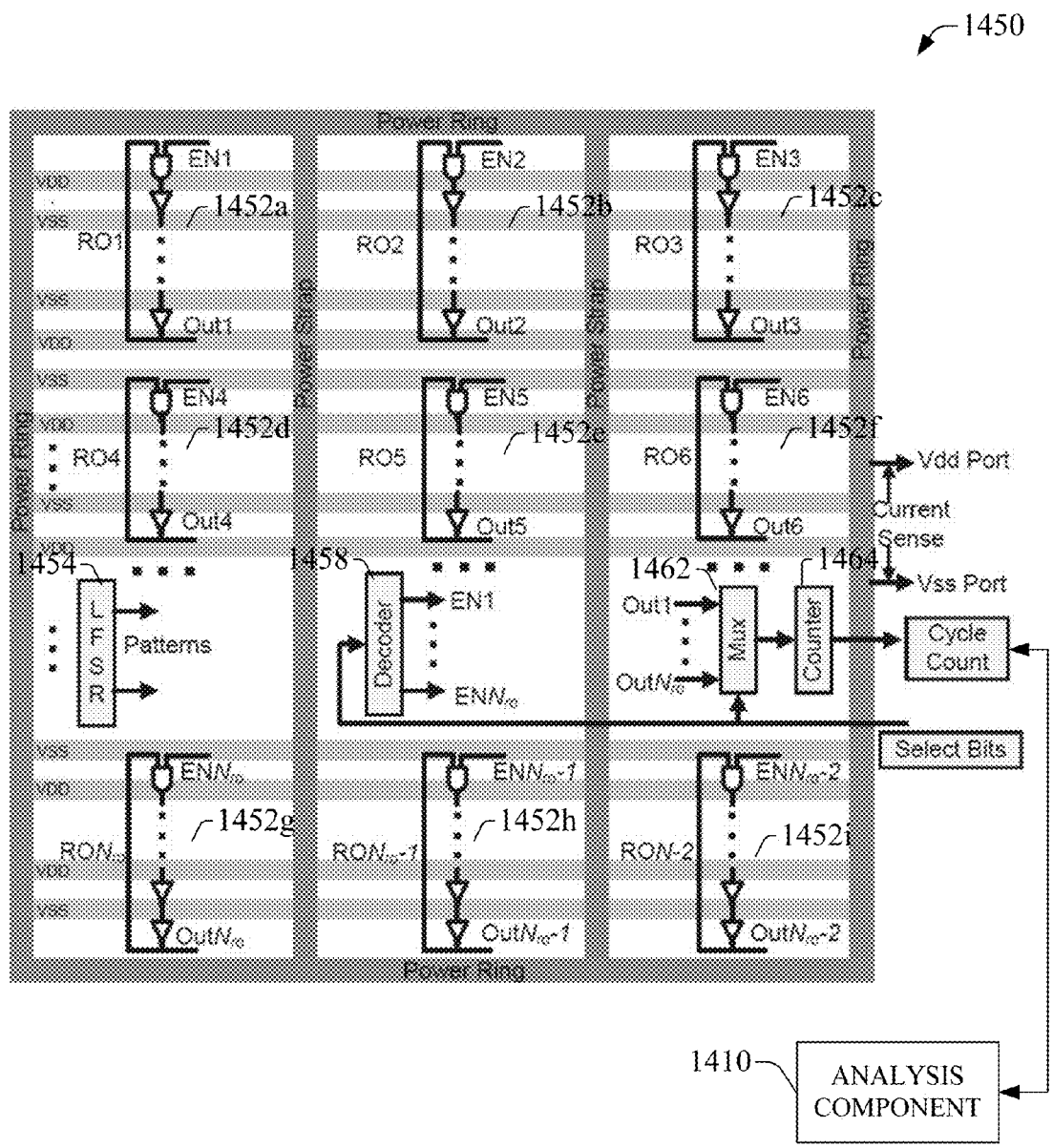

FIG. 14B illustrates an exemplary embodiment 1460 of a circuit having an on-chip structure in accordance with one or more aspects of the disclosure. The on-chip structure can have $N_{ro}$ n-stage ring oscillators 1452a-1452i. In one aspect, as illustrated, the n-stage ring oscillators can include one NAND gate and n−1 inverters with one component located in each of the five rows of the standard cell design. An "enable (En)" signal can be applied to each of the ROs, wherein a value of "1" (or high, for example) for the Enκ signal enables the ROκ, with κ=1, 2, . . . 12. A value of "0" (or "low", for example) disables the ROκ. Such ring oscillators can be more sensitive to a voltage drop caused by a Trojan in implementations in which one or more of the ring oscillators share a common power strap. Accordingly, various advantages can be realized when complete coverage of the power distribution network is ensured by placing at least one ring oscillator component in each row of a standard cell, and thus near each power strap. In one aspect, one group of n-stage ring oscillators can be inserted between two vertical straps. In a design having M vertical power straps and R rows, the number of ring oscillator can be configured, for example, to $N_{RO}$=(M+1)(R/n). It should be appreciated that $N_{RO}$ can be configured based at least on intended (e.g., required) Trojan detection sensitivity in accordance with aspects described herein.

In certain embodiments, an on-chip structure in accordance with the disclosure can comprise a linear feedback shift register (LFSR) 1454, a decoder unit (or decoder) 1458, a multiplexer 1462, and a counter unit (or counter) 1464. The LFSR can supply test patterns for the entire IC during the signature generation and authentication processes; the same seed must be used for each golden IC and each IC under authentication. The decoder and the multiplexer can be configured to select ring oscillator to be measured. In one aspect, in response to selection of a ring oscillator, the decoder can enable the ring oscillator and the multiplexer can transmit the output of the ring oscillator to the counter. In another aspect, for the ring oscillator that is selected, the counter can measure a cycle count of the ring oscillator over a specified time interval. In certain implementations, the number of stages (n) in a ring oscillator can be limited by the operating speed of the counter, such speed being determined by the technology node or technology library, in a simulation. For example, as permitted by the HSPICE simulation and analysis tool provided by Synopsys, for a 90 nm technology, a 16-bit counter can operate at a maximum frequency of 1 GHz. As discussed herein, in certain embodiments, 5-stage ring oscillators can form a RON that is optimal or nearly optimal for Trojan detection.

It should be appreciated that the ring oscillators in a RON are typically enabled during production test and authentication phase, thus power overhead of such oscillators in the field can be negligible. In one embodiment, an on-chip architecture inserted in an IC can have a small area overhead. For larger circuits, such as those with $N_{no}$ (b/a)$\log_2(N_{RO})$, where a and b are constants related to the area overhead of an RO and counter in the architecture) the area overhead can originate mainly from the ring oscillators. As an illustration, for larger circuits in scenarios in which there is one vertical power strap for every 20 flip-flops (FFs) or 80 gates, the area overhead of the ring oscillators can be approximately 1/(20×4)=0.0125, which represents an overhead of about 1.25%. The total area overhead can be approximately 2.5% in scenarios in which there is one vertical strap for only every 10 FFs or 40 gates in the design. In the alternative, for a small circuit, the counter can contribute significantly to area overhead, whereas the counter size can increase logarithmically with the size of the IC in which the on-chip architecture of the disclosure is inserted. It should be appreciated that one or more LFSRs can be typically utilized for built-in self-tests in modern designs, thus such LFSR(s) can be already present and contribution thereof can be neglected in area overhead analysis. It should further be appreciated that dynamic current can be measured externally (e.g., without incurring area costs). In view of the foregoing, it should be appreciated that area overhead can be, in general, less than about 3% for a large circuit and can be slightly larger for a smaller circuit.

As described herein, a RON architecture in accordance with aspects described herein can have a small area overhead. Such overhead can be caused, mainly, by the counter and, in certain embodiments, the LFSR. For instance, the overhead can be 10.8% for the smaller benchmark circuit s9234 (two vertical power straps and three horizontal power straps, $N_{RO}$=12); 3.6% for s35932 benchmark circuit (three vertical power straps and three horizontal power straps, $N_{RO}$=16); and 0.9% for DES circuit (five vertical power straps and five horizontal power straps, $N_{RO}$=30). As other illustrative values of area overhead, it is noted that ISCAS' 89 benchmark circuit s38584, comprising four vertical power straps, can incur an area overhead of 5.2%; an AES circuit having six vertical straps can incur an area overhead of about 2.25%; and a DES circuit having six vertical power straps can incur an area overhead of 1.8%.

In certain embodiments, the area overhead is likely to be negligible for larger circuits even if $N_{RO}$ increases considerably based on power planning, since the counter size does not increase linearly with $N_{RO}$. Also, LFSR is commonly used for built-in self-test (BIST) in modern designs and can be exploited for generation of a random input pattern.

Ring oscillator networks described herein can be resilient to removal and tampering attacks. In one aspect, ring oscillators can be distributed across an entire IC, thus it can be inherently difficult for an adversary to remove or tamper a ring oscillator. In scenarios in which a ring oscillator reports data outside of a predetermined range or fails to report data, such ring oscillator can be considered to be attacked. In addition or in the alternative, in another aspect, an on-chip structure described herein can be resilient to modeling. In a modeling attack, adversaries typically can build a lookup table of values which emulate the cycle-counts of Trojan-free ICs and therefore can pass authentication. Yet, for an on-chip structure of the disclosure, such lookup table can introduce side-channel contributions that can be readily detected by external dynamic current measurements. Due to process variations, the frequency of each ring oscillator can be unique for a specific IC and thus the IC can have a specific lookup table determined at least in part by such process variations. Yet, a lookup table associated with a modeling attack can output the same value for each IC. The repetitiveness over different ICs of such output can readily be detected.

It should be appreciated that it is inherently difficult for an attacker to remove the ring oscillator network, due to (a) its distributed placement throughout the entire IC and (b) the expected measurement results from each ring oscillator, e.g., the designer relies on the ability to capture RON data from each embedded ring oscillator. In a scenario in which a specific ring oscillator is not reporting data, a designer entity (human, machine, or other type of entity) can conclude the design has been attacked. In addition or in the alternative, a ring oscillator that is part of the RON is sensitive to its stage count and inverter type. For the RON inserted by the designer entity, the frequency of at least one ring oscillator in the RON adopts values in a certain range, including process variations. In case the at least one ring oscillator of the RON is not within the range, the designer entity can conclude that IC comprising the RON likely is tampered with. In addition, similar to RO-based PUFs, the RON architecture is also resilient to modeling and reverse engineering attacks.

Figure 14C:
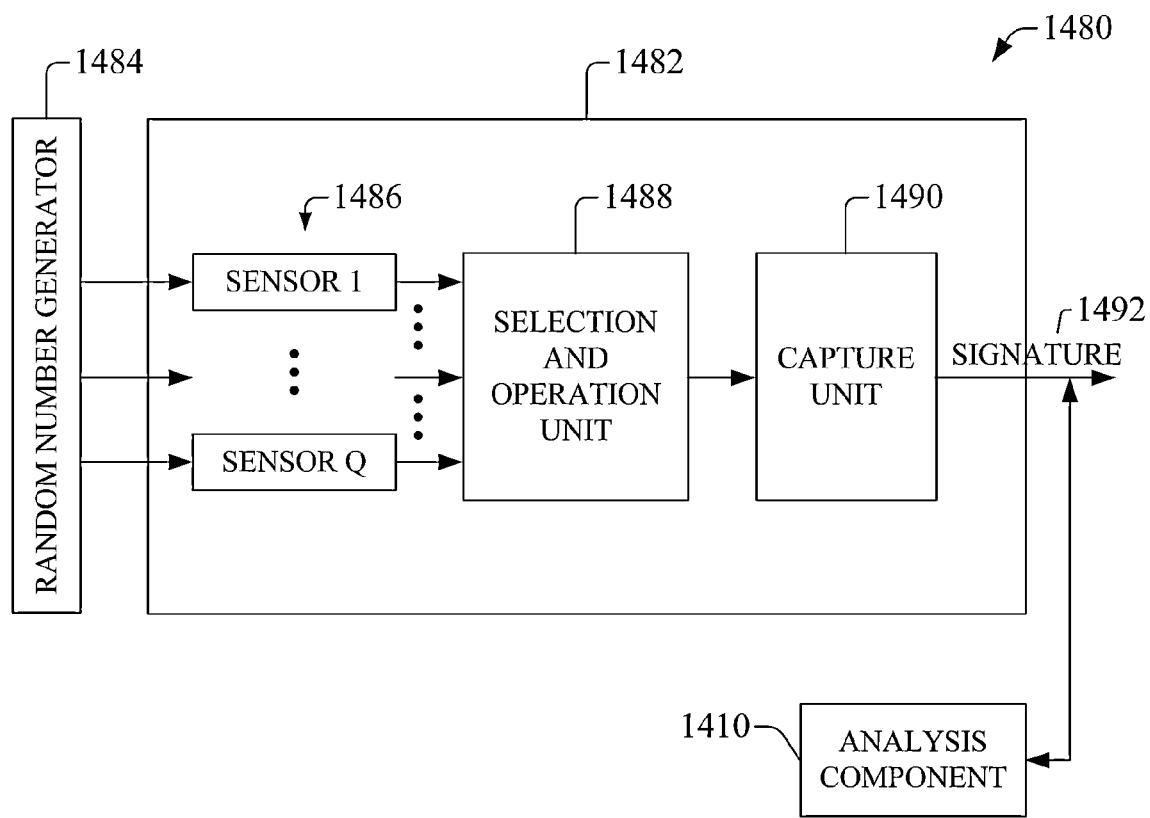

In an additional or alternative embodiments, such as the embodiment illustrated in FIG. 14C, a device 1480 for threat detection (e.g., detection of a hardware Trojan) can comprise an on-chip structure that can rely on sensing components other than ring oscillators. In particular, as illustrated the on-chip structure can have one or more sensors 1486 that can be selectively enabled via, for example, a multiplexer or a selector unit, such as selection and operation unit 1488. In one aspect, the one or more sensors 1486 (comprising sensor 1 through sensor Q, with Q a natural number greater or equal than one (1)) can form a network of sensors. In another aspect, the one or more sensors 1486 can comprise one or more of a leakage current sensor, a charge pump sensor, a transient current sensor, or any combination thereof. It should be appreciated that, in certain scenarios, the one or more sensors also can include at least one RO (see, e.g., FIGS. 14A-14B). As an example, in one implementation, a plurality of sensors can be embedded in an integrated circuit (e.g., IC 1482), wherein each sensor of the plurality of sensors can extract one or more parameters indicative of an operational condition of the IC, such as current(s), power, temperatures, or the like. In addition, each sensor can be configured to supply an output signal in response to an input signal applied to the IC.

Such device 1480 for threat detection can comprise a random pattern generator unit, e.g., random number generator 1484, that applies a set of predetermined challenge signal patterns to the IC, the input signal applied to the IC can comprise at least one challenge signal pattern of the set of predetermined challenge signal patterns. The random number generator 1484 can be embodied in an LFSR in accordance with aspects described herein.

In such additional or alternative embodiments, the device 1480 for threat detection can comprise a set of one or more converters, wherein each converter of the set of one or more converters can be functional coupled to at least one sensor of the one or more sensors. The one or more converters can be included or can embody a capture unit 1490. Each converter in such set can determine at least in part a digital signature associated with the IC based on a specific output signal of at least one sensor of the one or more sensors 1486 in response to a specific challenge signal pattern of the plurality of challenge signal patterns. At least one converter of the plurality of converters (e.g., capture unit 1490) can convert a first type of signal (e.g., digital signal or analog signal) to a second type of signal (e.g., a digital signal). For example, the at least one converter can convert an analog signal to a digital signal (e.g., the converter is an analog-to-digital (A/D) converter). Such A/D converter can be suitable for implementations in which the one or more sensors can comprise at least one of the current sensors described herein. For another example, the at least one converter can convert a first digital signal to a second digital signal (e.g., such converter(s) can be a digital-to-digital converter, such as time-to-digital converter(s)). A counter as described herein can be embodied or can comprise a time-to-digital converter. The one or more converters (e.g., capture unit 1490) can supply a digital signature 1492 (e.g., a power signature) to an analysis component 1410.

Similar to other devices that rely on a RON for threat detection (see, e.g., FIGS. 14A and 14B), a device for threat detection that exploits one or more sensors and one or more converters, also can comprise a first multiplexer that selects a ring oscillator of the plurality of ring oscillators, and a second multiplexer that enables operation of the ring oscillator of the plurality of ring oscillators.

F. Exemplary Methodology and Statistical Analysis

Figure 15A:
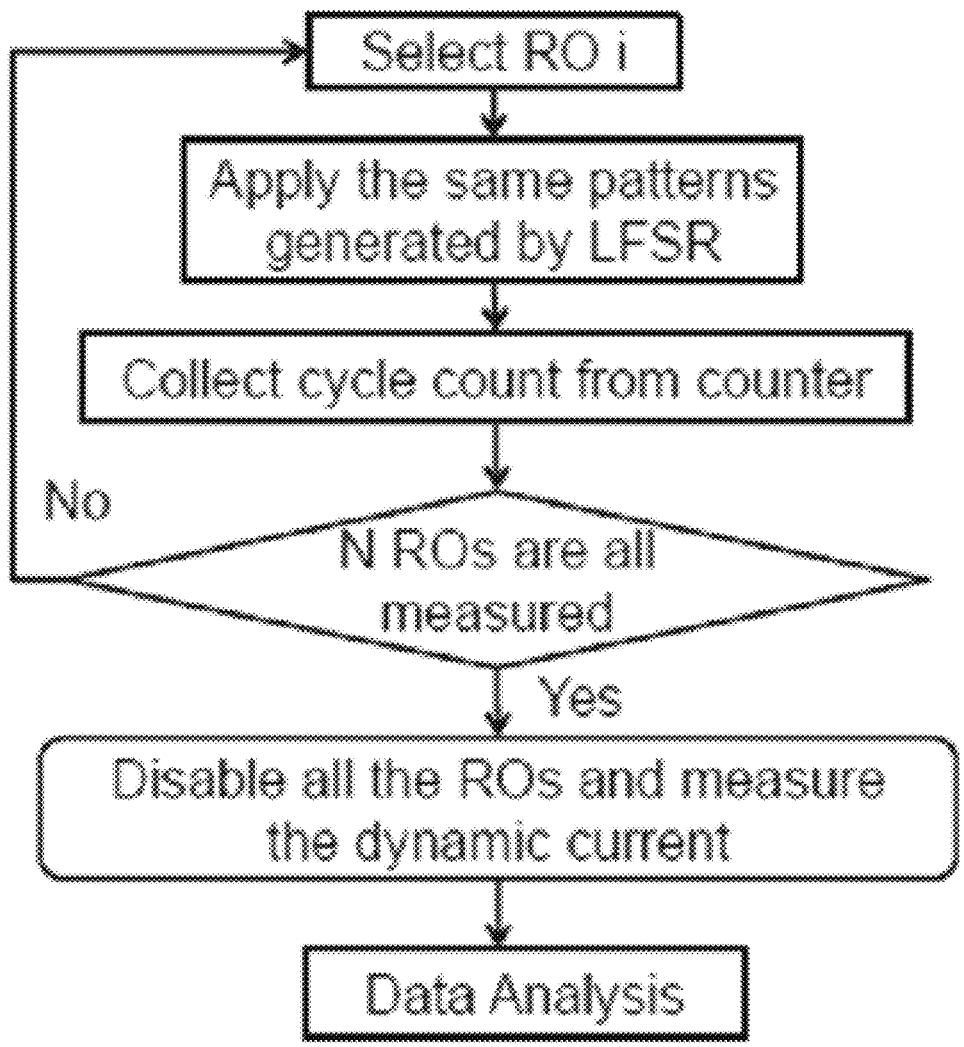

FIG. 15A illustrates a flowchart of an exemplary method for measuring an IC in accordance with one or more aspects of the disclosure, the IC having an on-chip structure comprising a RON having $N_{RO}$ ring oscillators. To measure the frequency of $N_{ro}$ ring oscillators, an LSFR random pattern associated with a specific seed can be applied $N_{ro}$ times, and the dynamic current of the IC can be measured externally. In scenarios in which an unintended functional hardware modification (e.g., a malicious functional hardware modification (or hardware Trojan)) to an IC is either small or widely distributed on the IC, distinguishing between noise generated by such unintended hardware gates and process variations may be difficult. Therefore, in one aspect, as an extension, a signature can be generated by recording a cycle count of each ring oscillator contained in a RON included in each IC from a large number of ICs of the same design. In view that the ICs can all be subject to different process variations, such signature can be statistically more resilient to errors associated with similar variations in chips under authentication.

To separate the effect of process variations from the effects of insertions of unintended functional hardware (e.g., a hardware Trojan), an exemplary methodology for data analysis is described herein. In one embodiment, such exemplary methodology can comprise three methods: (1) Simple Outlier Analysis, (2) Principal Component Analysis (PCA), and (3) Advanced Outlier Analysis. Simple outlier analysis presents the least complexity compared with the other two data analysis methods. Yet, PCA and advanced outlier analysis can provide increased sensitivity of prediction of presence of an unintended hardware insertion (e.g., a hardware Trojan) with respect to simple outlier analysis. In this specification and annexed drawings, "sensitivity" refers to correct prediction of presence or absence of the unintended hardware insertion.

In an aspect, simple outlier analysis is based on the oscillation cycle distribution of each ring oscillator in the RON that is embedded in an IC. For each ring oscillator in the RON, the oscillation cycle is within a certain range for ICs free of insertions of unintended functional hardware (e.g., a malicious functional hardware modification or hardware Trojan). In case the oscillation cycle of at least one ring oscillator in the IC comprising the RON and under authentication is outside of the range, such IC can be considered suspicious and likely contain an unintended functional hardware (e.g., a malicious functional hardware modification or hardware Trojan). The simple outlier analysis can exploit information from individual ring oscillators but not the relationship between them in the RON. Usually, the simple outlier analysis can identify a certain number of ICs comprising unintended functional hardware (e.g., a malicious functional hardware modification or hardware Trojan). If oscillation cycle count of all ring oscillators in an IC under authentication is within the signature of each IC free of unintended functional hardware (e.g., a malicious functional hardware modification or hardware Trojan), the data collected from this IC can be processed by PCA and advanced outlier analysis.

Principal component analysis is utilized to account for the $N_{RO}$ variables, wherein one variable represents one ring oscillator. In one embodiment, Principal Component Analysis can transform $N_{ro}+1$ variables to several uncorrelated variables. In certain implementations, three of such uncorrelated variables (e.g., the first three variables) can be utilized for analysis in accordance with aspects described herein. In one aspect, $N_{ro}$ of the uncorrelated variables can be employed to represent, respectively, the $N_{ro}$ ring oscillators contained in the RON, and an additional uncorrelated variable, e.g., the $N_{ro}+1^{th}$ variable, can represent the dynamic current of the IC having the RON. The relationship between data collected from $N_{RO}$ ring oscillators and the dynamic current can be assessed by PCA when it transforms the $N_{RO}$ variables into the $N_{RO}+1$ uncorrelated variables. For example, similarities in oscillation readings between two adjacent ring oscillators can imply a correlation in the data. The oscillation cycle count of $N_{RO}$ ring oscillators in an IC that is free of insertion of an unintended functional hardware modification can be analyzed by PCA and a convex hull can be constructed with the first three components. In particular, as an example, the $N_{ro}+1$ variables can be transformed by PCA and the first three of the resulting components can be utilized to construct a convex hull. If the output of a circuit under test is beyond the convex hull, an unintended functional hardware insertion (e.g., a hardware Trojan) can be present in the IC under authentication. Yet, when the output is inside the convex hull, advanced outlier analysis can be employed for further analysis and validation.

Advanced outlier analysis can be developed to identify ICs with an unintended functional hardware (e.g., a malicious functional hardware modification or hardware Trojan) and that may not be detected by simple outlier analysis and PCA. Advanced outlier analysis can account for relationships (e.g., interactions) between ring oscillators in a RON and dynamic current of the entire chipset that comprises the RON. FIG. 15B illustrates an exemplary method for performing advanced outlier analysis in accordance with aspects of the disclosure. In one aspect, FIG. 15B presents pseudo-code that when implemented (e.g., programmed, compiled, and executed by a processor) causes a computing device (e.g., a processor) to perform advanced outlier analysis. As illustrated, advanced outlier analysis can comprise: (I) "Power Signature Generation" and (II) "Authentication". In one aspect, in (I), for a Trojan-free (TF) IC, two out of $N_{ro}$ ring oscillators can be selected in conjunction with dynamic current information to generate a power signature. In another aspect, in (I), $N_{RO} \times (N_{RO}-1)$ power signatures can be generated from $N_{TF}$ ICs that are free from insertion of unintended functional hardware (e.g., a malicious functional hardware modification). For each Trojan-free IC, in one aspect, the total oscillation cycle count (CC) from a RON is $CC_{RON} = \sum_{m=1}^{N_{ro}} CC_m$, with m a natural number and $N_{RO}$ a number of ROs in a set of one or more ROs in the RON. Data from a first ring oscillator $RO_i(CC_i)$ and a second ring oscillator $RO_j$ (with $j \neq i$)($CC_j$) can be selected to calculate $x_i = (CC_{RON} - CC_i)/CC_i$ and $y_j = (CC_{RON} - CC_j)/CC_j$. To generate a power signature $PS_{ij}$, $(x_i, y_j, I)$ from a plurality of Trojan-free ICs can be plotted. Thus, in one aspect, a total of $N_{RO} \times (N_{RO}-1)$ unique power signatures can be generated. Regarding (II), at least one power signature can be generated for each IC under authentication in substantially the same manner as in (I). In a scenario in which one of the IC's signatures is outside of the $N_{RO} \times (N_{RO}-1)$ power signatures $\{PS_{ij}\}$, the advanced outlier analysis can identify the IC as an IC having an unintended functional hardware modification, such as a malicious functional hardware modification, inserted therein.

Advanced outlier analysis as described herein also can be applied to a circuit under test (CUT). If the CUT lies within the signature, it can be assumed that the circuit is Trojan-free. Otherwise, if one of the $N_{RO} \times (N_{RO}-1)/2$ values generated by the CUT lies outside a reference signature, it can be assumed unintended hardware (e.g., a malicious hardware insertion or Trojan insertion) is present.

G. Example RON Embodiments and Related Performance and Analysis

To illustrate various aspects of the disclosure related to detection of malicious hardware insertion (e.g., Trojan insertion), an exemplary RON architecture comprising $N_{RO}=12$ ring oscillators with 5-stage inverters was implemented in two exemplary embodiments: (i) The RON architecture was deployed (e.g., installed, tested, accepted) in s9234 benchmark using 90 nm technology, comprising two vertical and three horizontal power straps for IC simulation and analysis; and (ii) AES circuit on Xilinx Spartan-3E FPGA for hardware validation and analysis. In such exemplary embodiments the unintended functional hardware modification represents a malicious functional hardware modification or hardware Trojan (also referred to as Trojan). It should be appreciated, however, that such representation is for illustrative purposes and substantially any unintended functional hardware modification can be analyzed as described hereinafter.

Figure 16A:
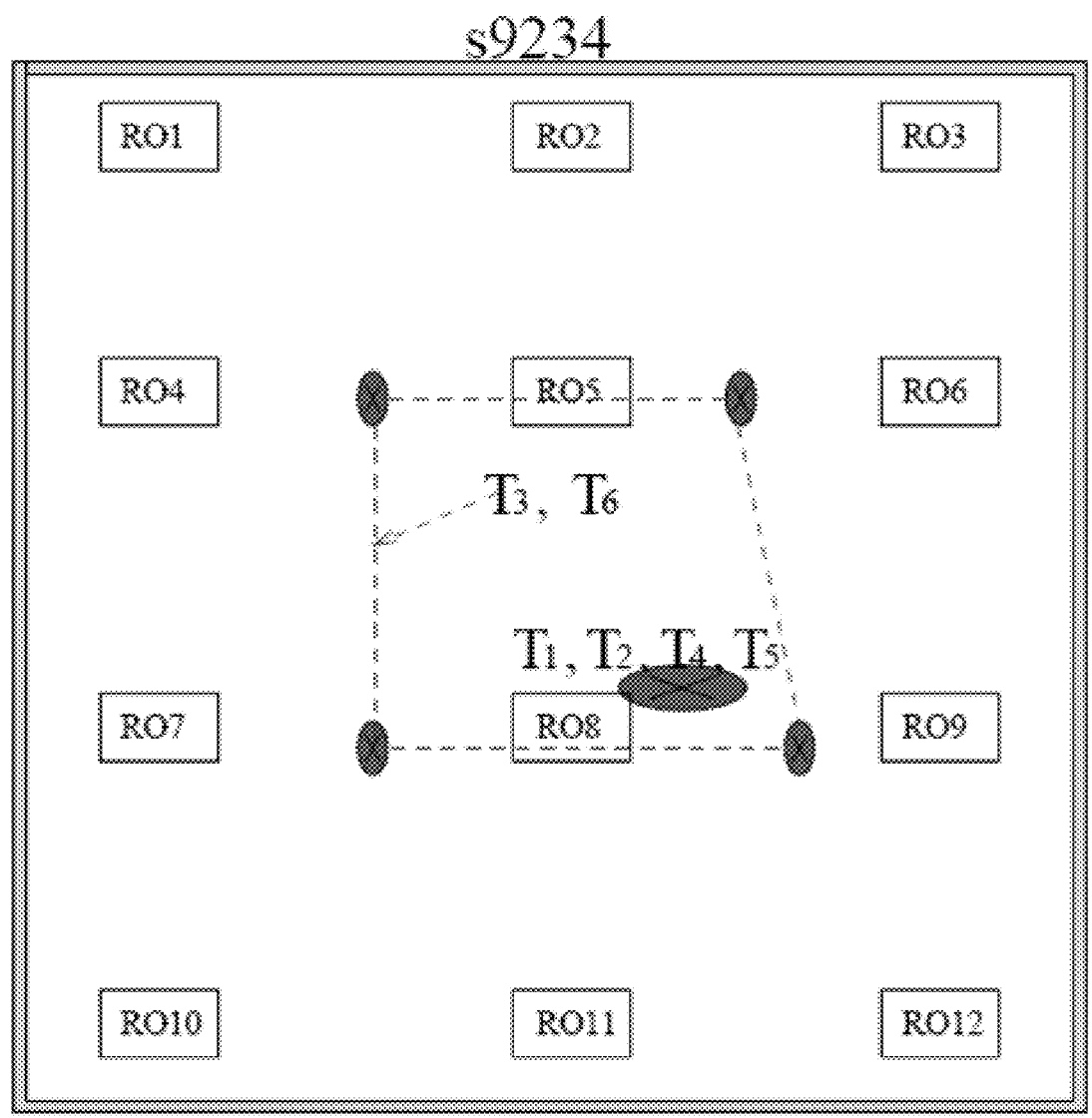
FIGS. 16A-16B illustrate exemplary models of an integrated circuit comprising a RON and a plurality of hardware Trojans in accordance with one or more aspects of the disclosure.

In an aspect, for IC simulation, six Trojans (labeled $T_1$ through $T_6$) with different sizes, distributions, and switching activities are inserted into s9234 benchmark. Such s9234 benchmark is a small benchmark with 145 flip-flops and 420 gates, and is selected for simulation rather than AES (6,089 flip-flops and 18,103 gates) in order to execute time-consuming Monte Carlo simulations efficiently. Few of the Trojans $T_1$-$T_6$ can change the output of the original circuits when they are enabled. FIG. 16A illustrates the location of the ring oscillators and Trojans in the first exemplary embodiment (e.g., embodiment (ii)). The dark-colored circles in FIG. 16A depict corresponding regions employed in the actual embodiment layout by the Trojans. In an aspect, four of the Trojans ($T_1$, $T_2$, $T_4$, and $T_5$) are placed around the ring oscillator RO8. In another aspect, gates in Trojans ($T_3$ and $T_6$) are distributed at different regions within close proximity to RO5, RO7, RO8, and RO9. In yet another aspect, all Trojans have passed a validation test suite including 100,000 random functional patterns as well as structural patterns generated using an automatic test pattern generation (ATPG) tool from Synopsys. While TetraMax can be utilized, any or most any circuit design simulation tool can be employed to perform the simulations described herein. During simulation, the same input patterns generated by a LFSR (or substantially any other random pattern generation) are applied to all ICs, including those ICs which are Trojan-free, to ensure the variable $t_d(t)$ in Eq. (8) is identical or substantially identical. In certain implementations, fast Spice simulation tool Nanosim from Synopsys is employed to conduct power analysis and collect oscillation cycle count in presence of process variations. As described herein, environmental factors can be mitigated or avoided by performing simulations under controlled conditions (for example, simulated temperature is constant).

Figure 16B:
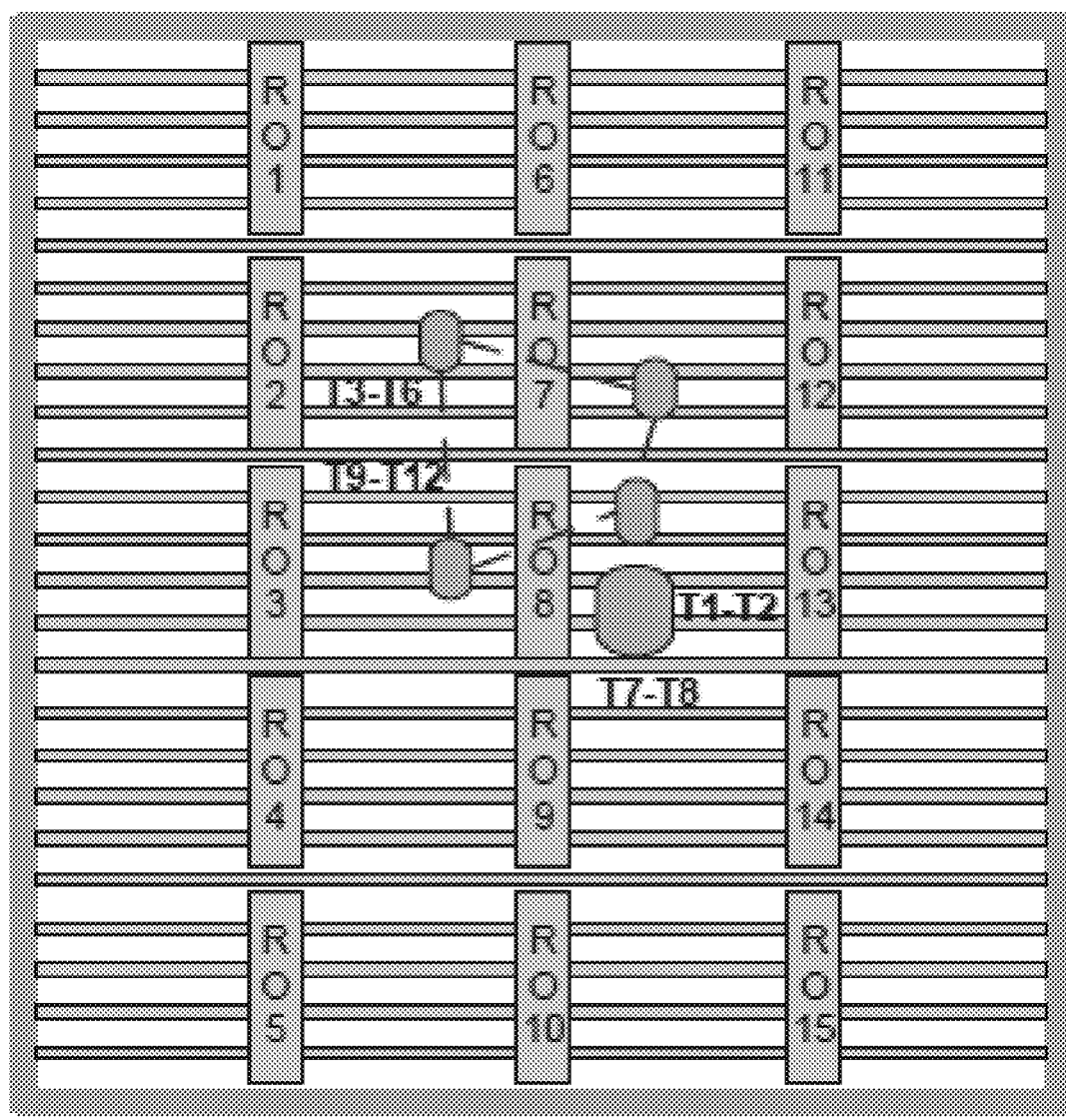

To further illustrate one or more aspects of the disclosure related to detection of malicious hardware insertion (e.g., Trojan insertion), a small s9234 benchmark using Synopsys 90 nm technology, and a larger AES benchmark on Xilinx Spartan-6 FPGAs can be probed and/or analyzed. For IC simulation, in one embodiment, the small s9234 benchmark can be designed to have two vertical power straps and 35 rows, with $N_{ro}=15$ ring oscillators forming the on-chip structure. In one exemplary scenario, twenty Trojans ($T_1$ to $T_{20}$) having different sizes, gates types, and/or physical distributions can be inserted into the s9234 benchmark. Table I shows these twenty Trojans. In such table, FF represents a flipflop, Cen. indicates that the Trojan is centrally located, and Dis. indicates that the Trojan is physically distributed (as illustrated in FIG. 16B, for example). In one implementation, for example, ten of the Trojans can be comparators ($T_1$-$T_{10}$) and the remaining Trojans ($T_{11}$-$T_{20}$) are shift registers. It should be appreciated that none of such Trojans can be detected by a test suite made up, for example, 80,000 random functional patterns and 206 structural patterns (which can be created by ATPG tools) for detecting stuck-at and transition delay faults. In one aspect, a Monte Carlo simulation (performed with Synopsys Nanosim, for example) can be employed to emulate the effects of process variations that can impact the frequencies of the ring oscillators of the on-chip structure and the dynamic current. Simulation temperature can be configured to 25° C. with ±5° C. variations. In another implementation, for hardware validation, eight Trojans ($T_{21}$-$T_{28}$) having different gates and distributions can be inserted into an AES benchmark. Multiple FPGA boards at about room temperature can, for example, embody or comprise Trojan-inserted and Trojan-free implementations of the AES benchmark. Utilization of multiple FPGA boards can permit analysis of the effects of both inter-die and intra-die process variations.

a) Exemplary Analysis of Distribution of Unintended Functional Hardware Modification As described hereinbefore, analysis is conducted for an unintended functional hardware insertion that represents malicious functional hardware, or a hardware Trojan (also referred to as Trojan). In addition, as previously described, six Trojans with different distributions (see, e.g., FIG. 16A) are inserted into the s9234 benchmark to verify the Trojans' distribution impact on the RON. The counter results without process variations are shown in Table II when simulating for 1 μs measurement time and applying 100 input patterns. Results are illustrated with RO1, RO5, RO8, and RO12. DC shows the difference in oscillation cycle count between the Trojan-inserted ($C_{TI}$) and Trojan-free ($C_{TF}$) ICs. Table II reveals that all the ΔC entries are negative. Such result originates in the Trojan gates' impact on VDD noise, thereby increasing the delay of RO gates.

Table II also reveals that $T_1$, $T_2$, $T_4$, and $T_5$ have a larger impact on the oscillation frequency of RO8 than the other ring oscillators. Without wishing to be bound by theory or simulation, such effect arises from the power supply voltage being related to the voltage division coefficient, which is partially determined by the distance between two gates. The smaller such distance, the greater impact the gates of the hardware Trojan gates can have on the ring oscillators. In contrast, for $T_3$ and $T_6$, there is a larger impact on RO5 and RO8 than RO1 and RO12. Thus, for hardware Trojan that is distributed, the combined effect on multiple ROs can be exploited for detection of the hardware Trojan.

TABLE II

Oscillation cycle count of ROs in present of Trojan gates switching without process variations.

| | T1 | | | T2 | | | T3 | | | T4 | | | T5 | | | T6 | | |
|---|---|---|---|---|---|---|---|---|---|---|---|---|---|---|---|---|---|---|
| RO | $C_{TI}$ | $C_{TF}$ | ΔC | $C_{TI}$ | $C_{TF}$ | ΔC | $C_{TI}$ | $C_{TF}$ | ΔC | $C_{TI}$ | $C_{TF}$ | ΔC | $C_{TI}$ | $C_{TF}$ | ΔC | $C_{TI}$ | $C_{TF}$ | ΔC |
| RO1 | 4933 | 4939 | −6 | 4985 | 4989 | −4 | 4944 | 4965 | −21 | 4999 | 4999 | 0 | 4976 | 4985 | −9 | 5000 | 5000 | 0 |
| RO5 | 4735 | 4744 | −9 | 4740 | 4749 | −9 | 4908 | 4948 | −40 | 4906 | 4925 | −19 | 4989 | 4994 | −5 | 4792 | 4819 | −27 |
| RO8 | 4714 | 4545 | −31 | 4932 | 4974 | −42 | 4796 | 4855 | −59 | 4604 | 4635 | −31 | 4936 | 4981 | −45 | 4925 | 4974 | −49 |
| RO12 | 5279 | 5282 | −3 | 4999 | 4999 | 0 | 4943 | 4966 | −23 | 5027 | 5031 | −4 | 5054 | 5062 | −8 | 5242 | 5250 | −8 | b) Exemplary Analysis of Size of Unintended Functional Hardware Insertion

In the subject disclosure, embodiments of the six inserted Trojans $T_1$, $T_2$, $T_3$, $T_4$, $T_5$, and $T_6$ are designed and implemented (e.g., installed, configured, tested, and accepted) with varying sizes to analyze the impact such Trojans can have on the RON architecture. In an aspect, $T_1$, $T_2$, and $T_3$, comprise 8 inverters, 12 inverters, and 25 inverters, respectively. In another aspect, 8 combinational gates comprising AND, INV, and OR embody $T_4$. In yet another aspect, $T_5$ and $T_6$ comprise 25 and 22 combinational gates, respectively. For T1, T2, and T3, the oscillation cycle count difference of RO8 increases with Trojan size from $\Delta C_8=-31$ (for T1) to $\Delta C_8=-59$ (for T3). Without wishing to be bound by theory or simulation, such change in $\Delta C_8$ is believed to occur due to the greater power supply noise imparted from the Trojan gates as the Trojan size increases. As the power supply voltage is lowered, the speed of a ring oscillator that is part of a RON drops. Similar results are found for $T_4$, $T_5$, and $T_6$. In general, the greater the size of the Trojan, the larger impact it can have on the power supply network and consequently the greater impact on the ring oscillators.

As described herein, in the embodiment illustrated in FIG. 16B, twenty Trojans with different distributions can be inserted into a benchmark to analyze (e.g., assess) the impact of distribution of a Trojan on at least one of a RON contained in the benchmark or the dynamic current of the benchmark. Table II below illustrates results for RO frequency and dynamic current of $T_1$-$T_3$, $T_6$, $T_7$, and $T_{12}$ with four ring oscillators (RO1, RO7, RO8, and RO15) during a 1000 clock cycle LFSR test in one exemplary analysis implementation that includes a simulation without variations. Since the IC's dynamic current varies with a test pattern that is applied, the waveform of the dynamic current can be recorded during the simulation. In Table II below, $T_f$ is indicative of data collected from Trojan-free ICs; T, is indicative of data collected from Trojan-inserted ICs; and ΔT is indicative of the difference between results associated with the Trojan-inserted ICs and the Trojan-free ICs. In one aspect, from Table II below, it can be appreciated that malicious functional hardware (e.g., a Trojan) can consume extra power, increase the dynamic current, and decrease the cycle count of the ring oscillators.

flops. From Table II, it can be appreciated that in these seven Trojans, the oscillation cycle count difference of RO8 increased with Trojan size from −3 (for $T_1$) to −59 (for $T_{20}$). Without wishing to be bound by theory, simulation, and/or modeling, such increase can be due to the greater power supply noise imparted from the Trojan gates. In another

TABLE I

TROJAN DETECTION RATES WITH PROCESS VARIATIONS.

| | Combinational Trojans | | | | | | | | | |
|---|---|---|---|---|---|---|---|---|---|---|
| | $T_1$ | $T_2$ | $T_3$ | $T_4$ | $T_5$ | $T_6$ | $T_7$ | $T_8$ | $T_9$ | $T_{10}$ |
| Sizes Distribution | 2 gates Cen. | 3 gates Cen. | 4 gates Dis. | 5 gates Dis. | 7 gates Cen. | 8 gates Dis. | 10 gates Dis. | 12 gates Cen. | 16 gates Dis. | 20 gates Dis. |
| | Sequential Trojans | | | | | | | | | |
| | $T_{11}$ | $T_{12}$ | $T_{13}$ | $T_{14}$ | $T_{15}$ | $T_{16}$ | $T_{17}$ | $T_{18}$ | $T_{19}$ | $T_{20}$ |
| Sizes Distribution | 2 FFs Cen. | 3 FFs Cen. | 4 FFs Dis. | 5 FFs Dis. | 6 FFs Cen. | 7 FFs Dis. | 8 FFs Dis. | 10 FFs Dis. | 12 FFs Dis. | 16 FFs Dis. |

TABLE II

OSCILLATION CYCLE COUNT OF SOME OF THE RING OSCILLATORS AND CIRCUIT DYNAMIC CURRENT IN PRESENCE OF HARDWARE TROJANS WITHOUT PROCESS VARIATIONS.

| | | $T_1$ | | | $T_3$ | | | $T_6$ | | | $T_{10}$ | | |
|---|---|---|---|---|---|---|---|---|---|---|---|---|---|
| | | $T_f$ | $T_i$ | ΔT | $T_f$ | $T_i$ | ΔT | $T_f$ | $T_i$ | ΔT | $T_f$ | $T_i$ | ΔT |
| Average Dynamic Current (μA) | | 29.8 | 29.84 | 0.04 | 25.56 | 25.65 | 0.09 | 24.94 | 25.08 | 0.14 | 24.94 | 26.1 | 1.16 |
| RO (Cycle Count) | RO8 | 2790 | 2787 | −3 | 3396 | 3392 | −5 | 3064 | 3054 | −10 | 3064 | 3024 | −40 |
| | RO7 | 3021 | 3021 | 0 | 3528 | 3528 | −2 | 3008 | 3005 | −3 | 3008 | 2998 | −10 |
| | RO1 | 2952 | 2952 | 0 | 3377 | 3377 | 0 | 2985 | 2984 | −1 | 2985 | 2982 | −3 |
| | RO15 | 3103 | 3103 | 0 | 3406 | 3406 | 0 | 2803 | 2803 | 0 | 2803 | 2801 | −2 |
| | | $T_{11}$ | | | $T_{16}$ | | | $T_{20}$ | | | | | |
| | | $T_f$ | $T_i$ | ΔT | $T_f$ | $T_i$ | ΔT | $T_f$ | $T_i$ | ΔT | | | |
| Average Dynamic Current (μA) | | 27.48 | 27.6 | 0.12 | 23.14 | 23.77 | 0.63 | 26.85 | 29.05 | 2.25 | | | |
| RO (Cycle Count) | RO8 | 3150 | 3141 | −9 | 3120 | 3084 | −36 | 3031 | 2972 | −59 | | | |
| | RO7 | 3117 | 3117 | −0 | 3158 | 3150 | −8 | 2925 | 2914 | −11 | | | |
| | RO1 | 3042 | 3042 | 0 | 3198 | 3198 | 0 | 2980 | 2977 | −3 | | | |
| | RO15 | 3132 | 3132 | 0 | 3210 | 3210 | 0 | 3012 | 3011 | −1 | | | |

In another aspect, from Table II below, it can be appreciated that $T_1$, $T_3$, and $T_{11}$ can have a larger impact on the oscillation frequency of RO8 than the other ring oscillators. Similarly, for $T_6$, $T_{10}$, $T_{16}$ and $T_{20}$, there is a larger impact on RO8 and RO7 than RO1 and RO15. Without wishing to be bound by theory, simulation, and/or modeling, such phenomenon can be explained by the power supply voltage's dependence on the voltage division coefficient which can be determined, at least in part, by a distance between two gates, wherein a smaller distance can yield greater Trojan impact on RO frequencies (or cycle counts). Results for Trojans other than those presented at Table II exhibit similar behavior for RO frequencies. Yet, results for total dynamic current indicate variation with the distributions of Trojans.

Various embodiments, each comprising twenty Trojans having varying sizes, can permit analysis of the impact that Trojan size can have on a RON architecture and dynamic current of ICs. The foregoing Table I presents features of such Trojans. In one aspect, Trojans $T_1$-$T_{10}$ can comprise combinational gates, whereas Trojans $T_{31}$-$T_{20}$ can comprise flipaspect, as the power supply voltage is lowered, the speed of the ring oscillator can decrease. In another aspect, dynamic current of a Trojan-free IC can be lower that the dynamic current of a Trojan-inserted IC. For instance, dynamic current can vary from 0.04 μA for a Trojan-free IC to 2.25 μA in a Trojan-inserted IC. In yet another aspect, larger Trojans can consume more power. Similar results can obtained for other Trojans analyzed herein. In general, larger Trojans can have greater impact on the power supply network and consequently can have greater impact on the ring oscillators and dynamic current measurements.

c) Exemplary Analysis of Switching Activity of Unintended Functional Hardware Insertion Features of a hardware Trojan other than size also can impact oscillation frequency of a ring oscillator. As an example, switching activity of the hardware Trojan can dictate, at least in part, the oscillation frequency of a ring oscillator. In the interest of simulation running time, we designed few Trojans featuring frequent switching activities. In certain embodiments, $T_1$, $T_2$, and $T_3$ switch about 760 times, 1140 times, and 2375 times, respectively, during application period of an input pattern (or challenge input pattern). In additional or alternative embodiments, $T_4$, $T_5$, and $T_6$ switch about 665 times, 2090 times and 1850 times during application period of an input pattern. Table II conveys at least one trend: the more frequently the Trojan switches, the greater the voltage drop imparted on the ring oscillator gates, which in turn, impacts oscillation cycle count reported by the ring oscillator.

d) Process Variation Analysis

Random process variations, consisting of 10% voltage threshold (8% inter-die and 2% intra-die), 3% oxide thickness (2% inter-die and 1% intra-die), and 10% channel length (8% inter-die and 2% intra-die) in 90 nm technology library, are used in the following simulations. In one aspect, al the simulations are performed at a temperature of 25° C. In an aspect, 100 Trojan-free ICs and 600 Trojan-inserted ICs (100 per Trojan, for example) are generated by Monte Carlo simulations. Data collected from such ICs can be processed in accordance with the exemplary methodology described herein. While detailed results of detection analysis are illustrated for $T_5$, it is noted that the various features that emerge from such analysis also are present in $T_1$, $T_2$, $T_3$, $T_4$ and $T_6$.

Figure 17G:
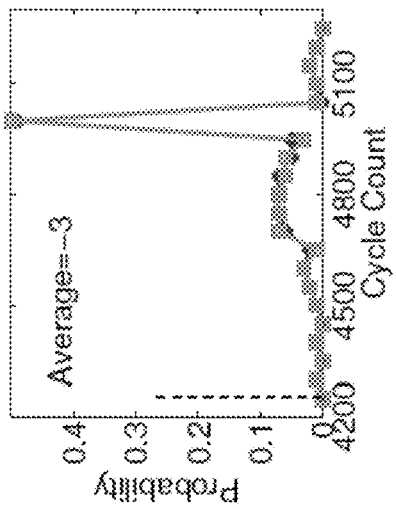
Figure 17H:
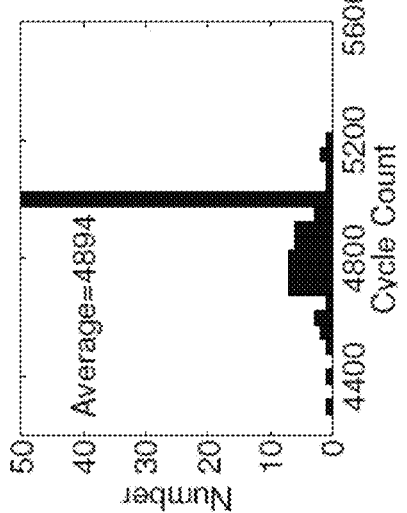
Figure 17I:
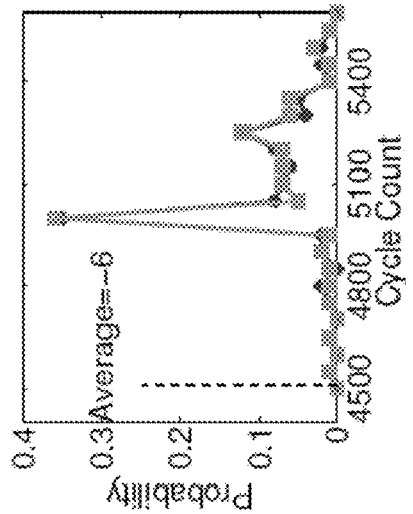
Figure 17J:
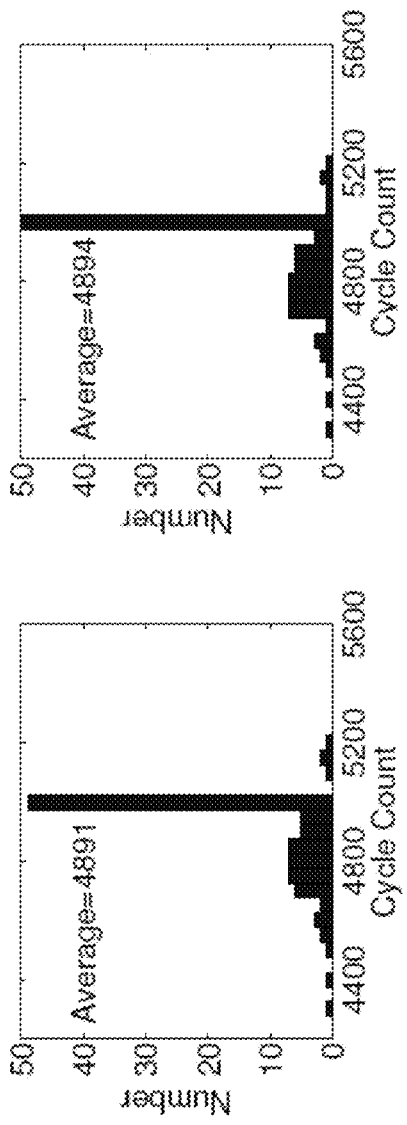
Figure 17K:
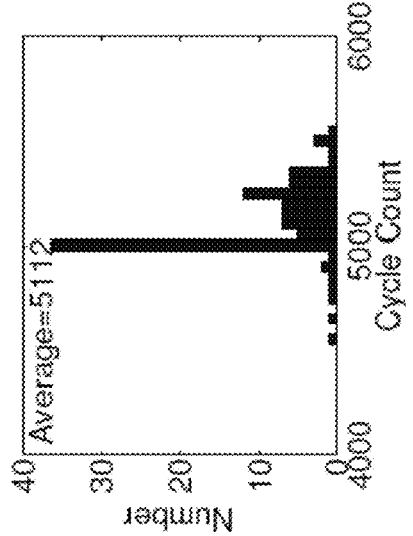
Figure 17L:
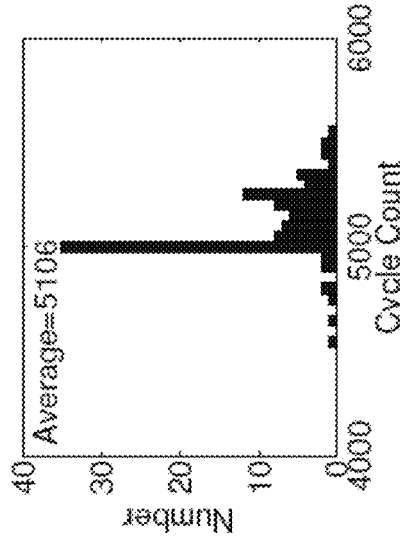

Simple outlier analysis is first applied to distinguish the effect of a Trojan from the effect of process variations. Histograms obtained from RO1, RO5, RO8, and RO12 are shown in FIGS. 17A-17L, each such histogram showing the distribution of oscillation cycle count originated from the data obtained in the presence of process variations and T5. FIG. 17A displays the histogram of the cycle count of oscillations reported by RO8 with the Trojan inserted, and FIG. 17B illustrates the same result without (w/o) such Trojan. The distribution of the two sets of oscillation cycle counts are plotted in FIG. 17C. In addition, FIGS. 17D-17L present the data distribution collected from RO5, RO1, and RO12, respectively. A significant change in RO5, RO1, and RO12 is not gleaned from the results. However, due to the presence of T5, the distribution of cycle counts of RO8 can shift toward higher cycle counts. For RO8, the oscillation cycle count can range from about 4400 to about 5350 in Trojan-free ICs, and the boundary is marked by a black dashed line in FIG. 17C. Three ICs out of the 100 ICs being under authentication are outside of the range, and thus are identified to contain Trojan.

Figure 18:
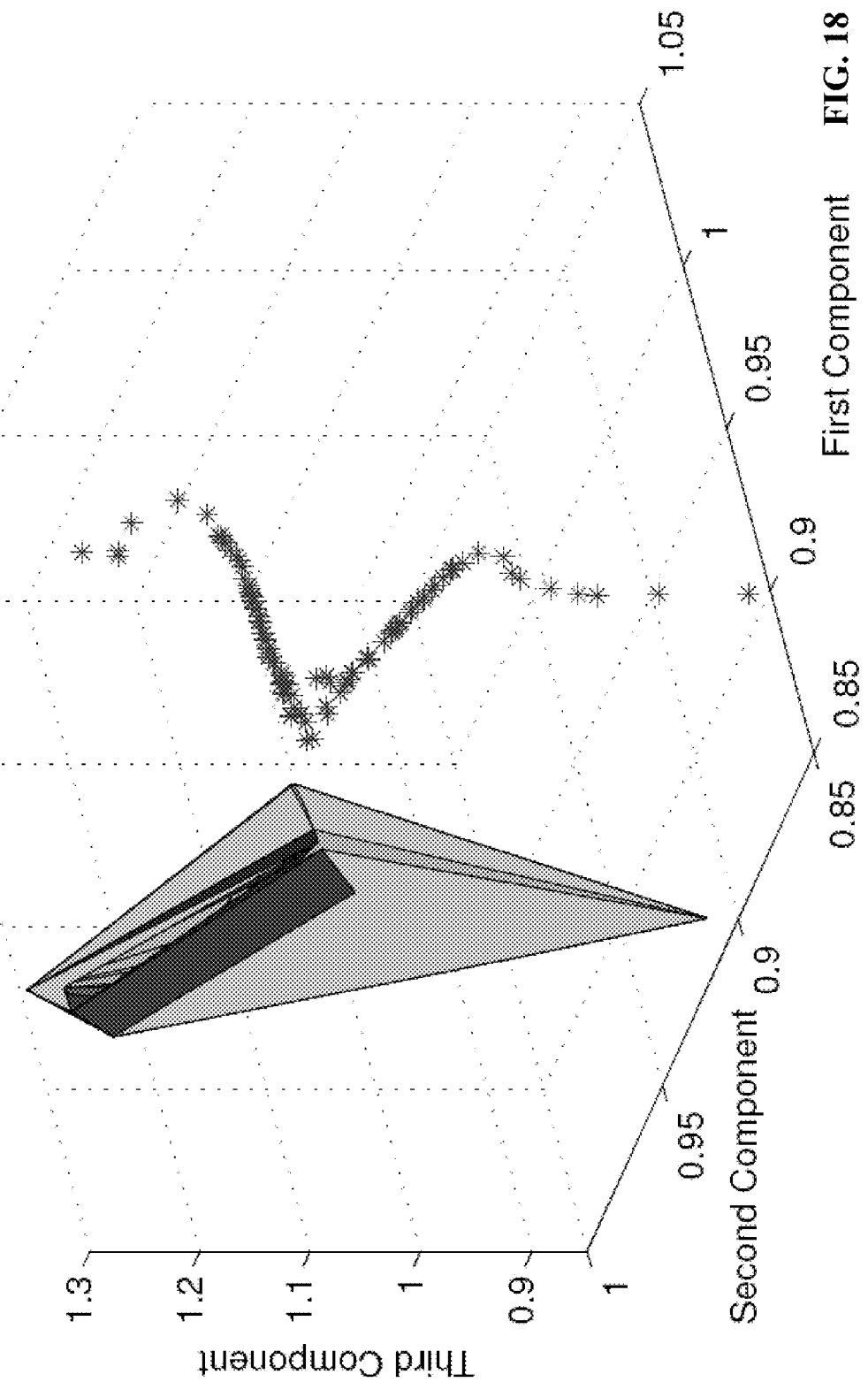
FIG. 18 illustrates results of principal component analysis (PCA) of power signatures for an IC comprising a malicious hardware modification and the IC without such modification in accordance with one or more aspects of the disclosure.

For the remaining 97 ICs, PCA is carried out to analyze the data. FIG. 18 illustrates power signature comparison using PCA for Trojan detection in accordance with one or more aspects described herein. The convex hull (grey region in FIG. 18) can be drawn from the first three principal components with Trojan-free ICs. The asterisks are indicative of data obtained from ICs with an inserted Trojan. As depicted, the asterisks appear separately from the convex hull. Thus, with the RON architecture and statistical analysis, $T_5$ can be detected with 100% accuracy. However, in certain embodiments and due to limitations imposed by the statistical methods and the increasingly larger process variations of nanoscale technologies, smaller Trojans may be unlikely to be detected with such accuracy.

Figure 19A:
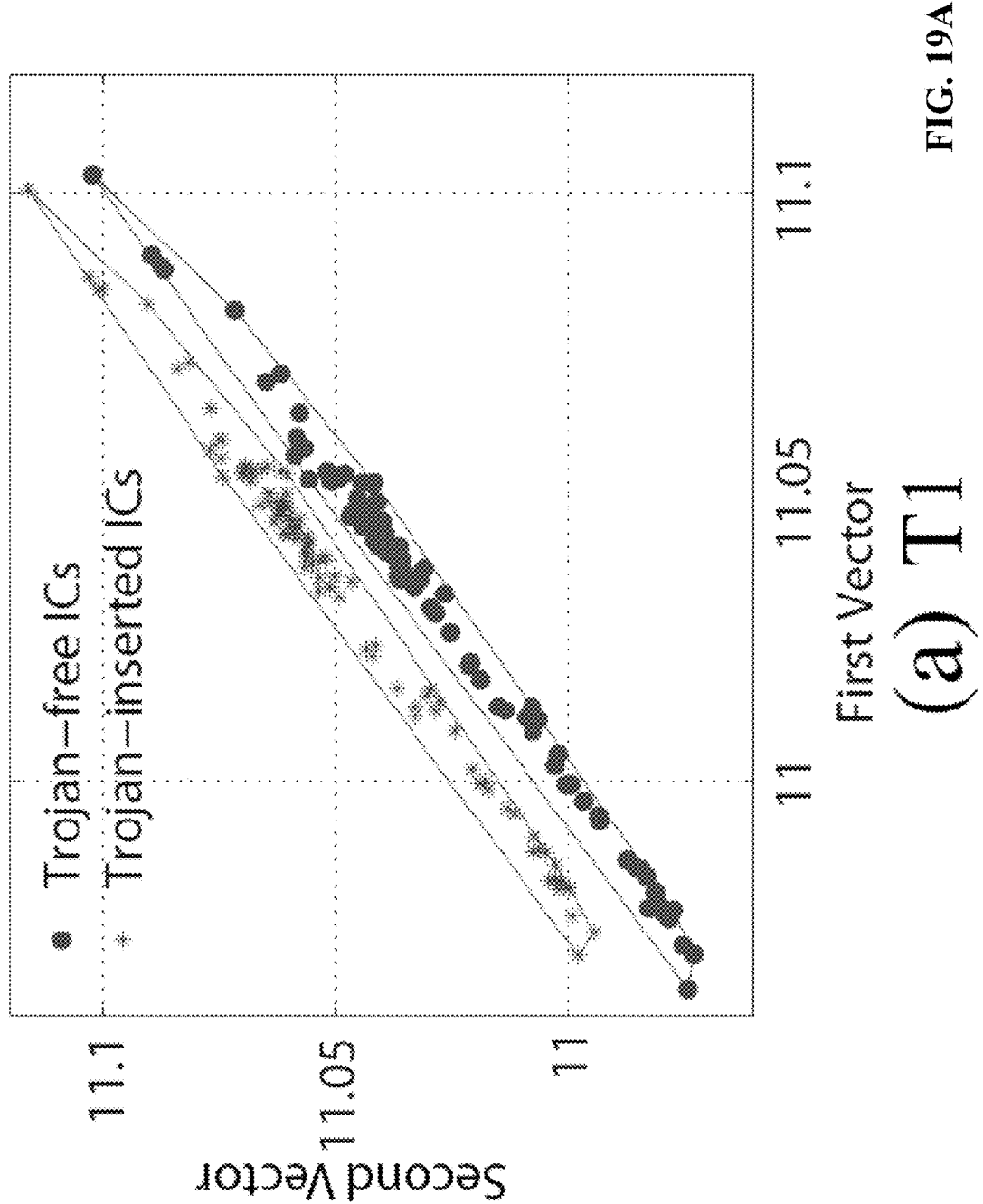
Figure 19C:
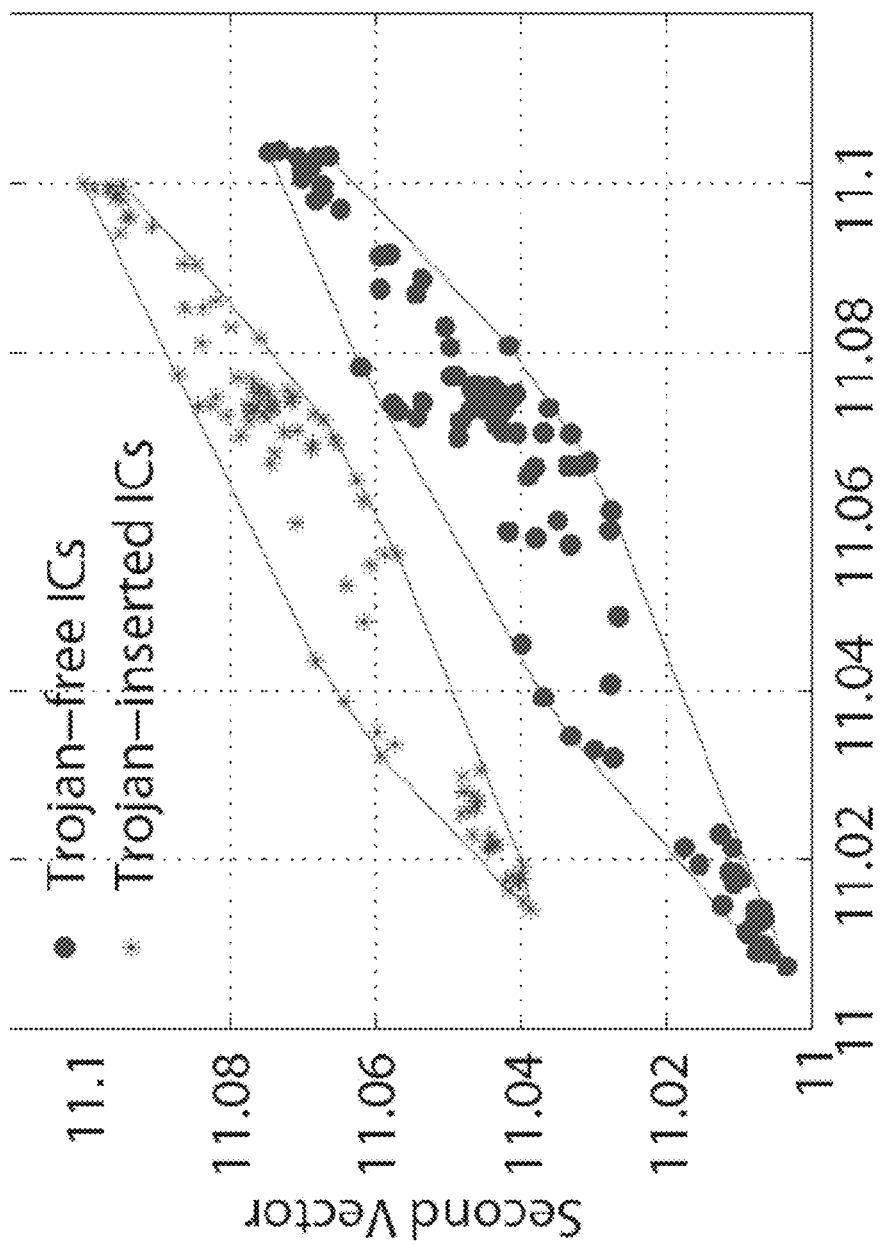
Figure 19D:
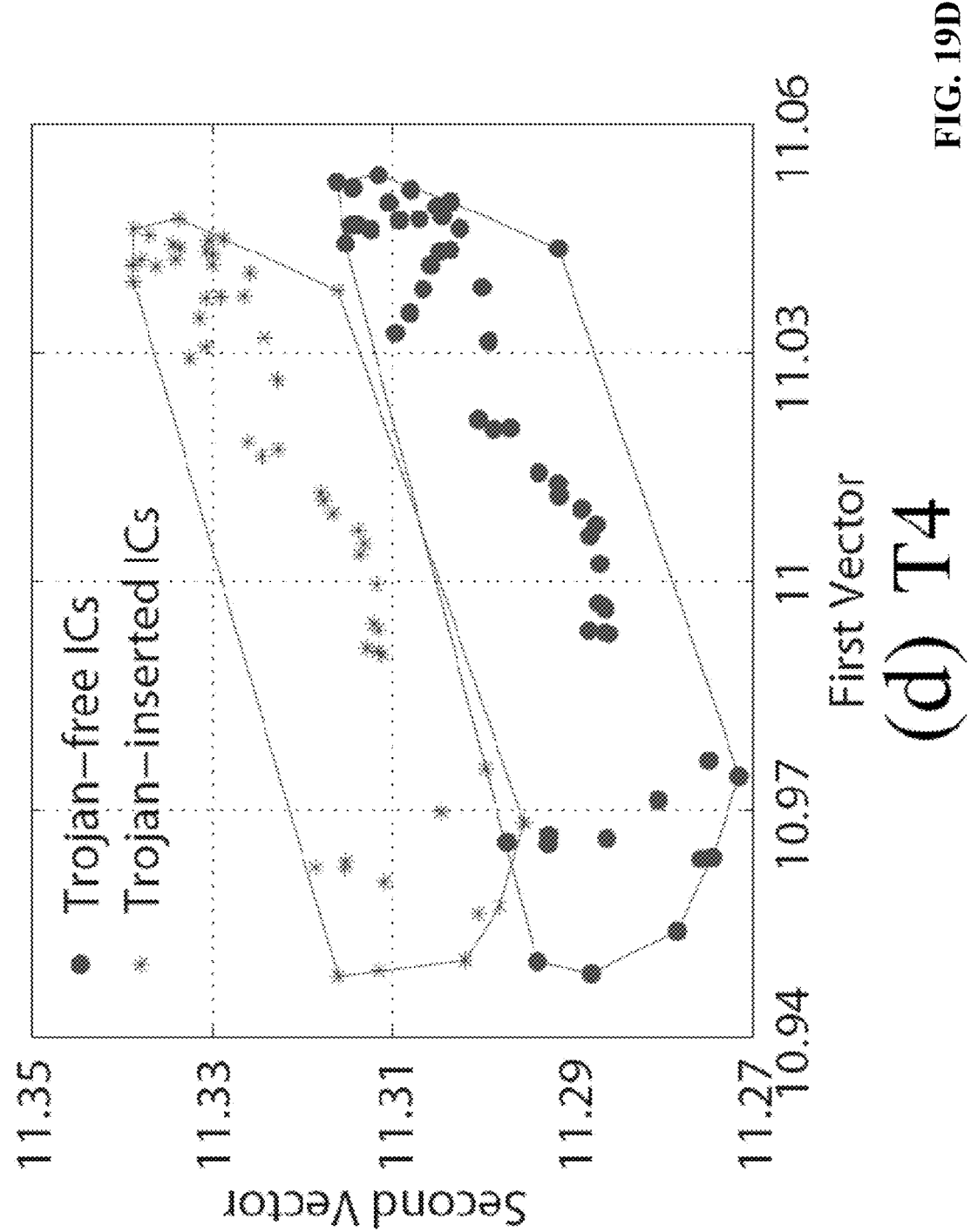
Figure 19E:
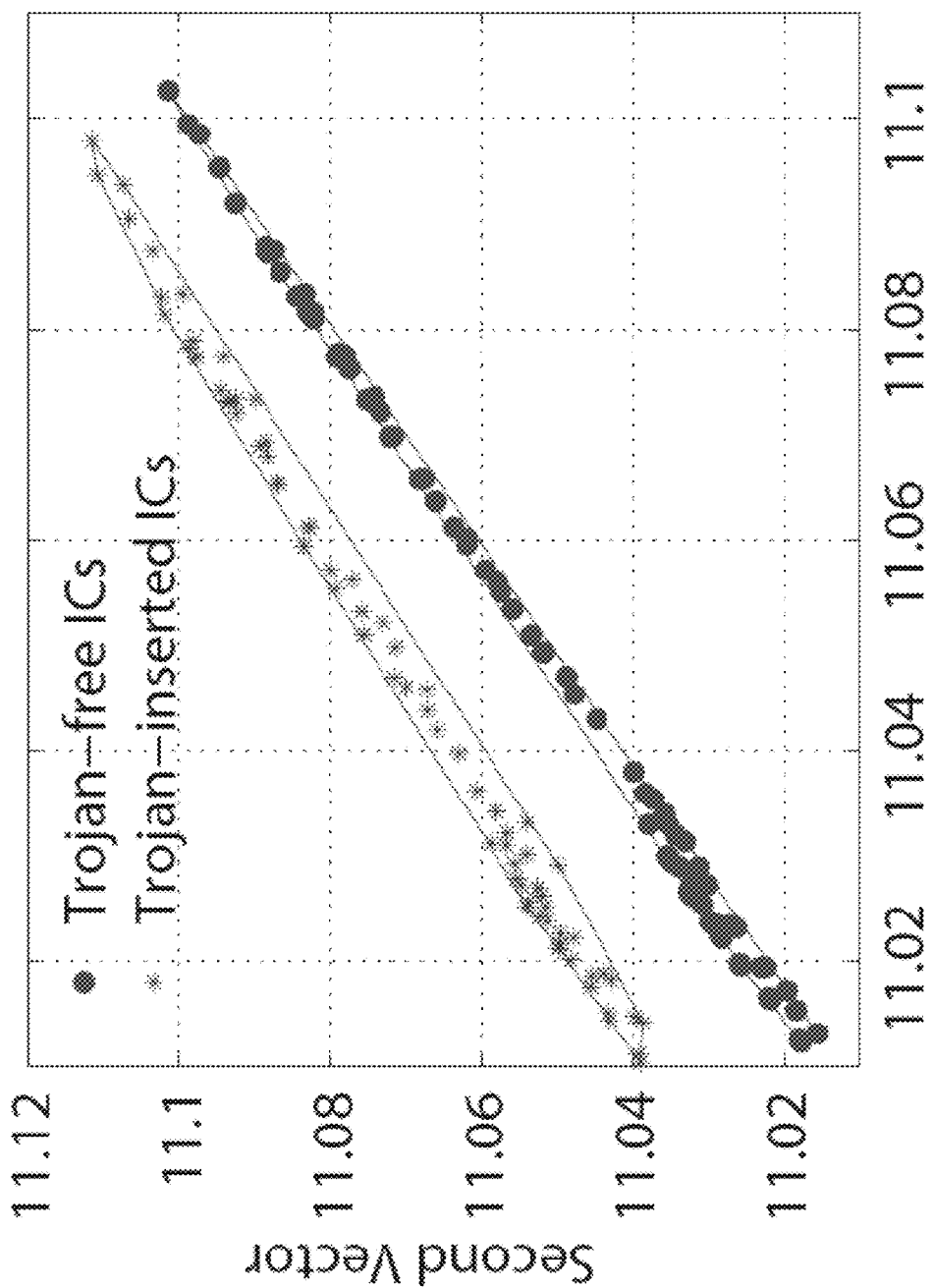
Figure 19F:
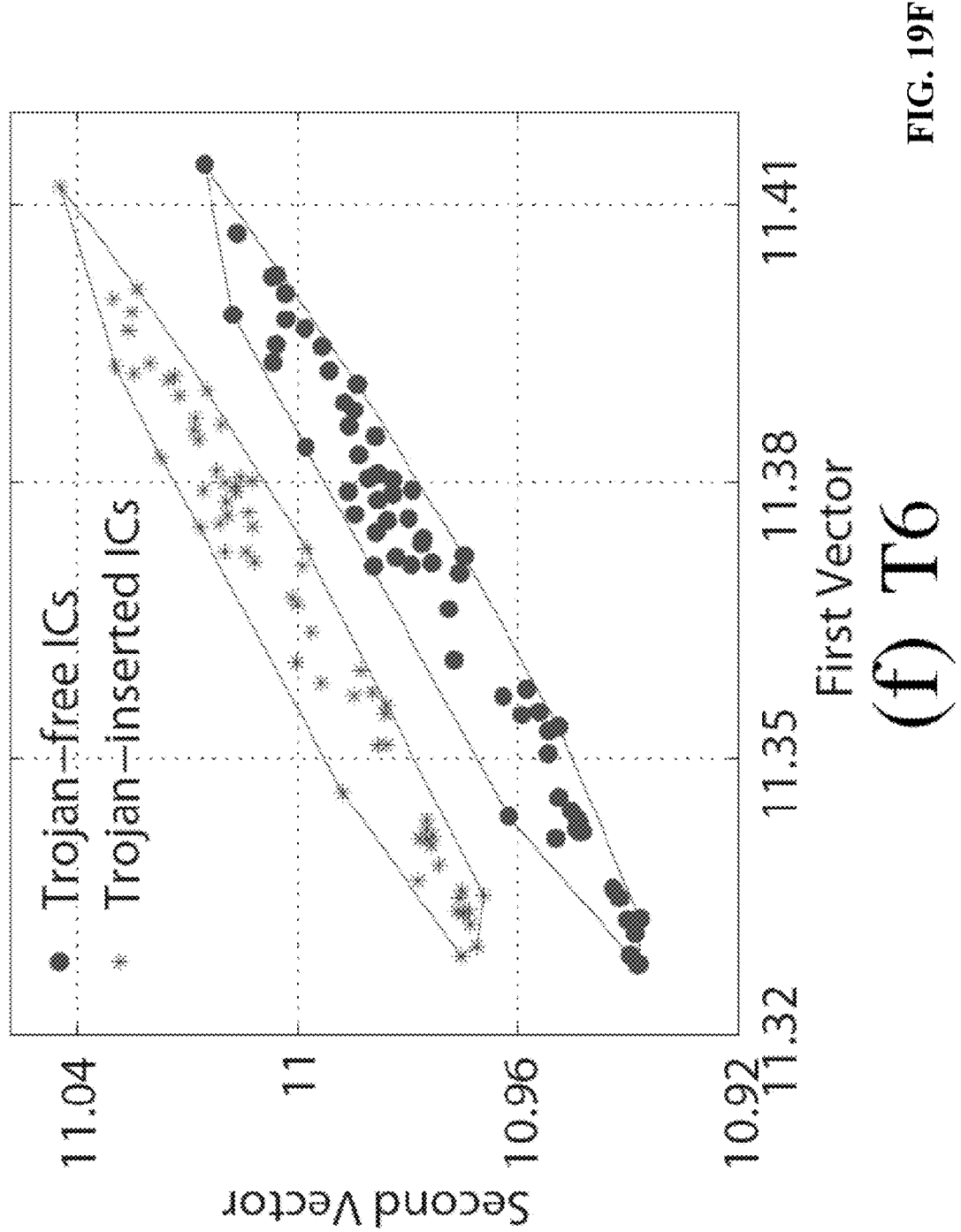

As described herein, the disclosed advanced outlier analysis also can be utilized to identify Trojan-inserted ICs. In one aspect, advanced outlier analysis can be conducted in accordance with the exemplary method presented in FIG. 15B. There can be a total of 12×11=132 power signatures generated by the Trojan-free ICs. In the illustrated results for advanced outlier analysis, the power signature that can detect the most Trojan-inserted ICs is described. As an example, for Trojan $T_5$, FIG. 19E displays the advanced outlier analysis result. The solid dots represent Trojan-free ICs and asterisks represent Trojan-inserted ICs. The illustrated results convey that all of the Trojan-inserted ICs are outside, or do not overlap, of the Trojan-free ICs. Thus, the detection rate with $T_5$ using advanced outlier analysis is 100%.

Similarly, yet not identically, Trojans $T_1$, $T_2$, $T_3$, $T_4$, and $T_6$ with 100 Trojan-free ICs and 100 Trojan-inserted ICs also can be simulated and data analysis based on advanced outlier analysis also can be applied for each one of such Trojans. By simple outlier analysis, one Trojan-inserted IC is detected with $T_1$, $T_2$, and T4 and two Trojan-inserted ICs are identified with $T_3$ and $T_6$. Using PCA, Trojan-inserted ICs detected with $T_1$, $T_2$, $T_3$, $T_4$, and $T_6$ are 16, 17, 8, 10, and 29, respectively. The remaining Trojan-inserted ICs can be analyzed by advanced outlier analysis as described herein. FIG. 19A-19F present results of such analysis. In order to illustrates the effectiveness of a RON in combination with the disclosed advanced outlier analysis, the Trojan-inserted ICs detested by simple outlier analysis and PCA also can be plotted FIGS. 19A-19F. Combined simple outlier analysis, PCA, and advanced outlier analysis, can yield a rate of detection of a Trojan for T2, T3, and T6 can be about 100%. In one aspect, for smaller Trojan T1, the rate of detection is about 100%, even though the Trojan-inserted ICs can be yield results that are significant similar to results for Trojan-free ICs. In another aspect, for Trojan $T_4$, about 98% Trojan-inserted ICs are detected. It is noted that the rates of detection presented herein can arise from particular (e.g., the best or second best) distributions selected from 132 power signatures. In yet another aspect, when all power signatures are included in the analysis, the detection rate for all Trojans including $T_4$ is about 100%. It is also noted that the analysis described herein can be conducted for at least one or more of the following scenarios: very small Trojans, different pattern sets, or Trojans that switch rarely. It is further noted that a pattern set that can be effective at generating switching in the Trojan circuit, a RON to which the pattern set is applied can be more effective than in a scenario in which another patter set is less effective at generating such switching.

Various random process variations can be utilized in the simulations described herein in order to analyze impact of such variations on an IC having an on-chip architecture in accordance one or more aspects of the disclosure. For example, random process variations can comprise 10% voltage threshold variations (split as 5% inter-die variation and 5% intra-die variation, for example); 3% oxide thickness variations (split as 2% inter-die variation and 1% intra-die variation, for example); and 10% channel length variation (split as 5% inter-die variation and 5 intra-die variation). Random variations can be incorporated into simulations for IC within 90 nm technology via one or more libraries accessible to a computing device that can perform the simulations. In one exemplary analysis scenario, 200 Trojan-free ICs and 100 Trojan-inserted ICs for each Trojan can be generated by Monte Carlo simulations. The exemplary methodology for statistical data analysis can be employed to process information (e.g., emulated data) collected from such ICs. In one aspect, $T_{10}$, which can comprise 20 combinational gates, can be utilized to illustrate results of the data analysis in detail.

Figure 20A:
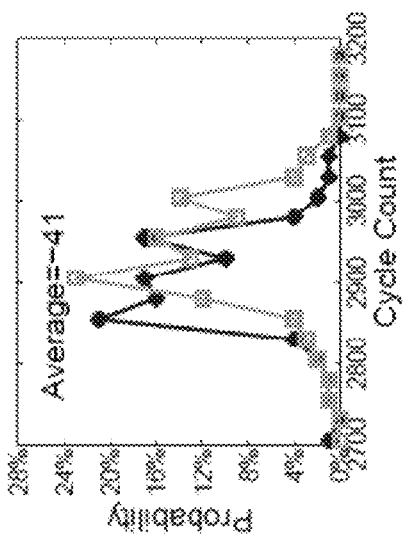
Figure 20B:
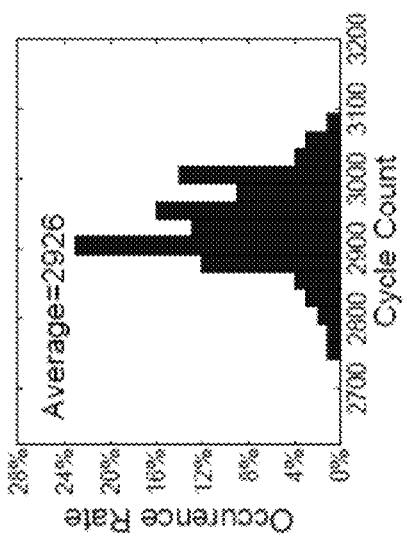

In one aspect, simple outlier analysis can be initially applied to distinguish effect of Trojans and process variations. Distribution of oscillation cycle counts in the presence of process variations in a s9234 IC having $T_{10}$ inserted therein can be generated based on results obtained from simulation of RO1, RO7, RO8, and RO15. FIGS. 20A-20L present exemplary histograms of such distributions. FIG. 20A displays a histogram of the cycle counts obtained from simulations of RO8 with the Trojan inserted, whereas FIG. 20B presents results for same type of analysis in the absence of the Trojan.

Figure 20C:
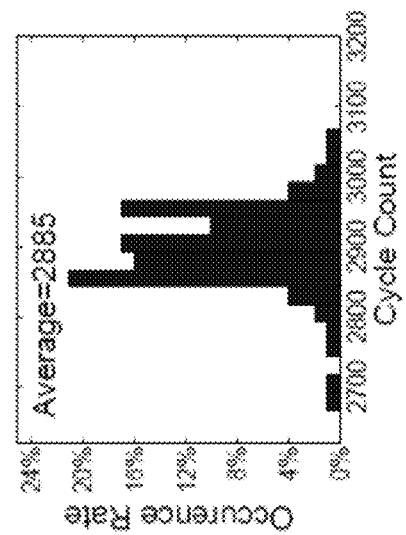
Figure 20D:
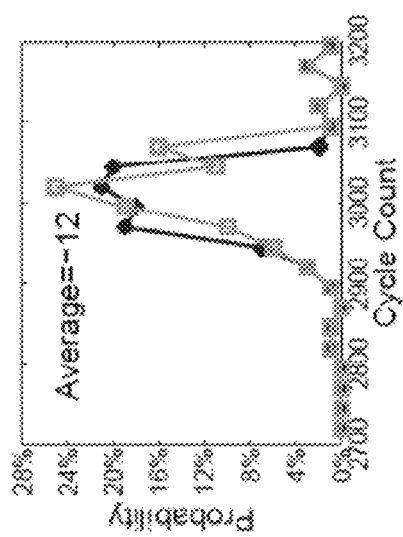
Figure 20E:
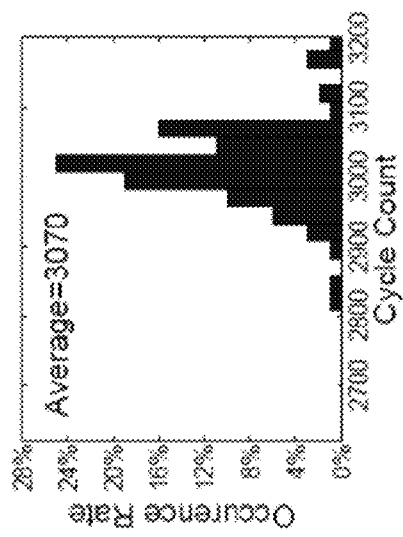
Figure 20F:
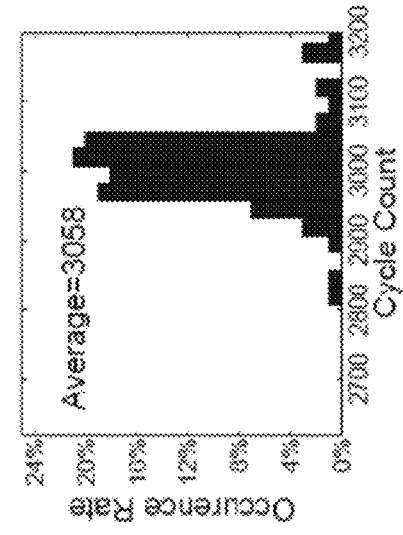

The distributions of the two sets of oscillation cycle counts are shown in FIG. 20C. In one aspect, FIGS. 20D-20L illustrate data distributions collected from RO7, RO1, and RO15, respectively. Such data do not convey a significant change in the frequency of RO7, RO1, and RO15. Yet, in one aspect, due to the presence of $T_{10}$, which is located near RO8, the distribution of RO8 shifts leftward considerably. For RO8, the oscillation cycle count range ranges from about 2756 to about 3090 in Trojan-free ICs and the boundary is marked by a black dashed line in FIG. 20C.

Figure 21A:
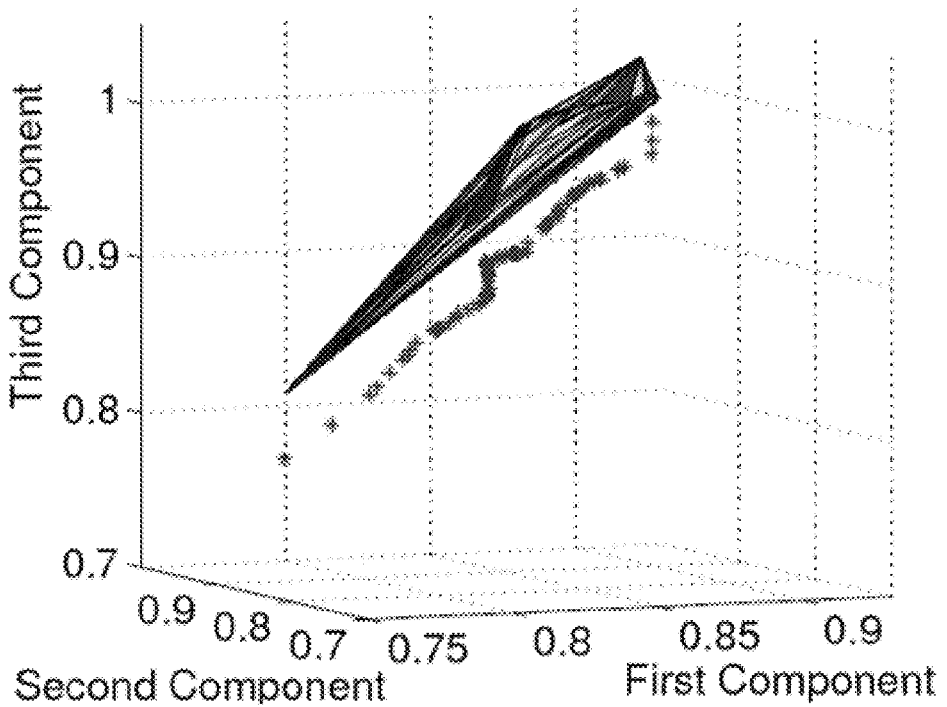
FIGS. 21A-21B illustrate results of analysis of power signatures for various IC comprising a malicious hardware modification and their counterparts without such modification in accordance with one or more aspects described herein.
Figure 21B:
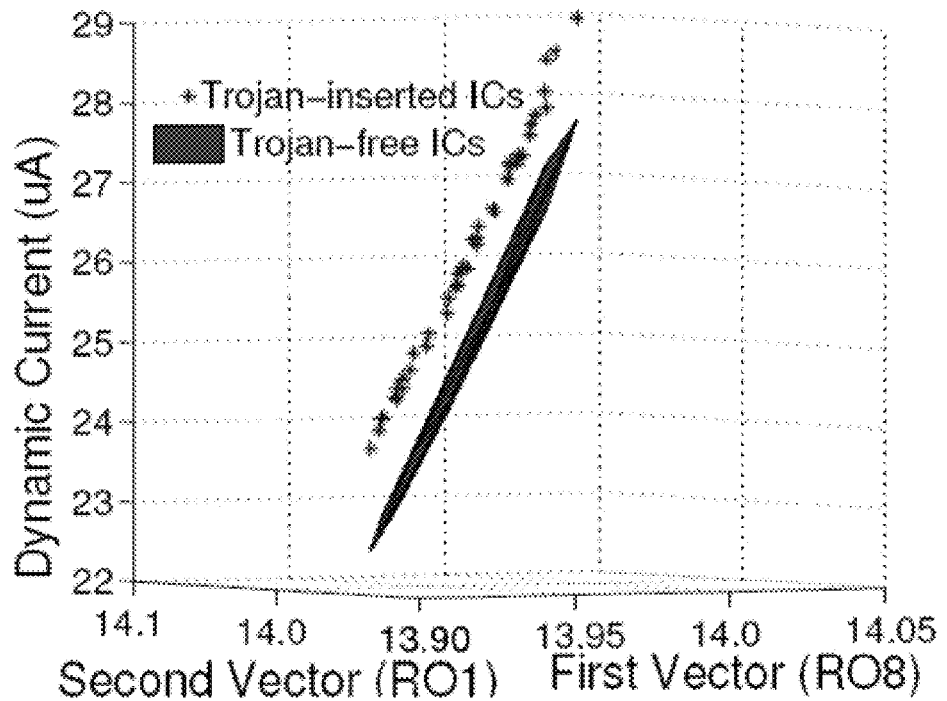
Figure 22A:
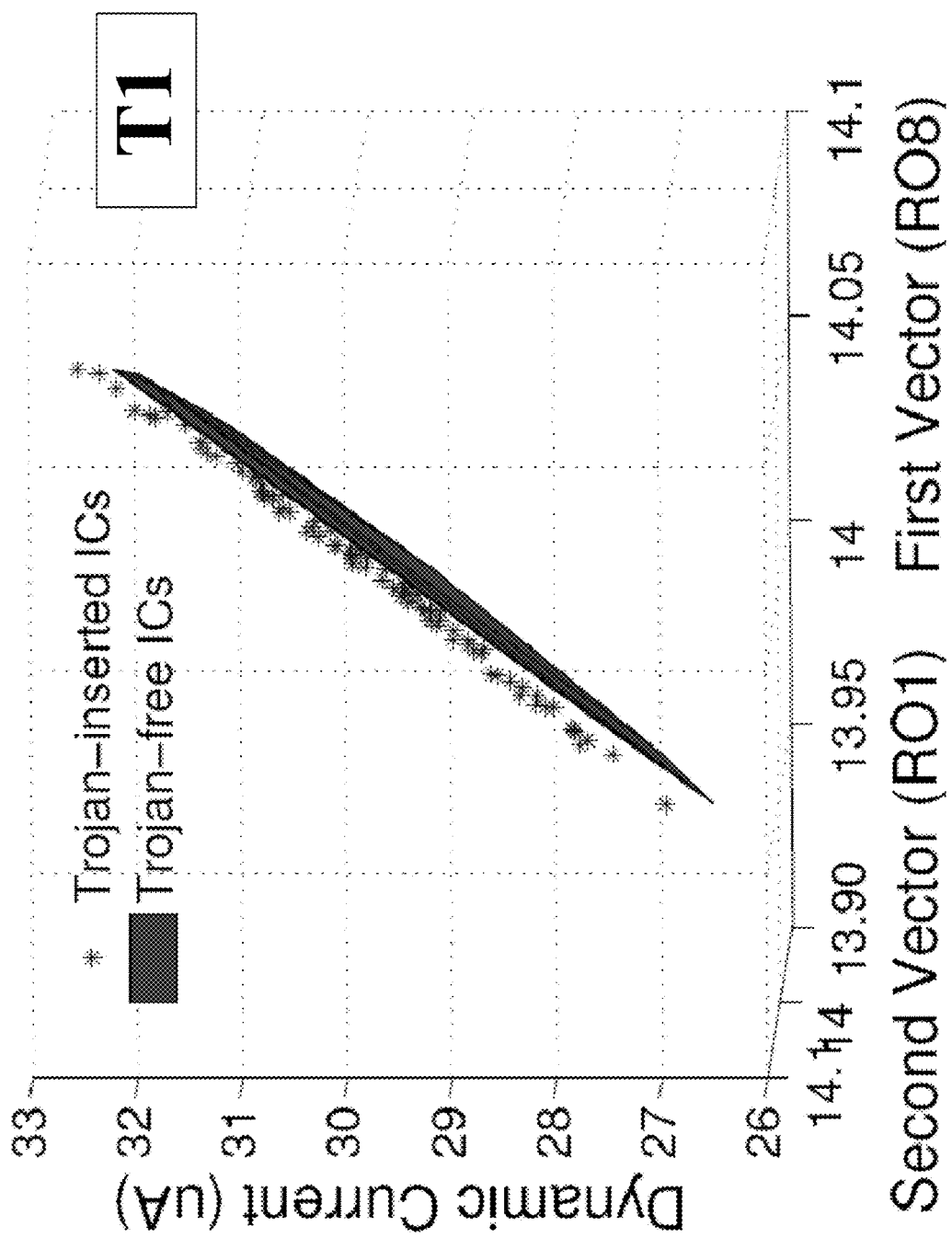
FIGS. 22A-22D illustrate results of analysis of power signatures for various IC comprising a malicious hardware modification and their counterparts without such modification in accordance with one or more aspects described herein.
Figure 22B:
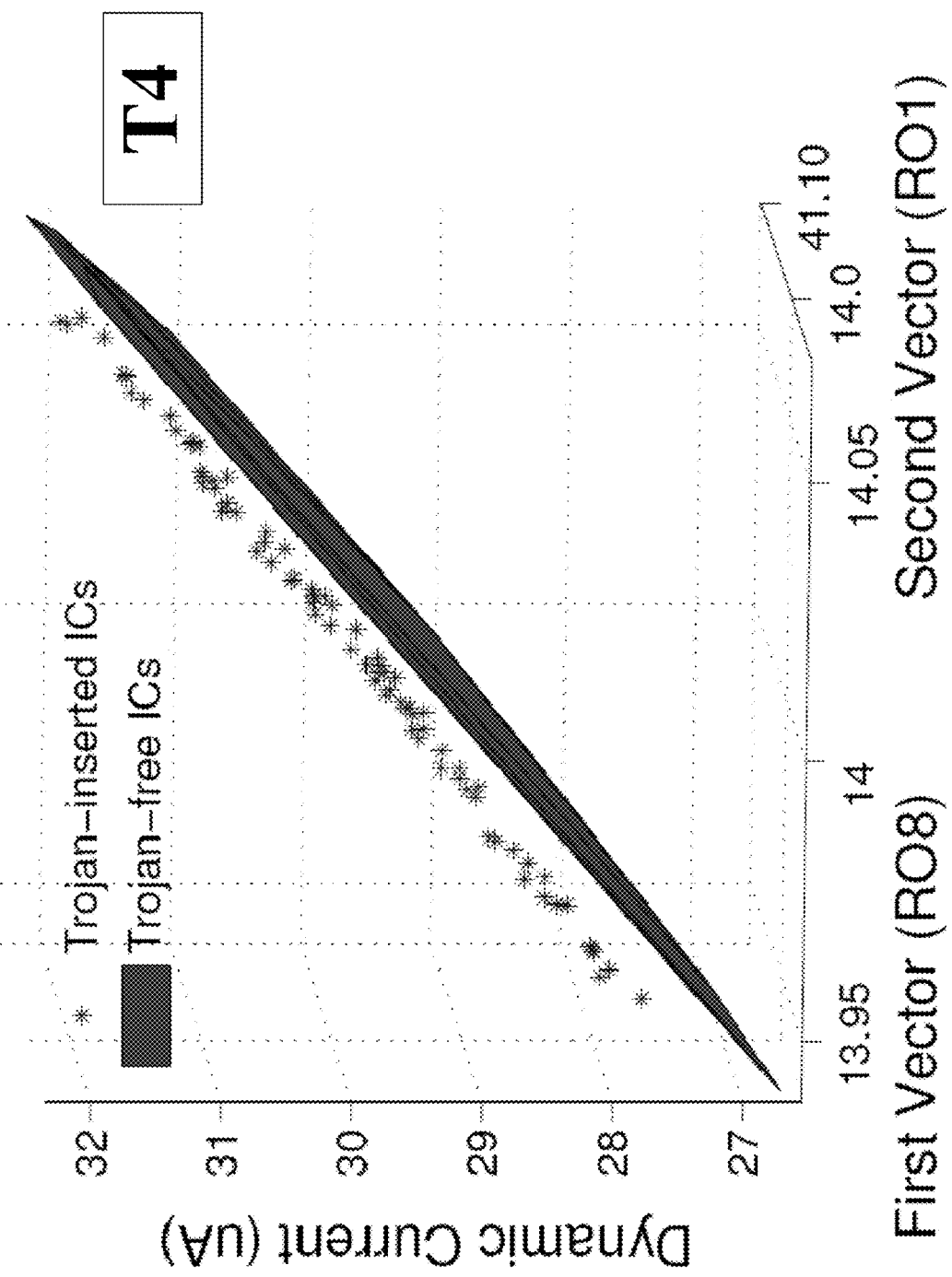
Figure 22C:
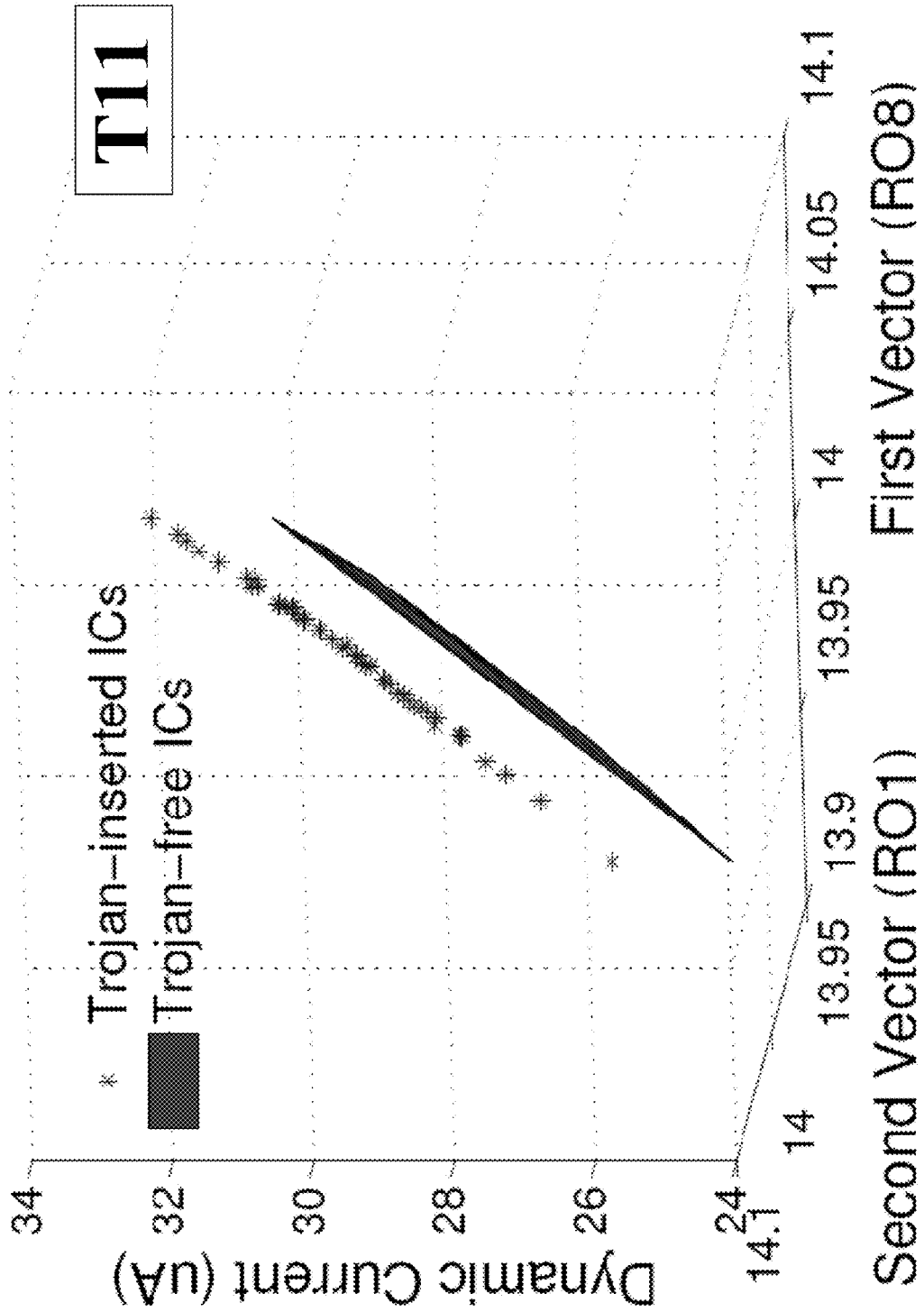
Figure 22D:
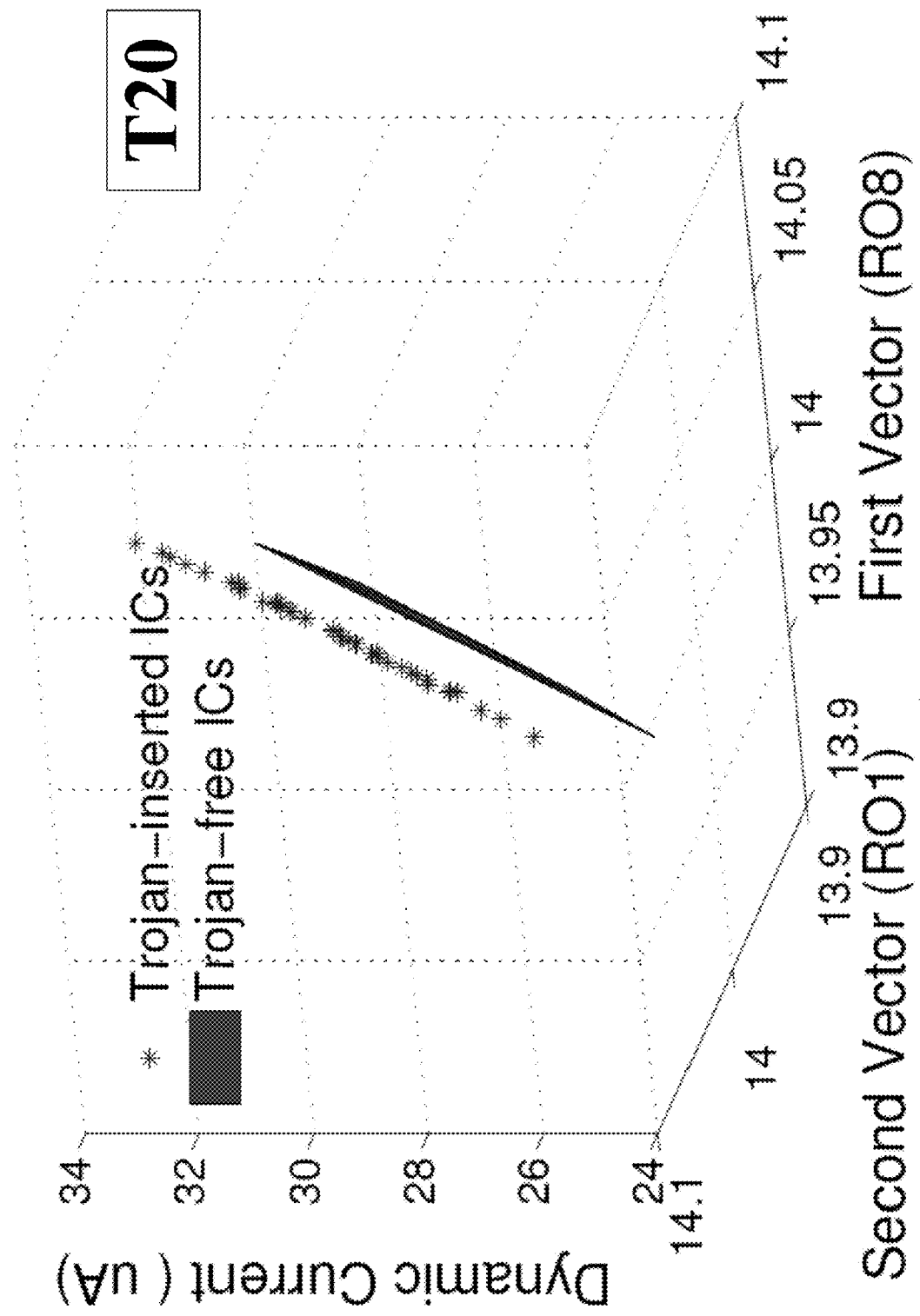

In one aspect, three ICs out of a set of 100 ICs under authentication exhibit out-of-range results and therefore can be identified as ICs containing a Trojan. In another aspect, PCA is performed on results obtained for the remaining 97 ICs to further analyze the data. FIG. 21A presents a power signature comparison based on PCA with $N_{ro}$ ring oscillators and dynamic current for Trojan detection. In one aspect, the convex hull can be drawn from the first three principal components with 200 Trojan-free ICs. In FIGS. 21A-21B, asterisks indicated data obtained from ICs with Trojans which are shown to be separate from the convex hull. Thus, with the RON architecture and statistical analysis, hardware insertion $T_{10}$ can be detected with substantially 100% accuracy. Yet, it should be appreciated that with limited statistical analysis or in scenarios in which the RON can be subjected to increasingly large variations of nano-scale technologies, smaller Trojans may not be detected with such accuracy.

Advanced outlier analysis illustrated in FIG. 15B also can be utilized to identify Trojan-inserted ICs. In one aspect, there are a total of 15×(14/2)=105 power signatures generated by the Trojan-free ICs. It should be appreciated that some power signatures can identify more Trojan-inserted ICs than the others. For illustration purposes, the advanced outlier analysis results disclosed herein are focused on the power signature that can detect the most Trojan inserted ICs. FIG. 21B illustrates advanced outlier analysis results with Trojan $T_{10}$. In one aspect, the ring oscillator that was selected as x in FIG. 15B is defined as the first vector and y as the second vector. In the foregoing drawing, dots represent Trojan-free ICs and the asterisks indicate Trojan-inserted ICs. It can be appreciated that all of the Trojan-inserted ICs are outside of the Trojan-free signature. Thus, the rate of detection of $T_{10}$ utilizing advanced outlier analysis is 100%.

Similarly, the remaining nineteen Trojans with 200 Trojan-free ICs and 100 Trojan-inserted ICs also can be simulated, and the disclosed methodology for analyzing data can be applied to each Trojan. For purposes of illustration, FIGS. 22A-22D present detailed results of advanced outlier analysis for ICs having one or more of $T_1$, $T_4$, $T_{11}$, and $T_{20}$ inserted therein. In one aspect, the rate of detection of Trojan $T_{11}$ and $T_{20}$ shown in FIGS. 22A-22D is about 100% with a single signature. In another aspect, for $T_4$, nearly 98% of the Trojan-inserted ICs can be detected utilizing the signature shown in FIG. 22B. In yet another aspect, in analysis scenarios in which all 105 power signatures are utilized, the rate of detection of Trojan $T_4$ is about 100%. Table III illustrates complete results of analysis of data for all Trojans, utilizing all of the 105 power signatures. From Table III and FIGS. 22A-22D, it can be appreciated that for Trojans $T_4$-$T_{20}$, the rate of detection thereof is nearly 100%. As illustrated, it should be appreciated that the power signatures of the Trojan-free ICs can be completely separate from the power signatures of Trojan-inserted ICs. Yet, Trojan-inserted ICs containing $T_4$ can have power signatures that can be close to the power signatures of Trojan-free ICs. For small Trojans, such as $T_1$-$T_3$, the detection rates can be less than 100% because of their reduced impact on power supply lines of the IC in which such Trojans can be inserted.

e) Exemplary Ring Oscillator Number Analysis

Based at least on the analysis described herein, rate of detection of a Trojan can depend on one or more of Trojans' size, distribution, and other circuit parameters, such as the number of ring oscillators in a RON utilized for detection of a Trojan. To illustrate analysis of ring oscillator number on Trojan detection rates, Trojans $T_1$, $T_2$, and $T_3$ can be selected because their detection rates can be less than 100% with 15 ring oscillators. If the detection rate of a Trojan is already 100%, an increase in the detection rate for an increased number of ring oscillators may not be achieved. In one scenario, RONs with 10, 20, and 25 ring oscillators can be implemented through a Monte Carlo simulation. The location of the inserted Trojans can be fixed throughout this analysis. In one aspect, as described herein, FIG. 16B is representative of RON layout for RONs having different amounts of ring oscillators. The three columns of ring oscillators were replaced by 2, 4, and 5 columns of ring oscillators, respectively.

TABLE III

TROJAN DETECTION RATES WITH PROCESS VARIATIONS.

| | Combinational Trojans | | | | | | | | | | Sequential Trojans | | |
|---|---|---|---|---|---|---|---|---|---|---|---|---|---|
| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ |
| Trojan Detection Rate | 75% | 80% | 86% | 100% | 100% | 100% | 100% | 100% | 100% | 100% | 100% | 100% | 100% |

| | Sequential Trojans | | | | | | |
|---|---|---|---|---|---|---|---|
| | $T_{14}$ | $T_{15}$ | $T_{16}$ | $T_{17}$ | $T_{18}$ | $T_{19}$ | $T_{20}$ |
| Trojan Detection Rate | 100% | 100% | 100% | 100% | 100% | 100% | 100% |

Figure 23:
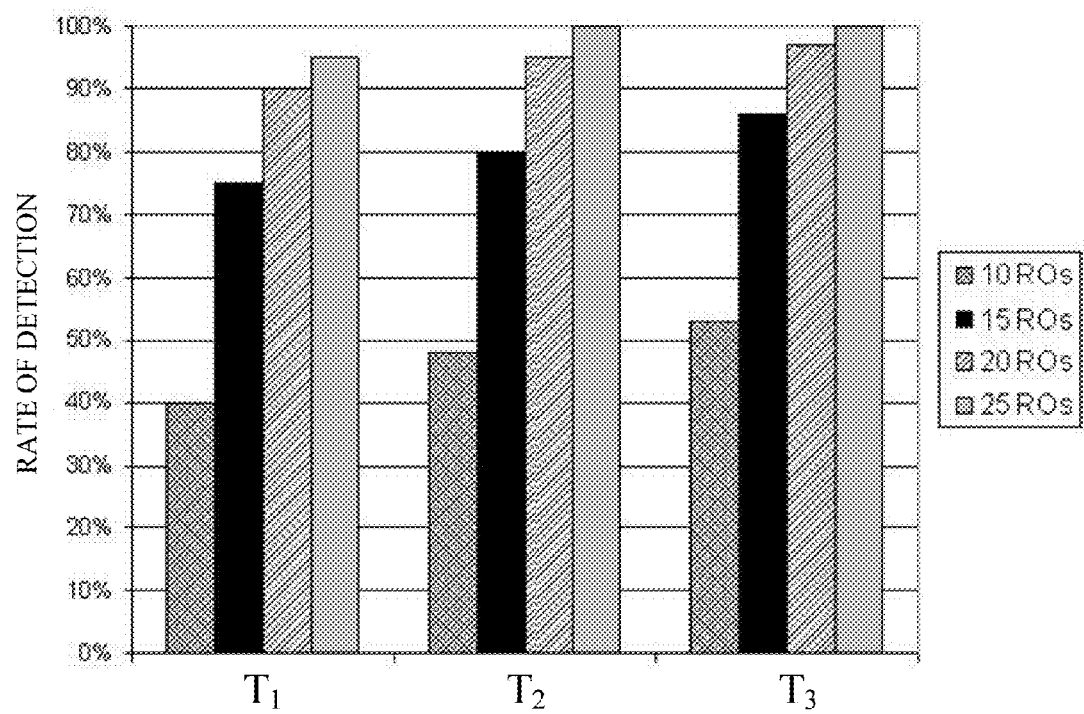
FIG. 23 illustrates exemplary rates of threat detection in an IC as in accordance with one or more aspects described herein.

FIG. 23 illustrates rate of detection of a Trojan obtained by utilizing advanced outlier analysis as applied to data originating from RONs having different numbers of ring oscillators for Trojans $T_1$, $T_2$, and $T_3$ in accordance with aspects described herein. For RONs having 10 ring oscillators, the rates of detection of $T_1$, $T_2$, and $T_3$ can be, respectively, 40%, 48%, and 53%. For RONs having 25 ring oscillators, the rates of detection can be, respectively, 95%, 100%, and 100%. In one aspect, outcome of analysis indicates that increasing the number of ring oscillators in the integrated circuit can yield increased rates of detection. Without wishing to be bound by theory, modeling, and/or simulation, such increased rates can be achieved because for an IC having design with a higher number of ROs embedded therein, a Trojan can be closer to one or more ring oscillators.

It should be appreciated that when the number of ring oscillators in the RON is increased, the consumption power can be unchanged while the circuit is under normal operation—the RON is on for a short period of time during testing. As described herein, the area overhead can increase slightly with the number of ring oscillators. In certain simulation scenarios, the area overhead values for 10, 15, 20, and 25 ring oscillators in the RON can be 2.5%, 3.75%, 5.0%, and 6.25%. Yet, the increase in area overhead can be small in comparison to the increase in rate of detection of a Trojan. Accordingly, a RON structure can be adjusted to meet desired area overhead and detection coverage.

f) Exemplary Trojan Location Analysis

Figure 24:
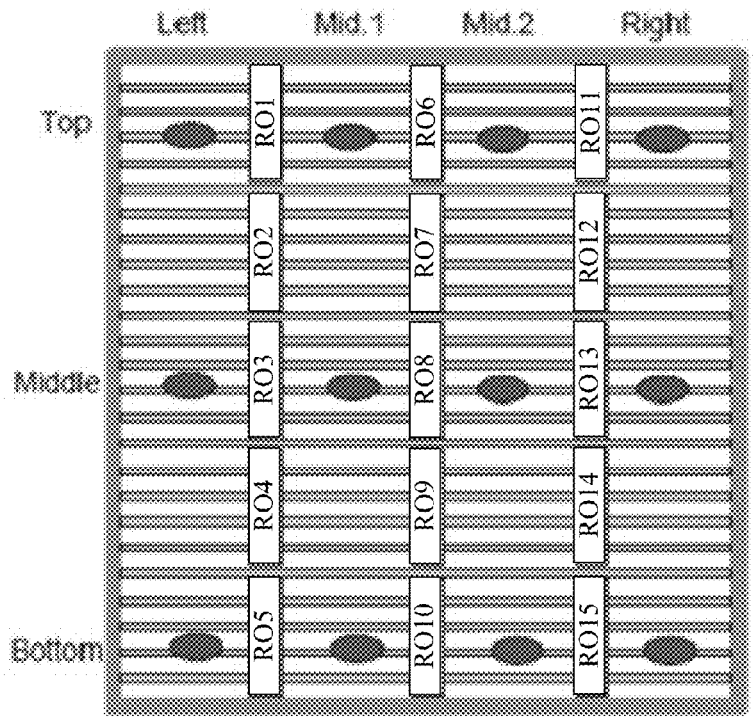
FIG. 24 illustrates a plurality of locations utilized for inserting a malicious functional hardware modification into an IC in accordance with one or more aspects described herein.
Figure 25:
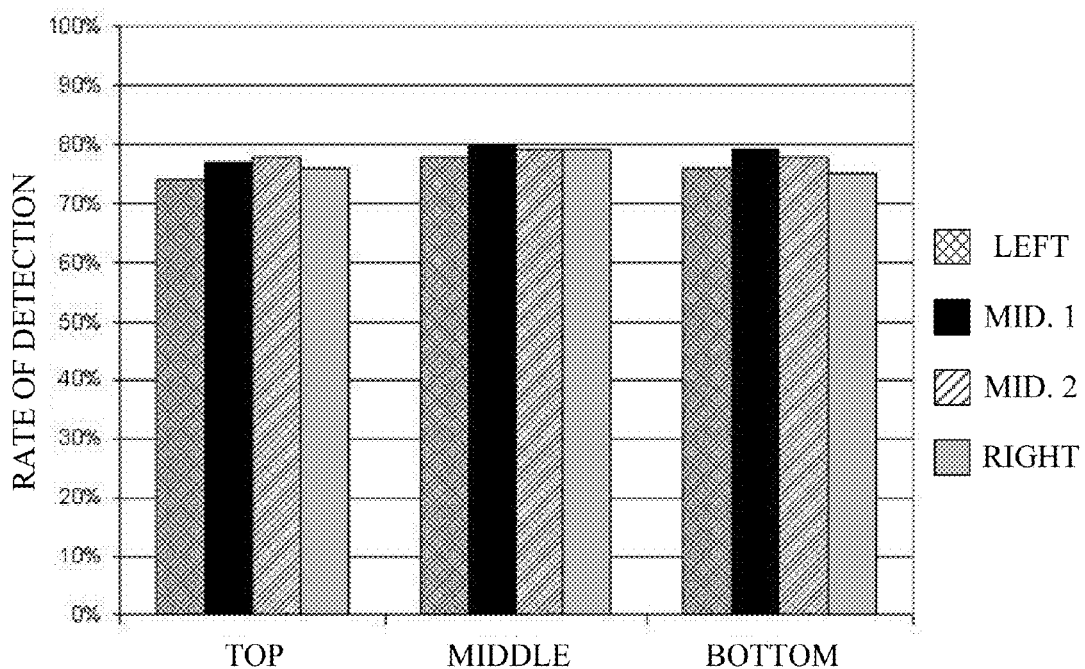
FIGS. 25-26 illustrates exemplary rates of threat detection in an IC as in accordance with aspects described herein.

Effects of location of an unintended functional hardware insertion within an IC on rate of detection of such insertion can be analyzed, for example, by placing the unintended functional hardware insertion at various locations with the IC. As an illustration, Trojan $T_2$ can be located in twelve locations, as depicted at FIG. 24, and rate of detection can be analyzed. In one aspect, for each location, 200 Trojan-free ICs and 100 Trojan-inserted ICs can be generated by a Monte Carlo simulation. In one implementation, the Monte Carlo simulation includes application of random variations to parameters of transistor contained in an IC and related IC design (e.g., design in FIG. 29B). As an example, a RON having 15 ROs can be embedded into a benchmark IC. Rates of detection of a Trojan can be evaluated utilizing advanced outlier analysis in accordance with aspects described herein. FIG. 25 illustrates results of such analysis, whereby it can be appreciated that when the Trojan $T_2$ is located in proximity to boundary corners, fewer Trojan-inserted ICs can be detected than when such Trojan $T_2$ is located centrally. Without wishing to be bound by theory, modeling, and/or simulation, such difference in location sensitivity can arise from the increased proximity to a greater number of ring oscillators when Trojan $T_2$ is located near the center of the IC comprising $T_2$. It should further be appreciated that rate of detection of a Trojan can vary by less than about 8% for the twelve locations that are considered in the analysis. To mitigate such location dependence of detection rates of a Trojan, in one aspect, greater design coverage can be implemented. For example, placing one or more columns of ring oscillators adjacent to the outermost edges of an IC having an unintended functional hardware insertion can limit the maximum separation between such insertion and a ring oscillator.

g) Exemplary Trojan Location Analysis

Different signal vectors (e.g., a plurality of input signals) can cause different switching activities in an IC, thus different inputs generated by the LFSR can be simulated to analyze the impact of patterns on outcome produced by the combined ring oscillator network and dynamic current methodology described herein. In one aspect, different seeds in the LFSR can be employed to generate different patterns. In one exemplary implementation, a single seed can be employed to generate 100 patterns. Switching activities of Trojans can be different from one set of patterns to another. In the subject disclosure, switching activity does not refer to the number of times a Trojan is completely activated. Instead, switching activity refers to any switching between gates included in the Trojan. As an illustration, for a functional hardware insertion comprising a plurality of gates (e.g., Trojan $T_3$ which can comprise four gates), in response to switching of at least one gate of the plurality of gates, switching activity in such insertion is deemed present regardless of the Trojan being activated or not.

Figure 26:
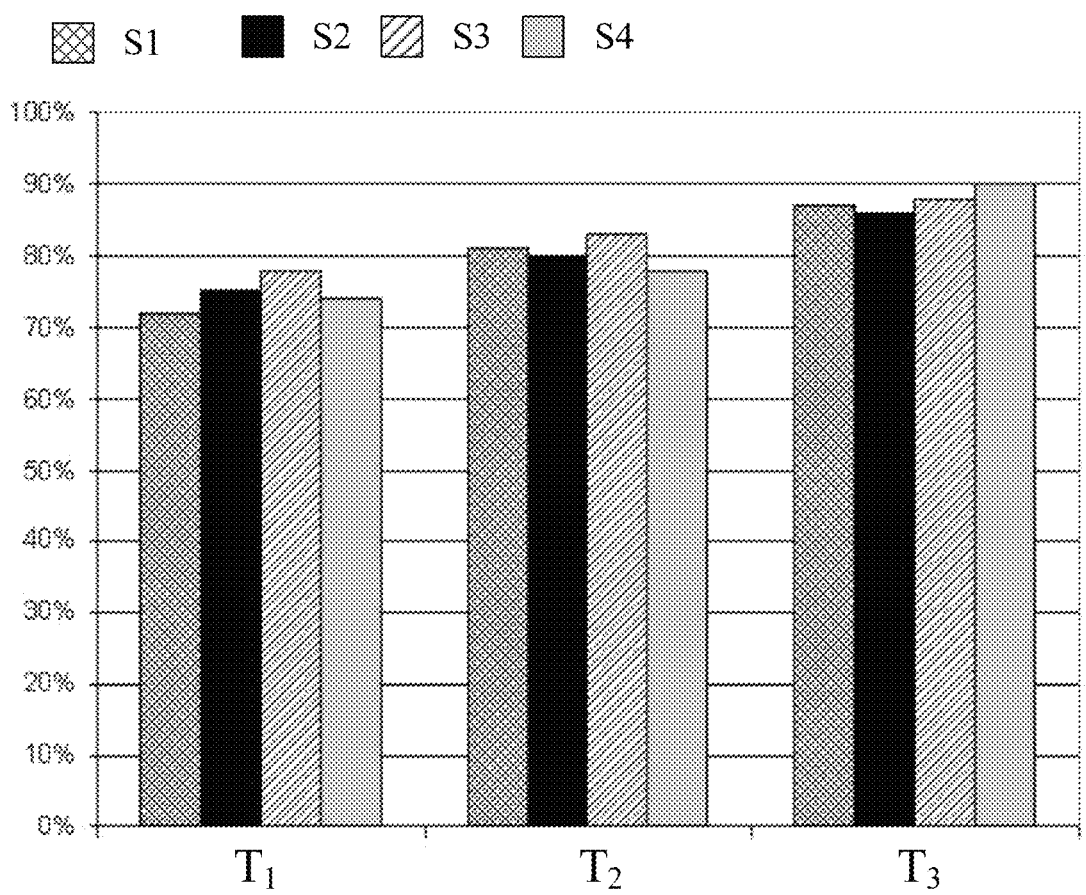

FIG. 26 illustrates detection rates with four different seeds (S1, S2, S3, and S4) in the LFSR. Such seeds can be generated with any conventional or customized random number generator component (e.g., MATLAB software application). Trojans $T_1$, $T_2$, and $T_3$ were selected to run Monte Carlo Simulations using RON with 15 ring oscillators. All these Trojans were fixed at locations as shown in FIG. 16B. From FIG. 26, it can be appreciated that our Trojan detection method provides different detection rates using different random patterns. However, with random patterns, the Trojan detection rates do not vary significantly. In one aspect, generation of special patterns, such as ones that could cause more switching at nets which activate rarely in the design, can render the disclosed Trojan detection method more effective.

h) Exemplary Implementation of Threat Detection in Spartan-3E FPGAs

Figure 27B:
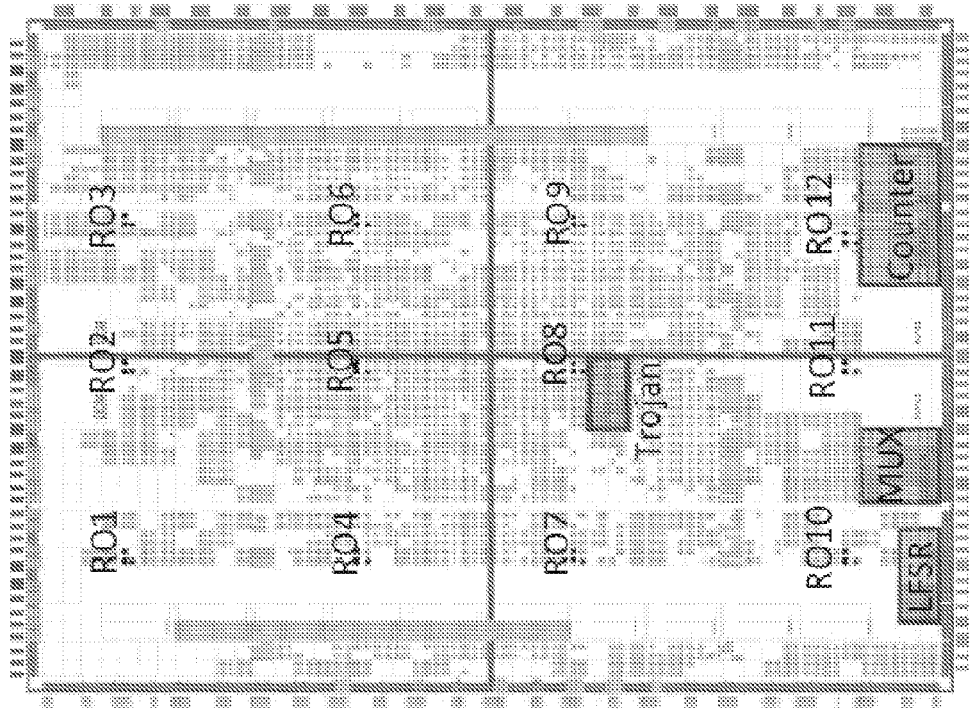
FIGS. 27A-27B illustrate exemplary circuitry comprising a malicious hardware modification in accordance with aspects described herein.
Figure 27A:
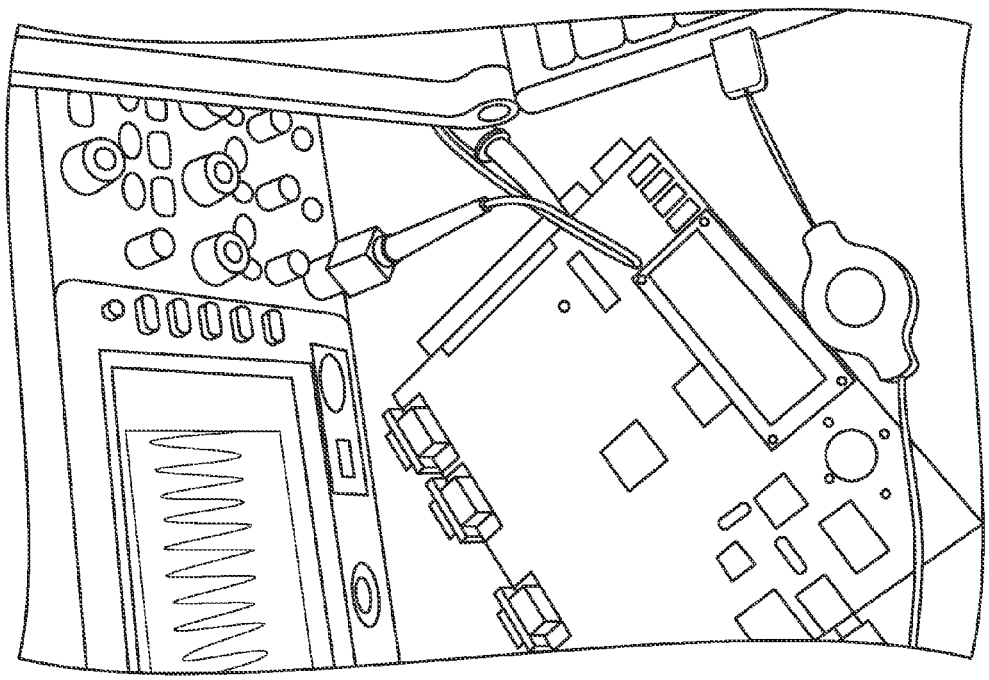

The same embodiment of a RON architecture described hereinbefore can be applied to an AES benchmark implemented on a Xilinx Spartan-3E FPGA (shown in FIG. 27A). In an embodiment, three Trojans ($T_7$, $T_8$, and $T_9$) are inserted into the benchmark, $T_9$ comprises 80 gates. The area overhead of $T_7$ is 0.17%, $T_8$ is 0.25%, and $T_9$ is 0.33%. 24 Trojan-free FPGAs and 24 Trojan-inserted FPGAs are employed. The oscillation cycle count from different FPGAs represent inter-die process variations and the oscillation cycle count from the same FPGA but different ring oscillators denote intra-die process variations.

The layout of FPGA after the placement and routing is shown in FIG. 27B. In an embodiment, 12 ring oscillators with five inverters each form the RON while Trojans are placed near RO8. In such embodiment, an LFSR module generates patterns during authentication process. In addition, a multiplexer module selects which ring oscillator would be enabled (e.g., turned on) and recorded. The implementation temperature is 25° C. In an aspect, several measurements are performed for each ring oscillator in every FPGA in order to eliminate measurement noise; average values are utilized to perform data analysis.

Figure 28A:
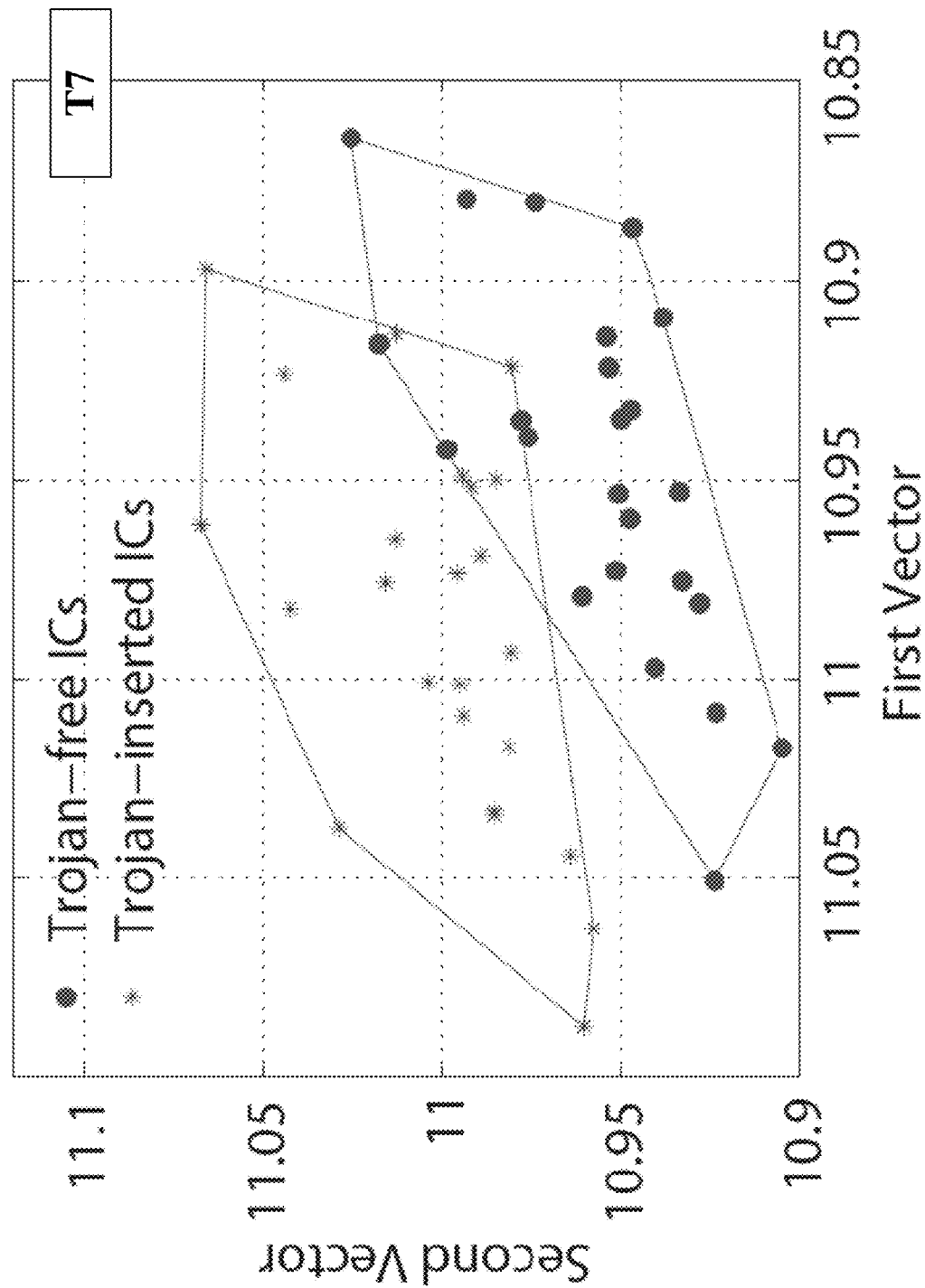
FIGS. 28A-28C illustrate results of analysis of power signatures based on advanced outlier analysis for the circuitry of FIGS. 27A-27B in accordance with aspects described herein.
Figure 28B:
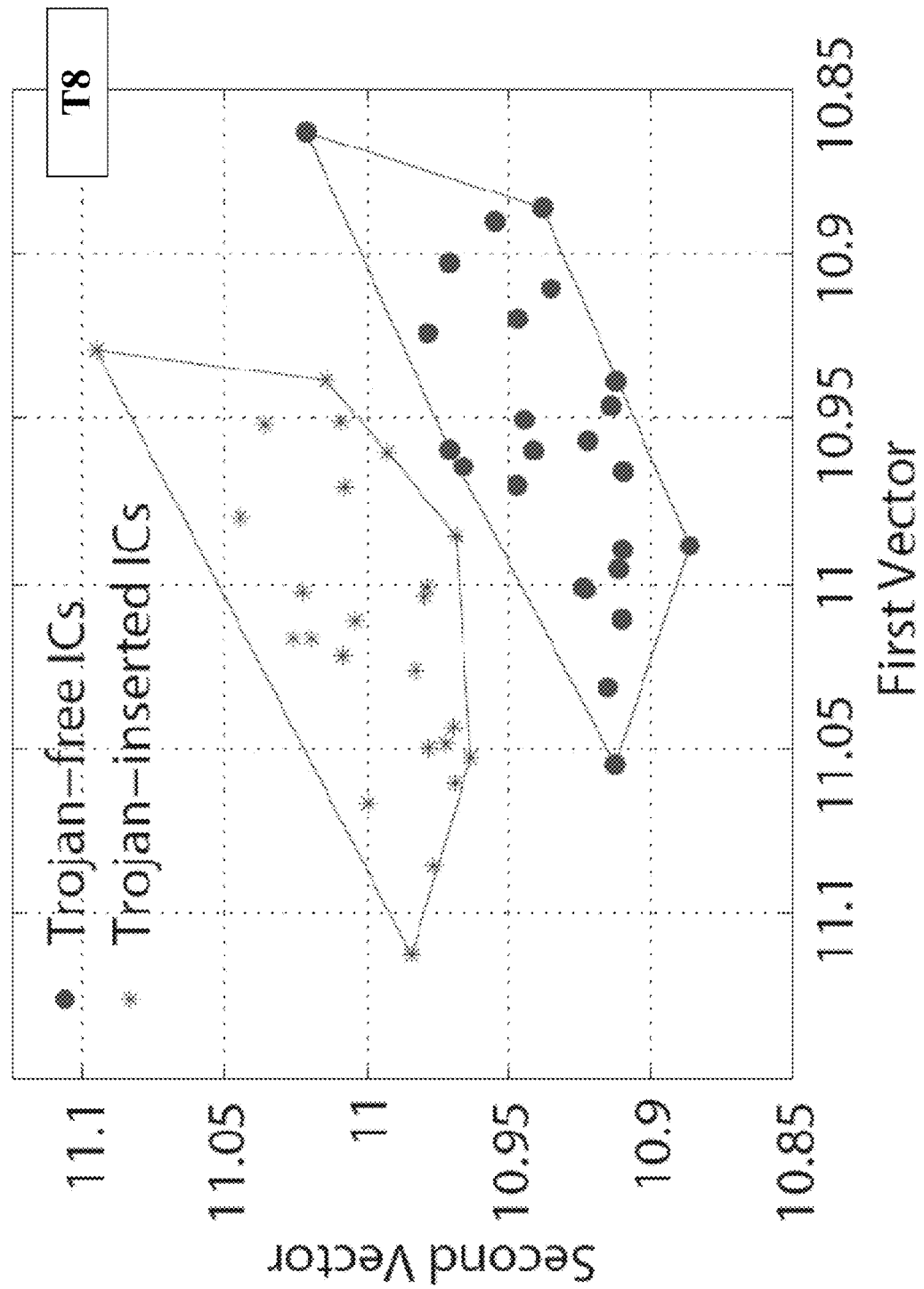
Figure 28C:
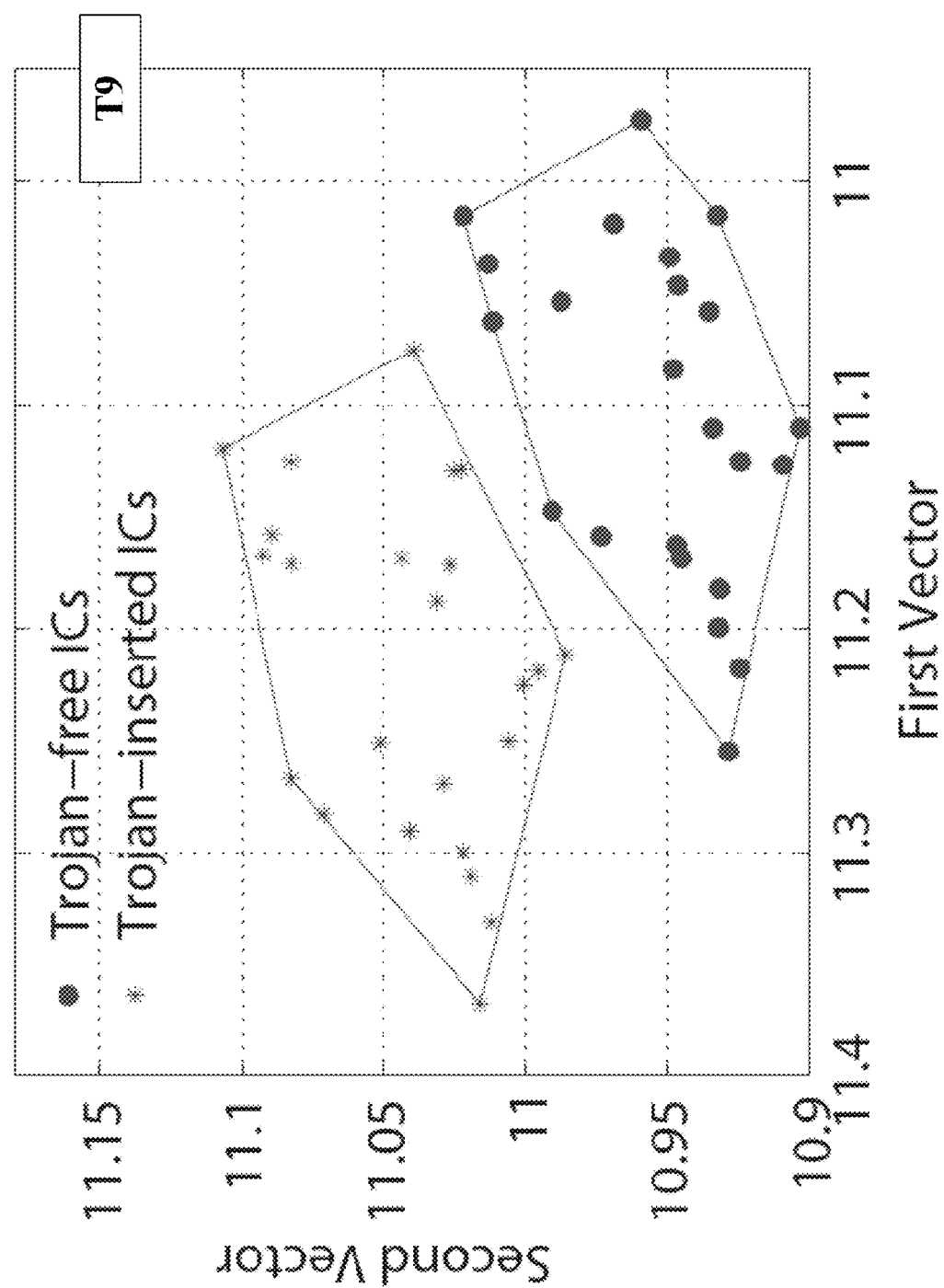

One Trojan-inserted FPGA is detected by simple outlier analysis for each Trojan. PCA detects 9 Trojan-inserted FPGAs with $T_7$, 10 Trojan-inserted FPGAs with $T_8$, and 16 Trojan-inserted FPGAs with $T_9$. The remaining Trojan-inserted FPGAs are analyzed by advanced outlier analysis; see FIGS. 28A-28C). It is noted that advanced outlier analysis also detects FPGAs having hardware Trojans that have been detected by simple outlier analysis and PCA. From combined simple outlier analysis, PCA, and advanced outlier analysis, 100% Trojan-inserted FPGAs are detected for $T_8$ and $T_9$ but 80% for $T_7$ from the best selected power signature. Performing similar analysis for all power signatures, we are able to increase the Trojan detection rate to 92% for $T_7$. In addition, Trojans of smaller size ($T_{10}$ is 0.123% (e.g., 30 gates) and $T_{11}$ is 0.085% (e.g., 20 gates)) are implemented to verify sensitivity of RON to Trojan size. Rate of detection of a Trojan is about 92% for $T_{10}$ but 100% for $T_{11}$ because such Trojan can have more switching activity.

Figure 29A:
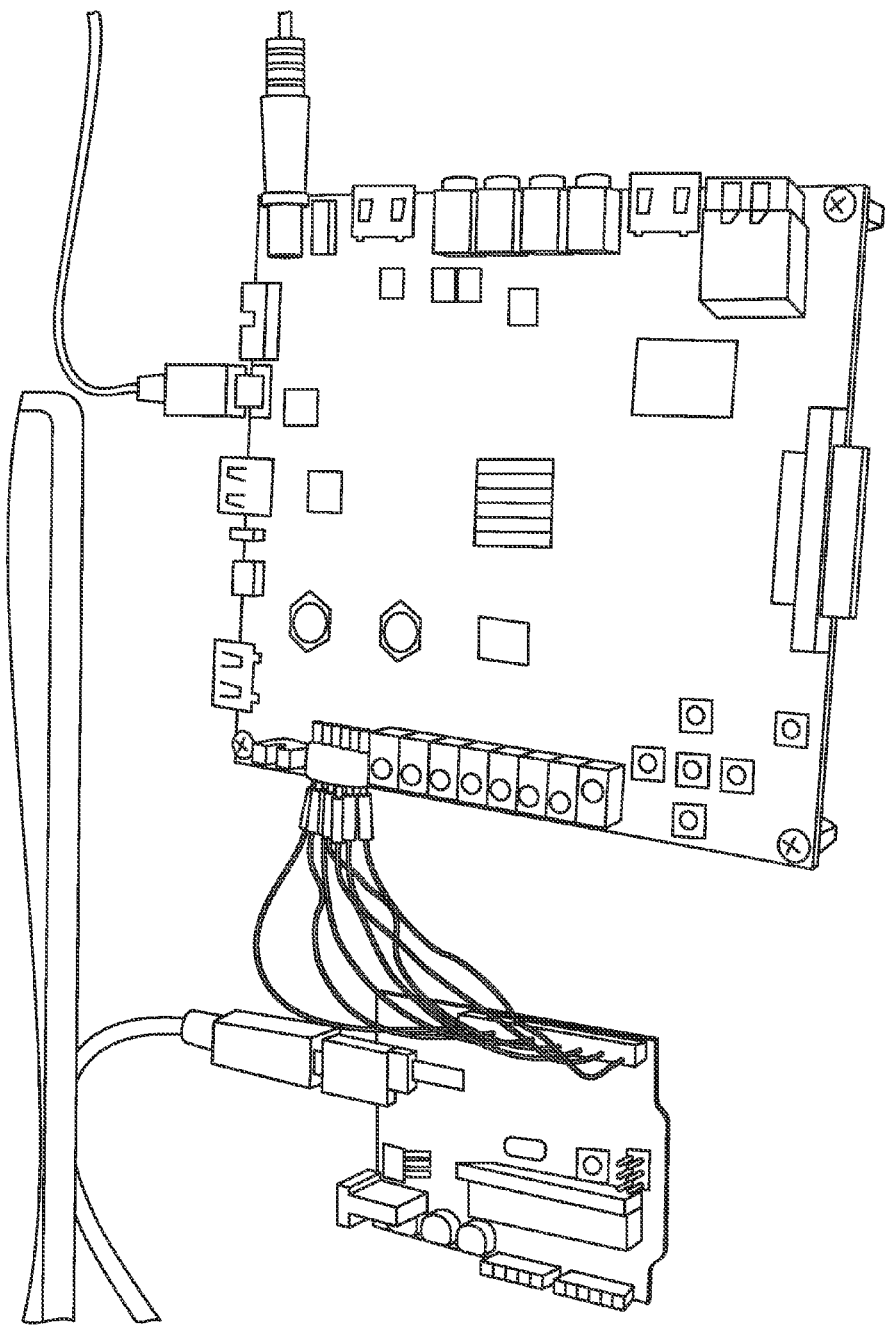
FIGS. 29A-29B illustrate exemplary circuitry comprising a malicious hardware modification in accordance with aspects described herein.
Figure 29B:
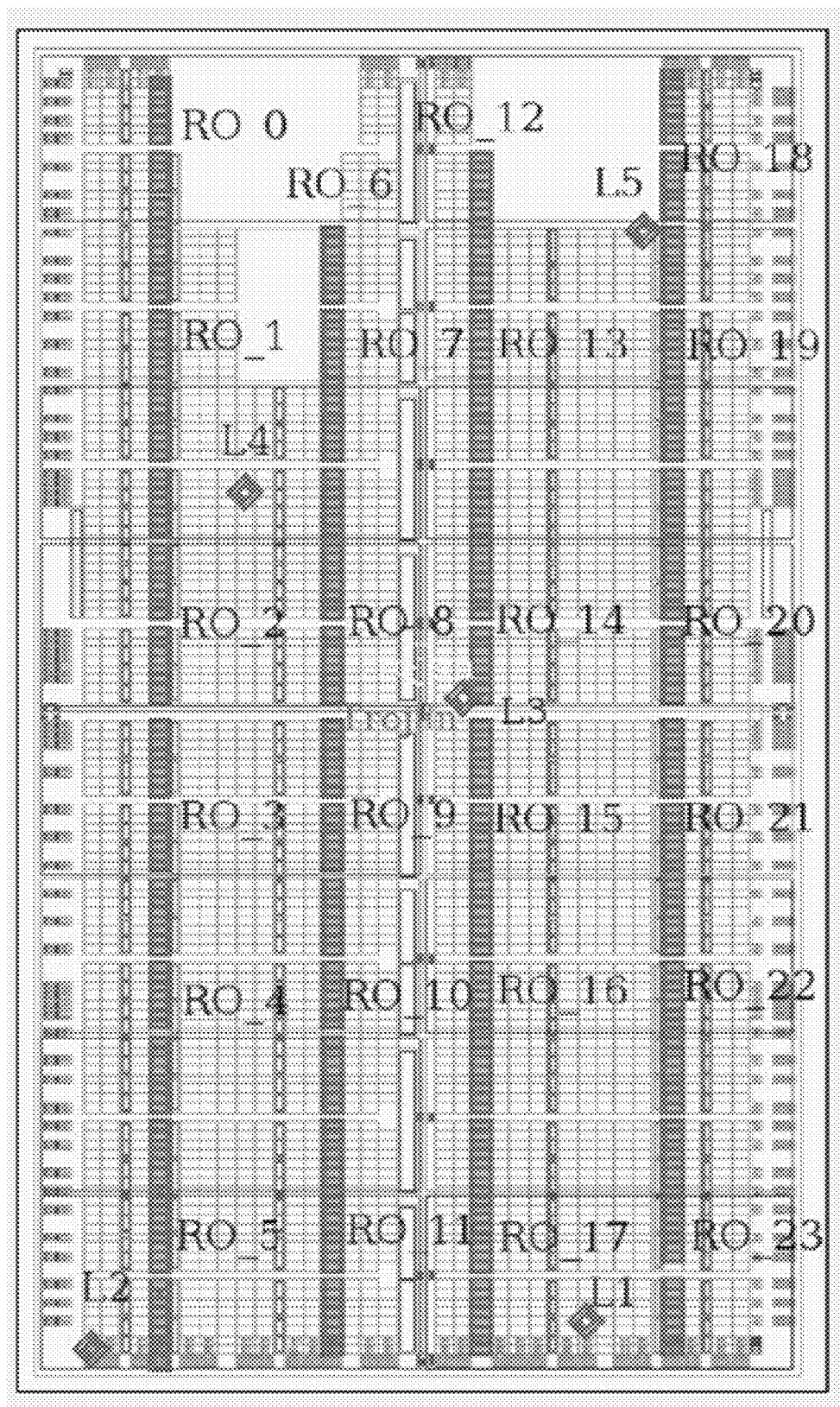
Figure 30A:
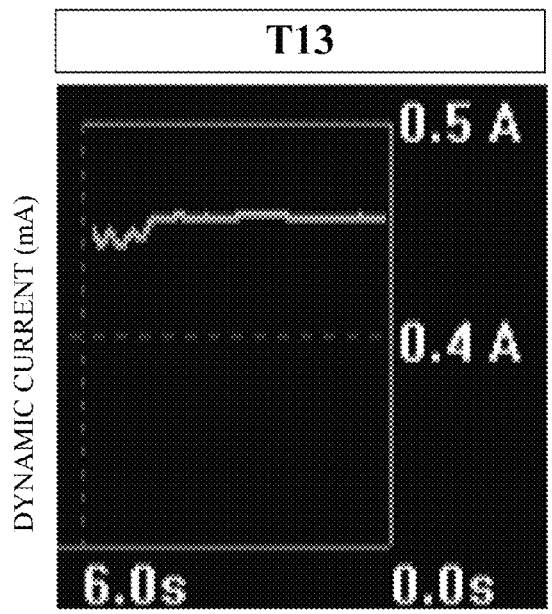
FIGS. 30A-30B illustrate results of threat detection in an actual FPGA board in accordance with aspects described herein.

In one embodiment, a Xilinx Spartan-6 FPGA board (shown in FIG. 29A) can be utilized for hardware validation of the methodology described herein. In one aspect, 24 ring oscillators can be inserted into an AES benchmark circuit (shown in FIG. 29B). In one aspect, an LFSR module can generate patterns for authentication. For instance, such patterns can be generated during an authentication process. As described herein, in another aspect, a decoder and multiplexer module can select a ring oscillator that can be enabled and response thereof recorded. In another alternative or additional aspect, a microcontroller (e.g., an Arduino Duemillanove microcontroller) can be connected to the Xilinx Spartan-6 FPGA to permit, at least in part, collection of RO cycle count from a counter. As shown in FIG. 30A, transient current waveforms can be collected, for example, via execution of a control module, such as Diligent Adept software. To analyze impact of process variations, in one implementation, 28 Trojan-inserted FPGAs and 60 Trojan-free FPGAs can be employed. In one aspect, to mitigate measurement noise, several measurements can be performed for each ring oscillator in each FPGA, and an average oscillation count (or cycle count) can be utilized to conduct data analysis.

Figure 30B:
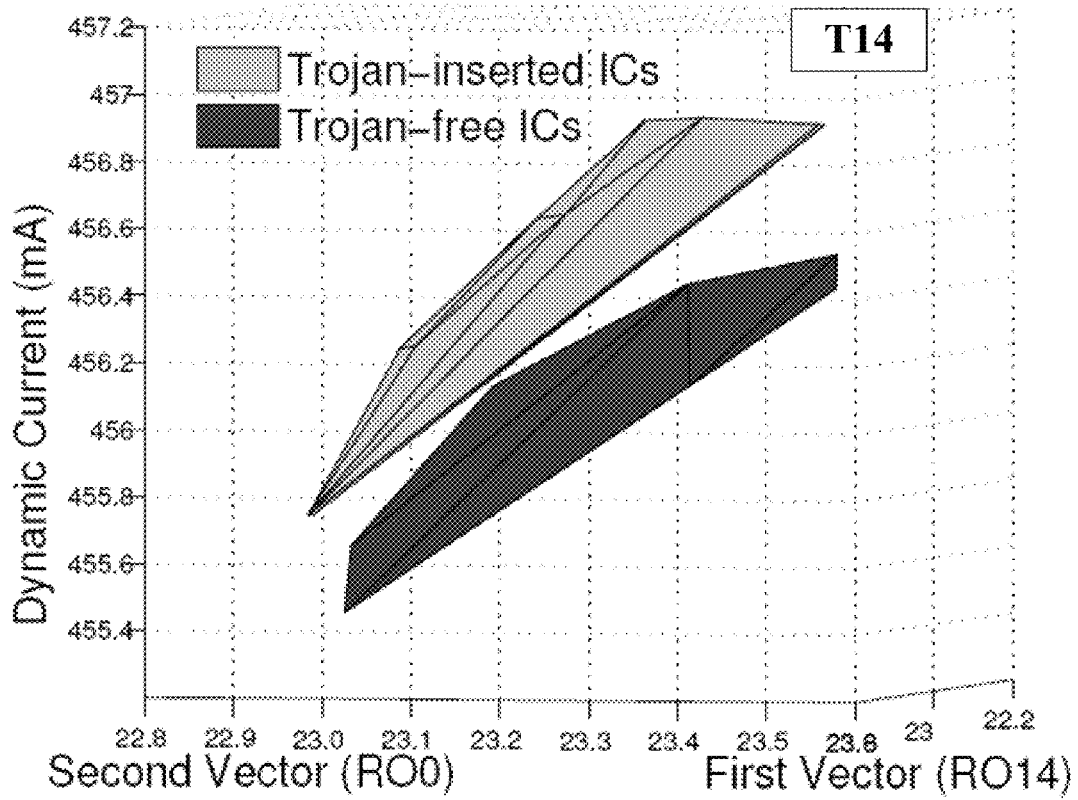

In one aspect, eight different Trojans $T_{21}$-$T_{28}$ with different sizes can be inserted into the AES benchmark. Such Trojans can be located in location $L_3$ (shown in FIG. 29B). The area overhead and detection rates of such Trojans are shown in Table IV. FIG. 30B illustrates detailed results of outlier analysis associated with Trojan $T_{26}$. The grey convex hull is constructed with data from Trojan-free FPGAs, and the blue convex hull is built with data from Trojan-inserted FPGAs. From FIG. 30B, it can be appreciated that the Trojan detection rate for $T_{26}$ is 100%. Based on all Trojan detection rates that are determined (as shown in Table IV), it can be appreciated that most of Trojans can be detected with a 100% rate of detection.

i) Exemplary Ring Oscillator Number Analysis in Spartan-3E FPGAs

Figure 31:
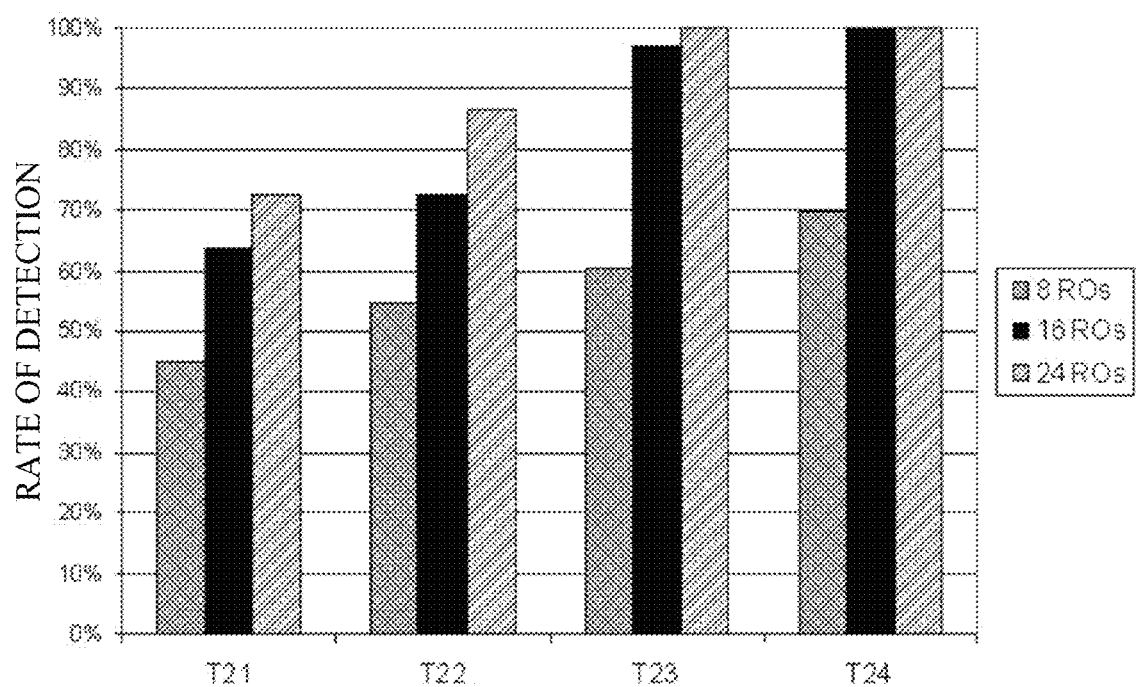
FIGS. 31-33 illustrates exemplary rates of threat detection in an IC as in accordance with aspects described herein.

In one implementation, impact of the number of ring oscillators on rate of detection of a functional hardware insertion can be analyzed on Xilinx Spartan-6 FPGAs. RONs, composed of 8, 16, and 24 ring oscillators, were implemented in the AES benchmark circuit. FIG. 29B illustrates the RON with 24 ring oscillators and RONs with 8 ring oscillators and 16 ring oscillators are implemented similarly. With 60 Trojan-free FPGAs and 28 Trojan-inserted FPGAs, FIG. 31 illustrates rate of detection with different RONs for Trojans $T_{21}$, $T_{22}$, $T_{23}$, and $T_{24}$. Values for such rates of detection are presented in the following table.

| RO# | 8 ROs | 16 ROs | 24 ROs |
|---|---|---|---|
| $T_{21}$ | 45.45% | 63.64% | 72.73% |
| $T_{22}$ | 54.55% | 72.73% | 86.73% |
| $T_{23}$ | 60.61% | 96.97% | 100% |
| $T_{24}$ | 69.76% | 100% | 100% |

From FIG. 31 and the foregoing table, it can be appreciated that the number of ring oscillators in RON plays a considerable role in the effectiveness of our method. For $T_{23}$ and $T_{24}$, the Trojan detection rates increased to about 100% by increasing the number of ring oscillators from 8 to 24, in accordance with aspects described herein.

It can also be appreciated that the detection rates can be changed significantly by increasing ring oscillator number from 8 to 16 but not from 16 to 24. Accordingly, without wishing to be bound by theory, modeling, and/or simulation, detection resolution is not linear with the number of ring oscillators in RON.

j) Exemplary Ring Oscillator Number Analysis in Spartan-3E FPGAs

Figure 32:
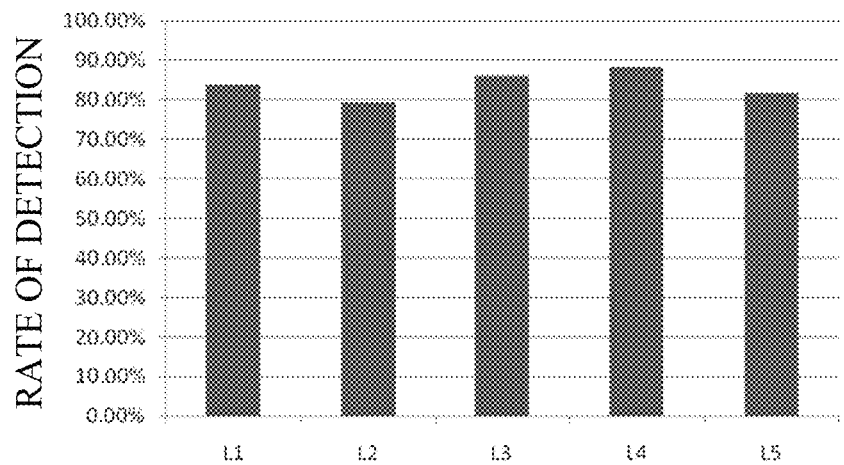

As described herein, location of an unintended functional hardware insertion, such as a malicious functional hardware insertion, can affect rate of detection of such insertion. A plurality of Spartan-6 FPGAs having one or more Trojans can permit analyzing the effect of insertion location on real chipsets (or 1Cs). In one embodiment, a RON having 24 ring oscillators distributed throughout the entirety of an FPGA can be implemented in an AES benchmark circuit. In one aspect, a single Trojan $T_{22}$ can be inserted in different locations $L_1$ through $L_5$ in the AES circuit. Such Trojans are nominally, or substantially, identical to each other. FIG. 32 illustrates results of detection rate analysis according to the methodology disclosed herein. Values of the illustrated rates of detection are presented in the following table.

| Location | L1 | L2 | L3 | L4 | L5 |
|---|---|---|---|---|---|
| Rate of Detection | 83.84% | 79.29% | 86.11% | 88.38% | 81.56% |

In can be appreciated that the rate of detection can range from about 88.3% and 79.3% for the analyzed Trojan locations. In one aspect, for locations $L_4$ and $L_3$, the detection rate can be relatively higher since a Trojan inserted in such locations can affect a higher number of ring oscillators than in another location. In another aspect, for location $L_2$, e.g., at a corner of the FPGA, the rate of detection of Trojan-inserted FPGAs is the lowest with respect to rates of detection realized at other locations.

TABLE IV

TROJANS INSERTED IN FPGAs.

| | $T_{21}$ | $T_{22}$ | $T_{23}$ | $T_{24}$ | $T_{25}$ | $T_{26}$ | $T_{27}$ | $T_{28}$ |
|---|---|---|---|---|---|---|---|---|
| Area Overhead | 0.0016% | 0.012% | 0.025% | 0.05% | 0.08% | 0.1% | 0.15% | 0.2% |
| Trojan Detection Rate | 73% | 86% | 100% | 100% | 100% | 100% | 100% | 100% | k) Exemplary Ring Oscillator Number Analysis in Spartan-3E FPGAs

A pattern applied by the LFSR during testing can alter the Trojan detection rates in two ways: (1) Trojan switching activity (e.g., Trojan's contribution to dynamic power) can depend on applied signal pattern. It should be noted that Trojan switching activity does not refer to the number of times a Trojan is completely activated launching its malicious activity, but rather, it refers to any switching in the gates which comprise the Trojan (e.g., just one NAND gate in the Trojan switches, but the Trojan is not activated). (2) The total switching activities in the circuit. It should also be noted that Trojan switching activities does not refer to the number of times a Trojan is completely activated launching its malicious activity, but rather it refers, to any switching in the gates which comprise the Trojan (e.g., just one NAND gate in the Trojan switches, but the Trojan is not activated).

It can be possible that a pattern can be found that reduces background noise in the original circuit yet increase Trojan switching activity.

Figure 33:
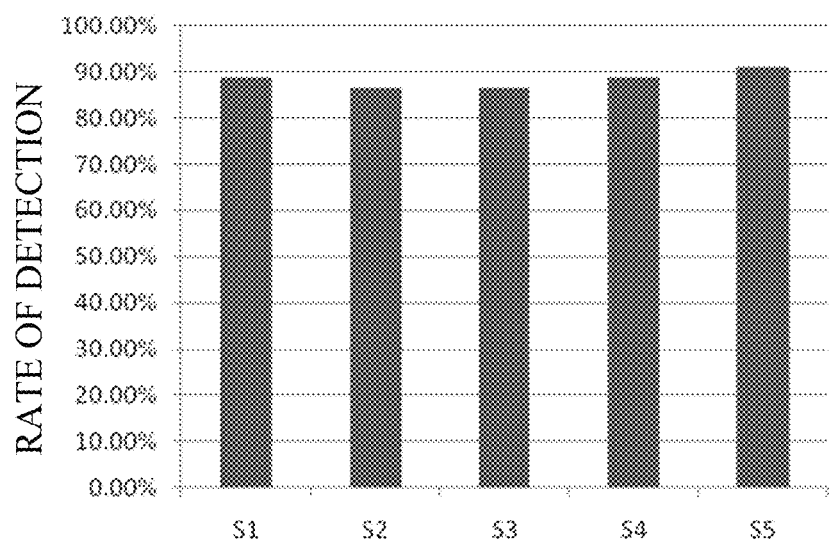

A RON with 24 ring oscillators and Trojan $T_{22}$ located at $L_3$ can be inserted in an AES circuit. Six randomly selected seeds can be applied to the LFSR. The ring oscillator cycle counts and transient current waveforms can be collected and analyzed. FIG. 33 illustrates results of the data analysis, whereby it can be appreciated that random patterns do not have a significant impact on Trojan detection rate. Specific values of rates of detection presented in FIG. 33 are listed in the following table.

| Seed | S1 | S2 | S3 | S4 | S5 |
| --- | --- | --- | --- | --- | --- |
| Rate of Detection | 88.73% | 86.46% | 86.46% | 88.73% | 91.01% |

I) Exemplary Application of a RON to Random Number Generation

Figure 34:
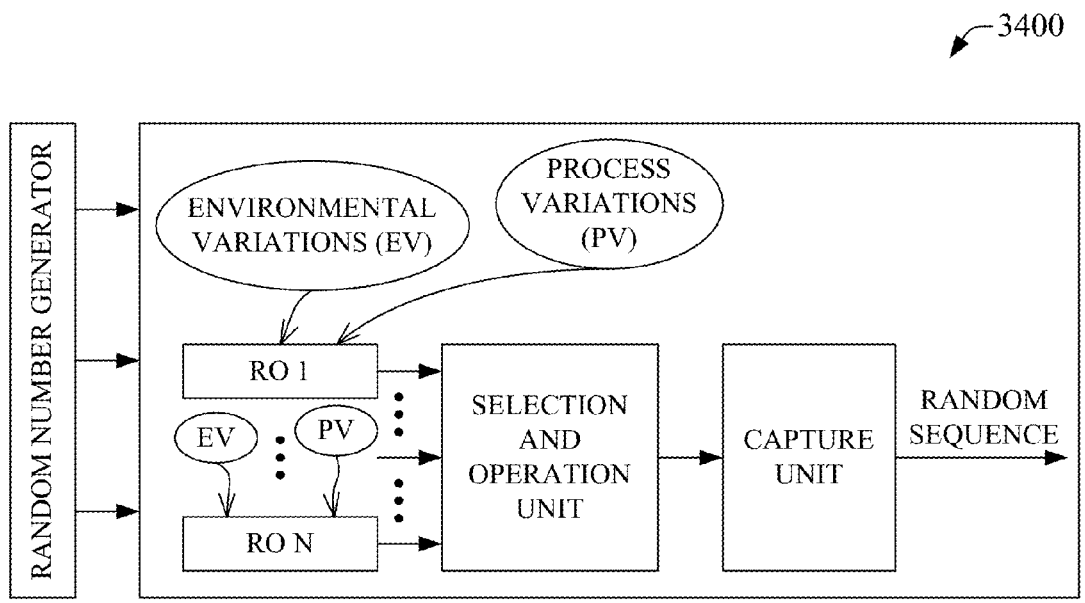
FIG. 34 illustrates an exemplary device in accordance with one or more aspects of the disclosure.

FIG. 34 illustrates an embodiment of an exemplary device 3400 that can generate true or substantially true random numbers in accordance with aspects of the subject disclosure. True random number generation is commonly employed in various technological and commercial applications that demand or benefit from enhanced security, such as secure application in financial institutions. As other devices described in the disclosure, exemplary device 3400 can exploit a RON for operation. In one aspect, exemplary device 3400 can operate as a true random number generator (TRNG) unit (also referred to as a TRNG). With random power supply noise, thermal noise, crosstalk, and process variations, a plurality of ring oscillators (e.g., $RO_1, RO_2 \ldots RO_N$, with N a natural number greater than one (1)) that are part of the RON can be submitted to phase jitter. In the illustrated embodiment, a selection and operation unit can select two or more ROs of the plurality of ring oscillators $RO_1$-$RO_N$. The exemplary device 3400 also can comprise a capture unit that can sample signal resulting from the two or more ROs, and can output a sequence of Q random bits, with Q and natural number. In one aspect, the signal that is processed by the capture unit can be originated by supplying the two or more ROs that are selected with at least one input pattern as described herein. In one aspect, an LFSR in exemplary device 3400 can generate the at least one input pattern. Selection of and provision of a signal pattern to different ring oscillators can yield a different random sequence. In another aspect, two or more ROs of the plurality of ring oscillators (e.g., $RO_1, RO_2 \ldots RO_N$) can be selected randomly or pseudo-randomly according to one or more random bits.

Figure 35A:
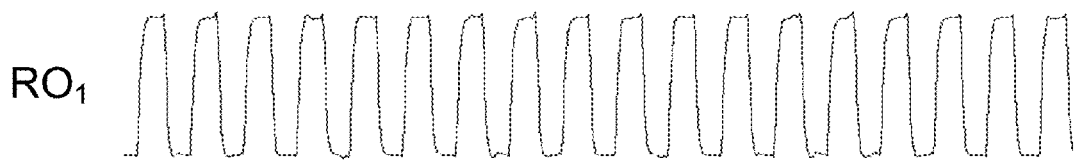
FIGS. 35A-35E presents circuit simulation results related to random sequence generation in an IC in accordance with one or more aspects described herein.
Figure 35B:
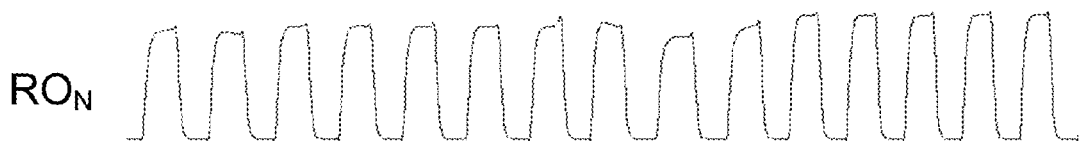

In certain implementations, the linear feedback shift register (LFSR) included in the exemplary device 3400 can supply input vectors for the integrated circuit, the input vectors representing at least one input pattern. The selection and operation unit can process the signal output of at least on ring oscillator (e.g., $RO_J$ with J=1, 2, ... N) and the capture unit can generate a random sequence by sampling the operation results, e.g., the signal output of the at least one ring oscillator. FIGS. 35A-35D illustrate circuit simulation results for an IC that exploits 90 nm technology nodes (e.g., gates, diodes, transistors, etc.) in accordance with one or more aspects described herein. Circuit simulations were performed with Hspice; however, any suitable simulation tool can be utilized to carry out the simulations. In one aspect, as illustrated, waveforms of ring oscillator $RO_1$ and $RO_N$ are illustrated in FIGS. 35A-35B, whereby it can be appreciated that such waveforms contain phase jitter.

Figure 35C:
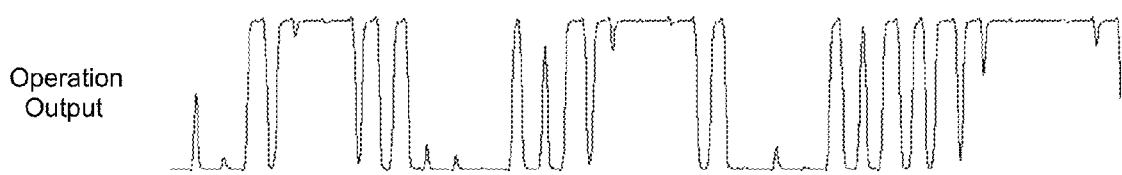
Figure 35D:
Figure 35E:
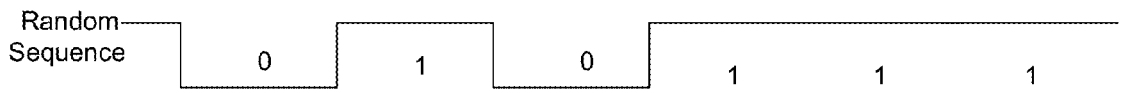

FIG. 35C illustrates a waveform associated with operation results (or output signal of ROs selected as described herein) in accordance with one or more aspects of the disclosure. In addition, FIG. 35D illustrates a capture clock signal (or capture clock). In one aspect, each period in the capture clock can correspond to a bit cycle. FIG. 35E illustrates a random sequence generated by the exemplary device 3400, the illustrated portion of such random sequence comprising the bit string "010111".

As described herein, a ring oscillator can be sensitive to process variations. Such sensitivity is represented by a callout oval labeled "PV" in FIG. 34. Exemplary device 3400 and other device(s) in accordance with one or more aspects of the disclosure can be utilized as process variation sensors. In addition or in the alternative, as described herein, temperature typically is one of a plurality of environmental variations (represented with a callout oval labeled "EV") that can affect a frequency of a ring oscillator. In one aspect, EV can affect such frequency to various extents, ranging from negligible to moderate and to severe or significant. Accordingly, a ring oscillator network in accordance with aspects described herein can probe temperature of an integrated circuit (an ASIC, an FPGA, a microprocessor, etc.) that includes the RON. Similarly, yet not identically, voltage drop (also referred to as IR-drop) can be another environmental factor that can modify, e.g., reduce or increase, a frequency of a ring oscillator. Thus, a ring oscillator network as described herein can be utilized as an IR-drop sensor.

Speed of a ring oscillator also can vary during the lifetime of operation. Accordingly, in one aspect, a RON architecture in accordance with aspects of the disclosure can be exploited for probing aging on sensors in order to represent aging effects in an IC comprising the RON. Similarly, any or most any degradation effect that gradually or monotonically affects speed of an RO can be sensed through a RON architecture of the disclosure.

H. Relationship Between RO Frequency and Localized and Total Dynamic Current

A delay of each inverter in a ring oscillator also can be derived from $t_{inv}=k_g/I_g$ where $k_g$ is a gate-dependent constant and $I_g$ is the dynamic current of the inverter. Based on the Alpha-Power Model known in the art, the dynamic current of a switching gate is $$I=\mu_g^*(V_{dd}-V_{th})^\alpha \tag{9}$$

where $V_{dd}$ is the power supply voltage, $V_{th}$ is the threshold voltage, and $\alpha$ is the velocity saturation index. Thus the frequency of the n-stage ring oscillator can be expressed as:

$$f = \frac{\mu_g * (V_{dd} - V_{th})^\alpha}{2n * k_g} \tag{10}$$

Figure 36A:
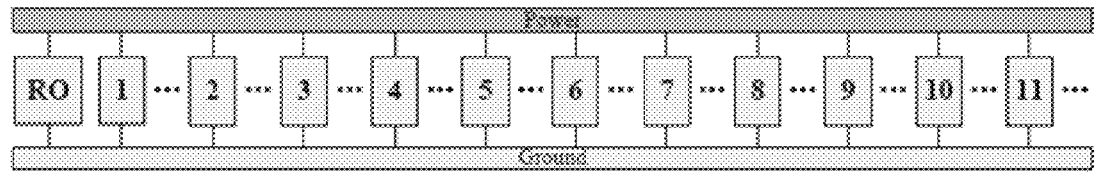
FIG. 36A is a block diagram representative of exemplary locations of an ring oscillator and a malicious functional hardware modification to an IC in accordance with one or more aspects described herein.
Figure 36B:
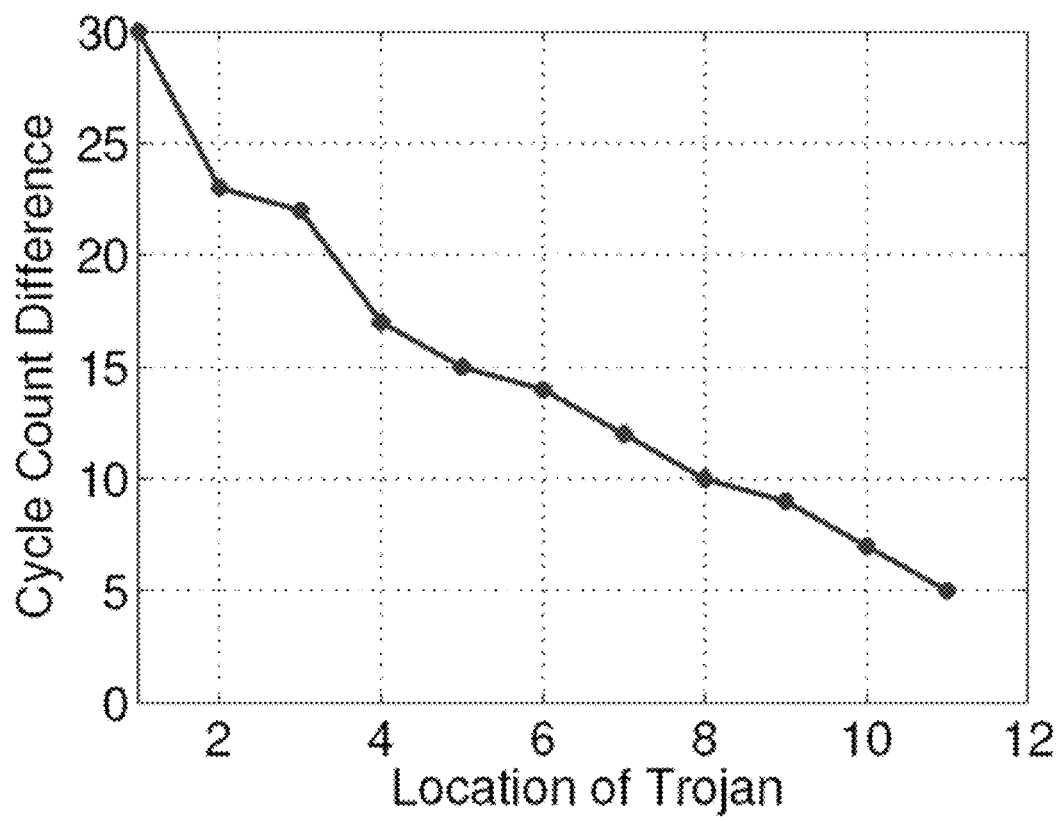
FIG. 36B illustrates cycle count difference caused by voltage drop induced by one or more gates in the malicious functional hardware modification in accordance with aspects described herein.

When Trojan gates are placed near the ring oscillator, the voltage-drop caused by the Trojan can reduce the power supply voltage. As an example, a 5-stage ring oscillator and an unintended functional hardware insertion, such as a malicious functional hardware insertion (or Trojan) comprising 20 combinational gates can be simulated using Synopsys 90 nm technology to demonstrate the effect of such insertion on the frequency of a ring oscillator at 25° C. The simulation time is 10 μs. FIG. 36A shows the locations of the ring oscillator and the Trojan: the ring oscillator is placed at the left corner of a standard cell row, while the Trojan is located at some position between locations 1 and 11. In one aspect, there is one flip-flop (FF) between every two possible Trojan locations. Let $CC_f$ denote the cycle count of the ring oscillator in a Trojan-free IC, let $CC_t$ denote the cycle count of the ring oscillator in an IC with a Trojan, and let $\Delta CC_{ft}=CC_f-CC_f$. FIG. 36B illustrates the relationship between cycle count difference (among respective sets of ring oscillators in Trojan-free and Trojan-inserted ICs) and the Trojan's location. As illustrated, it can be appreciated that the Trojan gates' switching can reduce the frequency of the ring oscillator by an amount related to the distance between the Trojan and the ring oscillator. The farther the Trojan is placed from the ring oscillator, the less impact the Trojan has on the frequency of the ring oscillator.

In the presence of a Trojan, the ring oscillator frequency can be modeled by Eq. (5) rather than Eq. (4), the voltage-drop $\Delta V_t$ in Eq. (11) representing the Trojan contribution to the Trojan gates. From Eq. (11), without wishing to be bound by theory, modeling, and/or simulation, it can be appreciated that the frequency of the ring oscillator $f_t$ can be more sensitive to the voltage-drop $\Delta V_t$ when the stage of the ring oscillator n is smaller, e.g., the percent change in frequency due to changes in voltage is greater for smaller n). However, if n is too small, the frequency of the ring oscillator may be too high to be measured in practice. In one aspect, utilizing (i) an operating frequency f=1 GHz, $V_{dd}$=1.2 v, and (iii) Synopsys 90 nm technology in Nanosim or Cadence Ultrasim, for example, it can be determined that a 5-stage RO can be the smallest allowable RO under such conditions. Accordingly, for purposes of illustration of various aspects of the disclosure, 5-stage ring oscillators are utilized in various embodiments of the disclosure.

$$f_t = \frac{\mu_g * (V_{dd} - \Delta V_t - V_{th})^\alpha}{2n * k_g} \quad (11)$$

Without wishing to be bound by theory, simulation, and/or modeling, the dynamic current of an entire Trojan-free chip can be determined by the following equation $$I_{total} = \sum_{i=0}^{i=N} \lambda_i * N * \mu_g * (V_{dd} - V_{th})^\alpha \quad (12)$$

where N is the total number of switching gates in the IC, and $\lambda_i$ denotes the gate-dependent constant of the $i_{th}$ gate. The constant $\lambda_i$ can depend nearly exclusively or exclusively on the type of gate specified, rather than a particular instance of such a gate. The relationship between the frequency of the N-stage (with N a natural number) ring oscillator embedded into the chip and the dynamic current of entire chip can be represented by $$\frac{I_{total}}{f} = \sum_{i=0}^{i=N} \lambda_i * N * 2n * k_g \quad (13)$$

In embodiments comprising ICs with n, Trojan gates inserted, Equation (7) can be cast in the following manner:

$$\frac{I_{total,t}}{f_t} = \sum_{i=0}^{i=N+n_t} \lambda_i * (N + n_t) * 2n * k_g \left(1 + \frac{\Delta V_t}{V_{dd} - \Delta V_t - V_{th}}\right)^\alpha \quad (14)$$

In embodiments in which, for example, $\Delta V_t \ll V_{dd} - \Delta V_t - V_{th}$, Eq. (14) can be approximated as Eq. (15) below, based on a Taylor's expansion on $g=\Delta V_t/(V_{dd}-\Delta V_t-V_{th})$.

$$\frac{I_{total,t}}{f_t} \approx \sum_{i=0}^{i=N+n_t} \lambda_i * (N + n_t) * 2n * k_g \left(1 + \alpha * \frac{\Delta V_t}{V_{dd} - \Delta V_t - V_{th}}\right) \quad (15)$$

Comparing Eq. (14) with Eq. (13), it can be appreciated that Trojans can have a significant impact on the relationship between the frequency of the ring oscillator and the entire IC's dynamic current. In addition, comparing Eq. (9) with Eq. (11), it can be appreciated that combining ring oscillator frequency measurements with current measurements can achieve greater sensitivity to Trojans than either measurement alone, e.g., both such equations depend at least on the side-channel contributions of inserted Trojans.

Figure 37A:
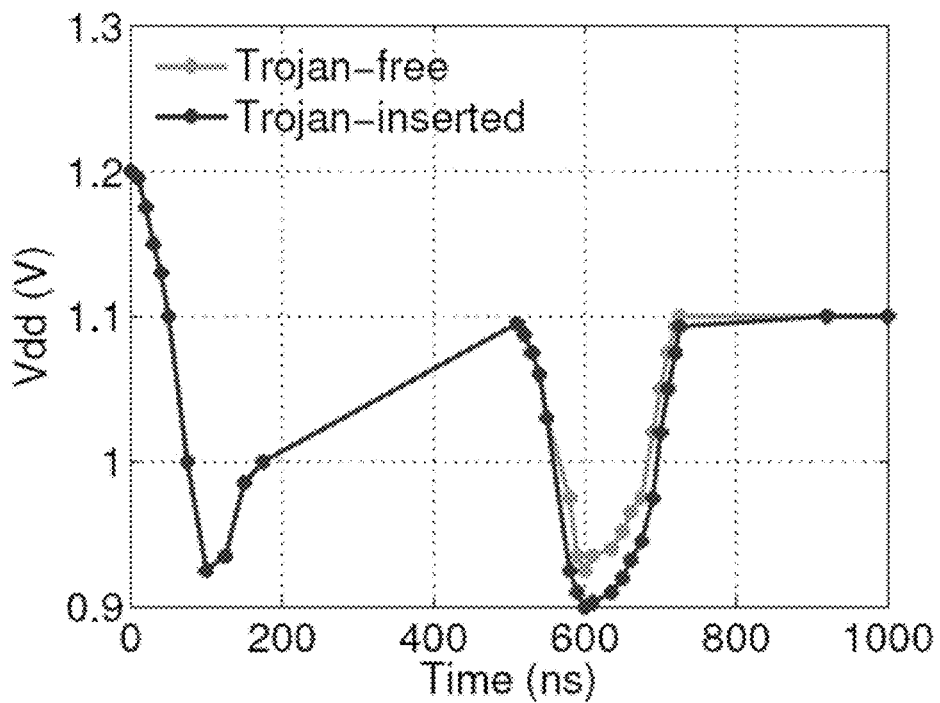
FIG. 37A illustrates time dependence of power supply for an IC having a malicious functional hardware insertion (or Trojan-inserted IC) and an IC free of such insertion (or Trojan-free IC) in accordance with one or more aspects described herein.
Figure 37B:
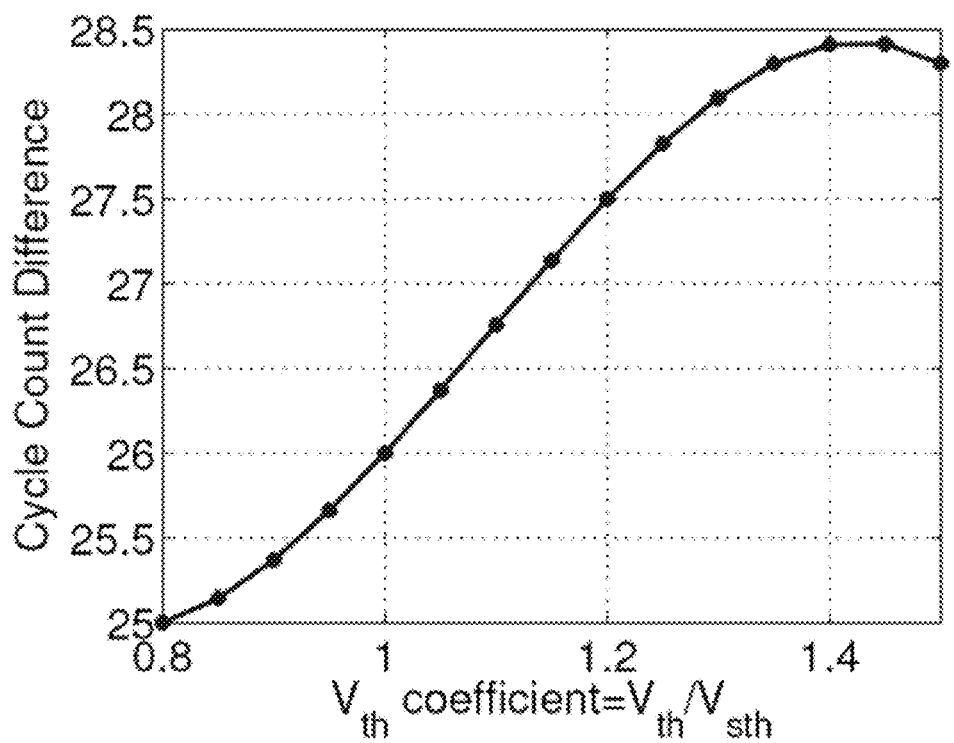
FIG. 37B illustrates cycle count difference between the Trojan-inserted IC and the Trojan-free IC in accordance with aspects described herein.

The foregoing analyses are based primarily on ring oscillators that can be made with standard threshold voltage (SVT) transistors. Yet, ring oscillators with high threshold voltage (HVT) transistors can be more sensitive to power supply noise, as shown by the simulation results (FIG. 37A-37B) obtained using Synopsys 90 nm technology at 25° C. with a 5-stage ring oscillator. The dark-grey line in FIG. 37A conveys the power supply voltage of Trojan-free ICs during a 1000 ns simulation period, and the light-grey line conveys the power supply voltage of Trojan-inserted ICs. FIG. 37B illustrates that for a particular ring oscillator, the cycle count difference between Trojan-free ICs and Trojan-inserted ICs can increase with a threshold voltage of the transistors until a maximum is reached at a certain value of the threshold voltage. Once this maximum has been reached, increasing the threshold voltage can adversely affect the cycle-count difference and, thus, the sensitivity to inserted Trojans. The abscissa in FIG. 37B conveys the threshold voltage coefficient $V_{th}/V_{sth}$, where $V_{sth}$ is the SVT of the MOS transistors. In one aspect, the threshold voltage coefficient of HVT transistors in the Synopsys 90 nm technology library is about 1.2. In another aspect, since ring oscillators with 1.2 HVT transistors can be more sensitive to the power supply noise induced by Trojans, HVT ring oscillators can be embedded into one or more designs of the disclosure. In one aspect, for HVT-based ring oscillators, Eq. (9) can be modified to become:

$$\frac{I_{total,t}}{f_t} = \sum_{i=0}^{i=N+n_t} \lambda_i * (N + n_t) * 2n * k_g \left(1 + \alpha * \frac{\Delta V_t + V_{hth} - V_{sth}}{V_{dd} - \Delta V_t - V_{hth}}\right) \quad (16)$$

where $V_{sth}$ is the standard threshold voltage of gates in the CUT and $V_{hth}$ is the high threshold voltage of transistors in the ring oscillators. From Eq. (16), it can be appreciated that the relationship between the IC's dynamic current and the frequency of a ring oscillator in the circuit can be more sensitive utilizing HVT transistors.

Certain parameters in Eq. (16) can change in response to process and/or environmental variations. In one scenario, small environmental variations can be considered during testing (either simulated or actual, or both) of disparate ICs, each having one or more Trojans or being Trojan-free. Such testing scenario can be accomplished, for example, when ICs are tested under substantially the same temperature conditions in a production test environment. Other parameters can be susceptible to process variations and statistical analysis can be employed to separate contributions of process variations and Trojans to the transient power.

Figure 38:
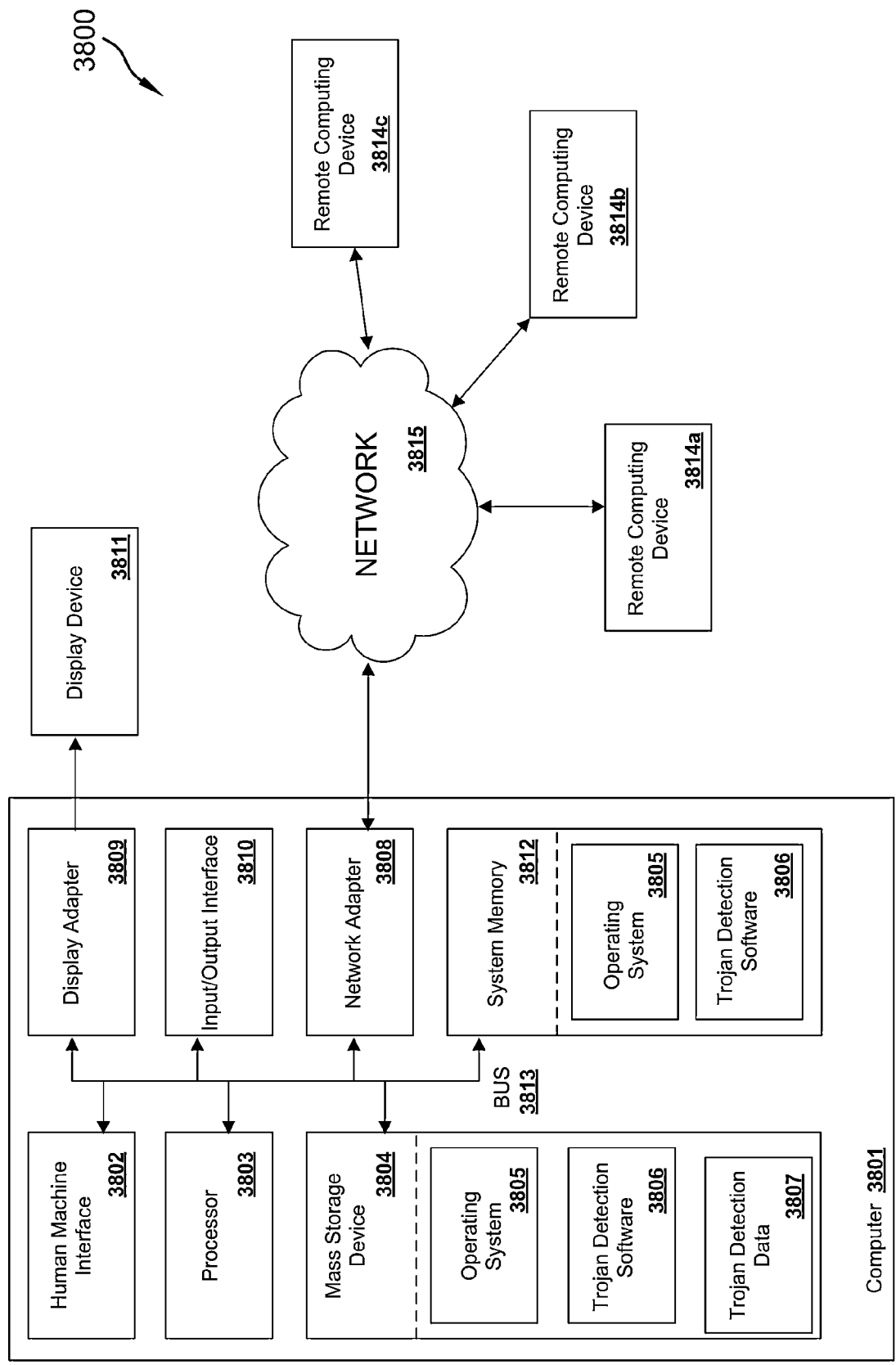
FIG. 38 is a block diagram of an exemplary computing environment that can enable various aspects (e.g., circuit design, circuit simulation, Trojan detection analysis) of the disclosure.

FIG. 38 illustrates a block diagram of an exemplary computing environment 3800 that enables various features of the subject disclosure and performance of the various methods disclosed herein. Exemplary computing environment 3800 is only an example of the several computing environments suitable for implementation of the various aspects of the subject disclosure and is not intended to suggest any limitation as to the scope of use or functionality of operating environment architecture. Neither should the computing environment be interpreted as having any dependency or requirement relating to any one or combination of components or units illustrated in the exemplary computing environment.

The various embodiments of the subject disclosure can be operational with numerous other general purpose or special purpose computing system environments or configurations. Examples of well known computing systems, environments, and/or configurations that can be suitable for use with the systems and methods comprise, but are not limited to, personal computers, server computers, laptop devices or handheld devices, and multiprocessor systems. Additional examples comprise wearable devices, mobile devices, set top boxes, programmable consumer electronics, network PCs, minicomputers, mainframe computers, distributed computing environments that comprise any of the above systems or devices, and the like.

The processing effected in the disclosed systems and methods can be performed by software components. The disclosed systems and methods can be described in the general context of computer-executable instructions, such as program modules, being executed by one or more computers or other computing devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 3801. The components of the computer 3801 can comprise one or more processors 3803, or processing units 3803, a system memory 3812, and a system bus 3813 that couples various system components including the processor 3803 to the system memory 3812. In the case of multiple processing units 3803, the system can utilize parallel computing. In certain implementations, computer 3801 can embody or can comprise one or more of analysis component 510 or analysis component 1410. In other implementations, computer 3801 embodies a design platform for performing various simulations (see, e.g., FIGS. 35A-35D).

In general, a processor 3803 or a processing unit 3803 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 3803 or processing unit 3803 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 3803 or processing unit 3803 also can be implemented as a combination of computing processing units.

The system bus 3813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 3813, and all buses specified in this description also can be implemented over a wired or wireless network connection and each of the subsystems, including the processor 3803, a mass storage device 3804, an operating system 3805, Trojan management software 3806, Trojan detection data 3807, a network adapter 3808, system memory 3812, an Input/Output Interface 3810, a display adapter 3809, a display device 3811, and a human machine interface 3802, can be contained within one or more remote computing devices 3814a,b,c at physically separate locations, connected through buses of this form, in effect implementing a fully distributed system. In an aspect, Trojan software code 3806 can comprise various components or units that implement analysis (e.g., simple outlier analysis, PCA, or advanced outlier analysis) for detection of unintended functional hardware insertion(s) (e.g., malicious hardware insertion(s), or hardware Trojan(s)). Such components or units can be embodied in computer-executable instructions, or programming code instructions, and executed by processor 3803. While Trojan detection data 3807 is illustrated as part of mass storage device 3804, it should be appreciated that in other environments, Trojan detection data can reside within system memory 3812 or a memory functionally coupled to a remote device (e.g., remote computing device 3814a). Data related to design and simulation of an IC, such as design of a true random number generator described herein, also can reside within mass storage device 3804 or system memory 3812.

The computer 3801 typically comprises a variety of computer readable media. Exemplary readable media can be any available media that is accessible by the computer 3801 and comprises, for example and not meant to be limiting, both volatile and non-volatile media, removable and non-removable media. The system memory 3812 comprises computer readable media in the form of volatile memory, such as random access memory (RAM), and/or non-volatile memory, such as read only memory (ROM). The system memory 3812 typically contains data and/or program modules such as operating system 3805 and Trojan detection software 3806 that are accessible to and/or are presently operated on by the processing unit 3803. System memory 3812 also can include software for design and simulation of integrated; for instance, software for design on true random number generators can reside in system memory 3812. Operating system 3805 can comprise OSs such as Windows operating system, Unix, Linux, Symbian, Android, iOS, Chromium, and substantially any operating system for wireless computing devices or tethered computing devices.

In another aspect, the computer 3801 also can comprise other removable/non-removable, volatile/non-volatile computer storage media. By way of example, FIG. 38 illustrates a mass storage device 3804 which can provide non-volatile storage of computer code, computer readable instructions, data structures, program modules, and other data for the computer 3801. For example and not meant to be limiting, a mass storage device 3804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 3804, including by way of example, an operating system 3805, and Trojan detection software 3806. Each of the operating system 3805 and Trojan detection software 3806 (or some combination thereof) can comprise elements of the programming and the Trojan detection software 3806. Data and code (e.g., computer-executable instruction(s)) can be retained as part of Trojan detection software 3806 and can be stored on the mass storage device 3804. Trojan detection software 3806, and related data and code, can be stored in any of one or more databases known in the art. Examples of such databases comprise, DB2®, Microsoft® Access, Microsoft® SQL Server, Oracle®, mySQL, PostgreSQL, and the like. Other examples of databases include membase databases and flat file databases. The databases can be centralized or distributed across multiple systems.

In another aspect, the user can enter commands and information into the computer 3801 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (RFID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 3803 via a human machine interface 3802 that is coupled to the system bus 3813, but can be connected by other interface and bus structures, such as a parallel port, game port, an IEEE 1394 Port (also known as a Firewire port), a serial port, or a universal serial bus (USB).

In yet another aspect, a display device 3811 also can be connected to the system bus 3813 via an interface, such as a display adapter 3809. It is contemplated that the computer 3801 can have more than one display adapter 3809 and the computer 3801 can have more than one display device 3811. For example, a display device can be a monitor, an LCD (Liquid Crystal Display), or a projector. In addition to the display device 3811, other output peripheral devices can comprise components such as speakers (not shown) and a printer (not shown) which can be connected to the computer 3801 via Input/Output Interface 3810. Any step and/or result of the methods can be output in any form to an output device. Such output can be any form of visual representation, including, but not limited to, textual, graphical, animation, audio, tactile, and the like.

The computer 3801 can operate in a networked environment using logical connections to one or more remote computing devices 3814a,b,c. By way of example, a remote computing device can be a personal computer, portable computer, a mobile telephone, a server, a router, a network computer, a peer device or other common network node, and so on. Logical connections between the computer 3801 and a remote computing device 3814a,b,c can be made via a local area network (LAN) and a general wide area network (WAN). Such network connections can be through a network adapter 3808. A network adapter 3808 can be implemented in both wired and wireless environments. Such networking environments are conventional and commonplace in offices, enterprise-wide computer networks, intranets, and the Internet 3815. Networking environments generally can be embodied in wireline networks or wireless networks (e.g., cellular networks, facility-based networks, etc.).

As an illustration, application programs and other executable program components such as the operating system 3805 are illustrated herein as discrete blocks, although it is recognized that such programs and components reside at various times in different storage components of the computing device 3801, and are executed by the data processor(s) of the computer. An implementation of Trojan detection software 3806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 39:
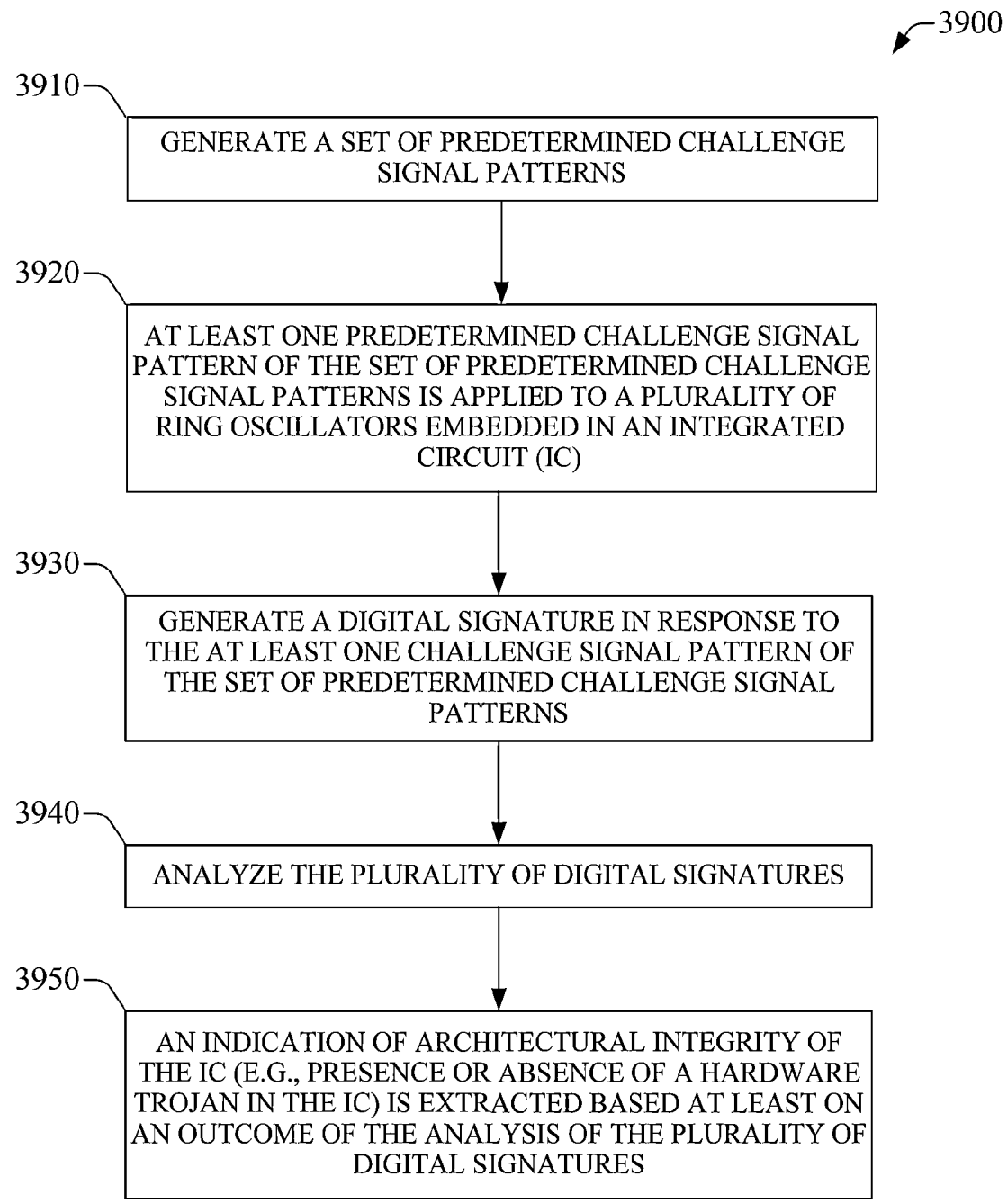
FIG. 39 illustrates an exemplary method for enhancing security of an integrated circuit in accordance with one or more aspects of the disclosure.

In view of the various aspects described hereinbefore, a high-level exemplary method 2800 that can be implemented in accordance with the disclosed subject matter can be better appreciated with reference to the flowchart in FIG. 39 in addition to other disclosure of methods described herein. For purposes of simplicity of explanation, the exemplary method 3900 disclosed herein is presented and described as a series of acts or steps; however, it is to be understood and appreciated that exemplary method 2800 and the various processes or methods described in the subject disclosure are not limited by the order of acts or steps, as some acts or steps may occur in different orders and/or concurrently with other acts from that shown and described herein. Moreover, not all illustrated acts or steps may be required to implement a process or method in accordance with the subject disclosure. Furthermore, two or more of the disclosed methods or processes can be implemented in combination with each other, to accomplish one or more features or advantages described herein.

FIG. 39 is a flowchart of an exemplary method 3900 for enhancing security of an integrated circuit in accordance with aspects described herein. In one aspect, security can be enhanced by embedding a RON in the integrated circuit and analyzing one or more signatures (e.g., power signature(s)) that can be generated in response to a challenge signal (or probe signal) applied to an IC at least in part through the RON, the IC comprising the RON. In one aspect, the RON embedded in the IC in conjunction with the IC can embody or can comprise a PUF. At block 3910, a set of one or more predetermined challenge signal patterns can be generated. In one or more embodiments, at least one of the challenge signal patterns in such set can be generated by a pseudo-random patter generator, which can be embodied in an LFSR (see, e.g., FIG. 5). At act 3920, at least one predetermined challenge signal pattern of the set of predetermined challenge signal patterns can be applied to a plurality of ring oscillators embedded in the IC (see, e.g., FIG. 5). As described herein, the at least one predetermined challenge signal pattern can be applied to a portion of the plurality of the ring oscillators or to the whole plurality of the ring oscillators. At act 3930, a digital signature is generated in response to the at least one challenge signal pattern of the set of predetermined challenge signal patterns. In certain embodiments, the digital signature depends on an environmental factor and a manufacturing process factor, wherein the manufacturing process is the process, or part thereof, carried out to manufacture the IC. As described herein, the digital signature can depend on both such factors in scenarios in which the at least one predetermined signal pattern is applied to at least a portion of the plurality of ring oscillators while the IC operates.

At act 3940, the plurality of digital signatures is analyzed. In an embodiment, analyzing the plurality of signatures comprises analyzing data related to the plurality of digital signatures according to at least one of the simple outlier analysis, the principal component analysis, or the advanced outlier analysis described hereinbefore. At act 2850, an indication of architectural integrity of the IC (e.g., presence or absence of a hardware Trojan in the IC) is extracted based at least on an outcome of act 2840, which can be referred to as the "analyzing act."

As described herein, various aspects of the disclosure relate to a novel PUF, referred to as PE-PUF, which incorporates all types or substantially all types of variations (environment, manufacturing process, etc.) in integrated circuits. As described herein, PE-PUF can improve signature randomness and uniqueness significantly when compared to conventional or traditional RO-based PUFs that are responsive only to process variations. In an embodiment, PE-PUF was implemented on ISCAS'89 s9234 benchmarks. Analysis of such embodiment indicates that environmental variations such as power supply noise, temperature, and crosstalk have significant impact on oscillator frequency of RO(s) in the PE-PUF. In additional or alternative aspects, RON embedded in an integrated circuit also can be employed for detection of unintended functional hardware modifications (e.g., hardware Trojan) inserted into an IC. The RON architecture can generate a power supply fingerprint or signature that is employed to identify presence or absence of such unintended functional hardware modifications. The subject disclosure also provides methods for statistical analysis that can distinguish effects of unintended functional hardware modifications from effects of manufacturing process variations. Data observed in an exemplary circuit demonstrate effectiveness of the systems, devices, and methods provided in the subject disclosure for identifying ICs with unintended functional hardware inserted therein.

In addition or in the alternative, the disclosure relates to detection of unintended functional hardware insertions in an IC. Such detection can comprise an on-chip structure, such as a RON, and off-chip measurement of currents. In one aspect, such detection can be based on a methodology and related apparatuses for analysis of data collected from measurements of currents in the IC. Such methodology, for example, can incorporate or exclude a golden model. The methodology and related apparatuses, which collectively can be referred to as the detection approach, can detect small hardware insertions, such as Trojans having as low as four gates, with negligible contribution to circuit transient current. In one aspect, detection approach can comprise statistical analysis that can distinguish effects of hardware Trojans from process variations associated with manufacture of the IC. Measurements and related analysis conducted on actual ICs demonstrate that the disclosed detection approach can be effective to identify Trojan-inserted ICs. The detection approach of the disclosure can be applied to ultra-small Trojans (e.g., hardware insertions having less than four gates) and related detection sensitivity can be analyzed. While various features or aspects of detection of an unintended functional hardware insertion (e.g., a hardware Trojan), and related devices and methodology, are illustrated with a ring oscillator network, it should be appreciated that such features or aspects also can be accomplished with substantially any on-chip structure having one or more sensors that can probe at least one parameter indicative of operational condition of an IC.

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:
1. A device, comprising:
a set of one or more ring oscillators embedded in an integrated circuit (IC), wherein at least two of the ring oscillators share a common power strap of the IC;
a pseudo-random pattern generator that applies a set of predetermined challenge signal patterns to the IC; and a set of counters, wherein each counter is coupled to a corresponding ring oscillator in the set of one or more ring oscillators and determines at least in part a digital signature associated with the IC in response to the set of challenge signal patterns.

2. The device of claim 1, wherein the set of one or more ring oscillators is distributed throughout the IC.

3. The device of claim 1, wherein the set of counters supplies data representative of the digital signature associated with the IC.

4. The device of claim 1, further comprising a control unit that enables a counter in the set of counters in response to application of an initial predetermined challenge signal pattern.

5. The device of claim 4, wherein the control unit disables a counter upon or after the set of predetermined challenge signal patterns is applied.

6. The device of claim 3, wherein the digital signature is a binary multi-bit word having a length that is at least a cardinality of the set of one or more ring oscillators minus one.

7. The device of claim 1, wherein the digital signature is a binary multi-bit word having a length that equals the product of (i) a cardinality of the set of one or more ring oscillators minus one and (ii) a cardinality of the set of challenge signal patterns.

8. The device of claim 3, further comprising an analysis component that generates the digital signature based at least on the data.

9. The device of claim 8, wherein to generate the digital signature, the analysis component assigns a binary value to a bit of the digital signature based on a difference amongst a first cycle count of a first counter and a second cycle count of a second counter, wherein the first counter and the second counter monitor neighboring ring oscillators, wherein the neighboring ring oscillators are adjacent to each other.

10. The device of claim 9, wherein the binary value is a logic "1" for a first cycle count that is greater than the second cycle count.

11. The device of claim 1, wherein at least one ring oscillator of the set of one or more ring oscillators comprises a plurality of stages, and wherein a stage of the plurality of stages is one of an inverter or a logic gate.

12. The device of claim 1, wherein at least one ring oscillator of the set of one or more ring oscillators comprises three inverters.

13. The device of claim 12, wherein the set of one or more ring oscillators comprises 17 ring oscillators.

14. The device of claim 13, wherein at least one challenge signal pattern of the set of challenge signal patterns is a 30-bit random pattern.

15. The device of claim 14, wherein the set of challenge signal patterns is applied at a frequency of about 1 GHz.

16. The device of claim 15, wherein at least one counter of the set of one or more counters is a 5-bit counter.

17. The device of claim 1, wherein at least one ring oscillator of the set of one or more ring oscillators comprises three NAND gates.

18. The device of claim 1, wherein at least one ring oscillator of the set of one or more ring oscillators comprises seven inverters.

19. The device of claim 1, wherein at least one ring oscillator of the set of one or more ring oscillators comprises seven NAND gates.

20. The device of claim 1, wherein the set of one or more ring oscillators introduces an area overhead in the IC, and wherein the area overhead depends at least on one or more of the IC architecture or a number of ring oscillators in the set of one or more ring oscillators.

21. A device, comprising:
a plurality of sensors embedded in an integrated circuit (IC), each sensor of the plurality of sensors being configured to supply an output signal in response to an input signal applied to the IC, wherein at least two of the plurality of sensors share a common power strap of the IC;
a random pattern generator unit that applies a set of predetermined challenge signal patterns to the IC, the input signal applied to the IC comprising at least one challenge signal pattern of the set of predetermined challenge signal patterns;
a set of one or more counters, each counter of the set of one or more counters being functionally coupled to at least one sensor of the plurality of sensors, wherein each counter determines at least in part a digital signature associated with the IC based on a specific output signal of the at least one sensor in response to a specific challenge signal pattern of the plurality of challenge signal patterns;
a first multiplexer that selects a sensor of the plurality of sensors; and
a second multiplexer that collects the output signal from each sensor of the plurality of sensors.

22. The device of claim 21, wherein the set of counters supplies data indicative of the digital signature associated with the IC.

23. The device of claim 22, wherein the digital signature is a power signature related to the IC and depends on at least one of a manufacturing process factor or an environmental factor.

24. The device of claim 22, further comprising an analysis component that generates the digital signature based at least on the data.

25. The device of claim 24, wherein the random pattern generator applies a predetermined challenge signal pattern of the plurality of predetermined challenge signal patterns to the IC for a number of instances that is equal to the number of elements in the plurality of sensors.

26. The device of claim 25, wherein the plurality of sensors comprises a plurality of ring oscillators having 12 ring oscillators.

27. The device of claim 25, wherein the analysis component analyzes data related to a first plurality of power signatures produced in response to the predetermined challenge signal pattern in accordance with at least one of a simple outlier analysis, a principal component analysis, or an advanced outlier analysis.

28. The device of claim 27, wherein the analysis component compares an outcome of analysis of the data related to the first plurality of power signatures and benchmark data for a benchmark IC without an unintended functional hardware modification, and generates a comparison outcome.

29. The device of claim 28, wherein the analysis component indicates presence or absence of the unintended functional hardware modification in the IC based on the comparison outcome.

30. The device of claim 26, wherein at least one ring oscillator of the plurality of ring oscillators comprises three NAND gates.

31. The device of claim 26, wherein at least one ring oscillator of the plurality of ring oscillators comprises seven inverters.

32. The device of claim 26, wherein at least one ring oscillator of the plurality of ring oscillators comprises seven NAND gates.

33. The device of claim 26, wherein the set of one or more ring oscillators introduces an area overhead in the IC, and wherein the area overhead depends at least on one or more of the IC architecture or a number of ring oscillators in the set of one or more ring oscillators.

34. A method, comprising:
applying a set of predetermined challenge signal patterns to a plurality of ring oscillators embedded in an integrated circuit (IC), wherein each ring oscillator is coupled to a corresponding counter in a set of one or more counters, wherein at least two of the plurality of ring oscillators share a common power strap of the IC; and generating a digital signature in response to the set of predetermined challenge signal patterns, wherein the digital signature depends on at least one of an environmental factor or a manufacturing process factor.

35. The method of claim 34, further comprising generating the set of predetermined challenge signal patterns.

36. The method of claim 35, further comprising:
analyzing a plurality of digital signatures; and
extracting an indication of architectural integrity of the IC based on an outcome of the analyzing act.

37. The method of claim 36, wherein the analyzing act comprises analyzing data related to the plurality of digital signatures according to at least one of a simple outlier analysis, a principal component analysis, or an advanced outlier analysis.

38. The method of claim 2, wherein a ring oscillator of the set of one or more ring oscillators comprises as plurality of components, and wherein at least one of the plurality of components is located in each corresponding row of a standard cell of the IC.

* * * * *